United States Patent
Ramanathan et al.

(10) Patent No.: US 11,811,642 B2
(45) Date of Patent: *Nov. 7, 2023

(54) VINE™: ZERO-CONTROL ROUTING USING DATA PACKET INSPECTION FOR WIRELESS MESH NETWORKS

(71) Applicant: goTenna, Inc., Brooklyn, NY (US)

(72) Inventors: Subramanian Ramanathan, Westford, MA (US); Christophe Servaes, Guttenberg, NJ (US); Seth Foster, Brooklyn, NY (US)

(73) Assignee: goTenna, Inc., Brooklyn, NY (US)

( * ) Notice: Subject to any disclaimer, the term of this patent is extended or adjusted under 35 U.S.C. 154(b) by 306 days.

This patent is subject to a terminal disclaimer.

(21) Appl. No.: 17/444,222

(22) Filed: Aug. 2, 2021

(65) Prior Publication Data

US 2021/0367878 A1 Nov. 25, 2021

Related U.S. Application Data

(63) Continuation of application No. 16/523,757, filed on Jul. 26, 2019, now Pat. No. 11,082,324.

(Continued)

(51) Int. Cl.
*H04L 45/02* (2022.01)
*H04L 45/00* (2022.01)
(Continued)

(52) U.S. Cl.
CPC .............. *H04L 45/02* (2013.01); *H04L 45/20* (2013.01); *H04L 47/286* (2013.01); *H04L 47/34* (2013.01);

(Continued)

(58) Field of Classification Search
None
See application file for complete search history.

(56) References Cited

U.S. PATENT DOCUMENTS

| | | |
|---|---|---|
| 6,047,330 A | 4/2000 | Stracke, Jr. |
| 6,415,158 B1 | 7/2002 | King et al. |

(Continued)

FOREIGN PATENT DOCUMENTS

| | | |
|---|---|---|
| WO | WO2012078565 | 6/2012 |
| WO | WO2012116489 | 9/2012 |

OTHER PUBLICATIONS

U.S. Appl. No. 10/015,720, filed Jul. 3, 2018, Perdomo.

(Continued)

*Primary Examiner* — Jamaal Henson
(74) *Attorney, Agent, or Firm* — Thrive IP

(57) ABSTRACT

A MANET protocol, comprising: receiving a data packet (DP) from a current sender (CS) by a recipient, defining: an identity of the CS, a prior sender (PS) from which CS received DP, and a target recipient (ID), a count (HC) of hops previously traversed by DP, and a sequence identifier (SI); updating a forwarding table (FT) to mark CS as being reachable in one hop, and PS as being reachable in two hops via CS as next hop; determining if ID is the recipient; determining whether to rebroadcast by recipient, if and only if the SI is not present in a list of prior SIs; and selectively rebroadcasting DP by recipient in dependence on said determining, modified by: replacement of CS with an identity of the recipient, PS with CS, and ID with a next hop from the FT if present, and incrementing HC.

20 Claims, 3 Drawing Sheets

Related U.S. Application Data

(60) Provisional application No. 62/711,274, filed on Jul. 27, 2018.

(51) Int. Cl.
*H04L 47/28* (2022.01)
*H04L 47/34* (2022.01)
*H04L 69/22* (2022.01)
*H04W 4/06* (2009.01)
*H04W 84/18* (2009.01)

(52) U.S. Cl.
CPC .............. *H04L 69/22* (2013.01); *H04W 4/06* (2013.01); *H04W 84/18* (2013.01)

(56) References Cited

U.S. PATENT DOCUMENTS

| | | |
|---|---|---|
| 6,421,349 B1 | 7/2002 | Grover |
| 6,584,080 B1 | 6/2003 | Ganz et al. |
| 6,625,135 B1 | 9/2003 | Johnson et al. |
| 6,628,620 B1 | 9/2003 | Cain |
| 6,647,426 B2 | 11/2003 | Mohammed |
| 6,678,252 B1 | 1/2004 | Cansever |
| 6,704,301 B2 | 3/2004 | Chari et al. |
| 6,718,394 B2 | 4/2004 | Cain |
| 6,745,027 B2 | 6/2004 | Twitchell, Jr. |
| 6,754,192 B2 | 6/2004 | Kennedy |
| 6,763,013 B2 | 7/2004 | Kennedy |
| 6,763,014 B2 | 7/2004 | Kennedy |
| 6,766,309 B1 | 7/2004 | Cheng et al. |
| 6,775,258 B1 | 8/2004 | van Valkenburg et al. |
| 6,807,165 B2 | 10/2004 | Belcea |
| 6,813,272 B1 | 11/2004 | An et al. |
| 6,816,460 B1 | 11/2004 | Ahmed et al. |
| 6,836,463 B2 | 12/2004 | Garcia-Luna-Aceves et al. |
| 6,845,091 B2 | 1/2005 | Ogier et al. |
| 6,870,846 B2 | 3/2005 | Cain |
| 6,873,839 B2 | 3/2005 | Stanforth |
| 6,879,574 B2 | 4/2005 | Naghian et al. |
| 6,894,985 B2 | 5/2005 | Billhartz |
| 6,898,529 B2 | 5/2005 | Gao et al. |
| 6,904,275 B2 | 6/2005 | Stanforth |
| 6,906,741 B2 | 6/2005 | Canova, Jr. et al. |
| 6,909,706 B2 | 6/2005 | Wilmer et al. |
| 6,917,618 B2 | 7/2005 | Thubert et al. |
| 6,917,985 B2 | 7/2005 | Madruga et al. |
| 6,934,540 B2 | 8/2005 | Twitchell, Jr. |
| 6,937,602 B2 | 8/2005 | Whitehill et al. |
| 6,954,435 B2 | 10/2005 | Billhartz et al. |
| 6,954,790 B2 | 10/2005 | Forslow |
| 6,958,986 B2 | 10/2005 | Cain |
| 6,961,310 B2 | 11/2005 | Cain |
| 6,975,614 B2 | 12/2005 | Kennedy |
| 6,977,608 B1 | 12/2005 | Anderson et al. |
| 6,980,537 B1 | 12/2005 | Liu |
| 6,982,982 B1 | 1/2006 | Barker, Jr. et al. |
| 6,985,476 B1 | 1/2006 | Elliott et al. |
| 6,986,161 B2 | 1/2006 | Billhartz |
| 6,996,084 B2 | 2/2006 | Troxel et al. |
| 7,006,437 B2 | 2/2006 | Ogier et al. |
| 7,006,453 B1 | 2/2006 | Ahmed et al. |
| 7,007,102 B2 | 2/2006 | Billhartz et al. |
| 7,016,325 B2 | 3/2006 | Beasley et al. |
| 7,016,336 B2 | 3/2006 | Sorensen |
| 7,027,409 B2 | 4/2006 | Cain |
| 7,027,426 B2 | 4/2006 | Billhartz |
| 7,028,099 B2 | 4/2006 | Troxel et al. |
| 7,028,687 B1 | 4/2006 | Silver et al. |
| 7,031,288 B2 | 4/2006 | Ogier |
| 7,031,293 B1 | 4/2006 | Srikrishna et al. |
| 7,039,035 B2 | 5/2006 | Droms et al. |
| 7,061,924 B1 | 6/2006 | Durrant et al. |
| 7,061,925 B2 | 6/2006 | Joshi |
| 7,068,600 B2 | 6/2006 | Cain |
| 7,068,605 B2 | 6/2006 | Cain et al. |
| 7,069,483 B2 | 6/2006 | Gillies et al. |
| 7,075,919 B1 | 7/2006 | Wendt et al. |
| 7,079,509 B2 | 7/2006 | Belcea |
| 7,079,552 B2 | 7/2006 | Cain et al. |
| 7,082,117 B2 | 7/2006 | Billhartz |
| 7,085,241 B1 | 8/2006 | O'Neill et al. |
| 7,085,290 B2 | 8/2006 | Cain et al. |
| 7,088,717 B2 | 8/2006 | Reeves et al. |
| 7,092,391 B2 | 8/2006 | Umeda |
| 7,092,943 B2 | 8/2006 | Roese et al. |
| 7,096,037 B2 | 8/2006 | Canova, Jr. et al. |
| 7,096,359 B2 | 8/2006 | Agrawal et al. |
| 7,099,296 B2 | 8/2006 | Belcea |
| 7,116,661 B2 | 10/2006 | Patton |
| 7,127,250 B2 | 10/2006 | Gallagher et al. |
| 7,133,391 B2 | 11/2006 | Belcea |
| 7,133,704 B2 | 11/2006 | Twitchell, Jr. |
| 7,142,866 B2 | 11/2006 | Windham et al. |
| 7,151,757 B2 | 12/2006 | Beasley et al. |
| 7,151,769 B2 | 12/2006 | Stanforth et al. |
| 7,155,264 B2 | 12/2006 | Twitchell, Jr. |
| 7,155,518 B2 | 12/2006 | Forslow |
| 7,161,929 B1 | 1/2007 | O'Neill et al. |
| 7,170,425 B2 | 1/2007 | Christopher et al. |
| 7,176,807 B2 | 2/2007 | Scoggins et al. |
| 7,177,295 B1 | 2/2007 | Sholander et al. |
| 7,177,646 B2 | 2/2007 | O'Neill et al. |
| 7,184,421 B1 | 2/2007 | Liu et al. |
| 7,190,678 B2 | 3/2007 | Thubert et al. |
| 7,194,010 B2 | 3/2007 | Beasley et al. |
| 7,197,016 B2 | 3/2007 | Belcea |
| 7,200,132 B2 | 4/2007 | Twitchell, Jr. |
| 7,209,468 B2 | 4/2007 | Twitchell, Jr. |
| 7,209,771 B2 | 4/2007 | Twitchell, Jr. |
| 7,209,978 B2 | 4/2007 | Thubert et al. |
| 7,212,504 B2 | 5/2007 | Belcea |
| 7,215,926 B2 | 5/2007 | Corbett et al. |
| 7,216,282 B2 | 5/2007 | Cain |
| 7,221,668 B2 | 5/2007 | Twitchell, Jr. |
| 7,224,642 B1 | 5/2007 | Tran |
| 7,230,916 B2 | 6/2007 | Stamatelakis et al. |
| 7,242,678 B2 | 7/2007 | O'Neill et al. |
| 7,251,238 B2 | 7/2007 | Joshi et al. |
| 7,251,489 B2 | 7/2007 | Beasley et al. |
| 7,263,063 B2 | 8/2007 | Sastry et al. |
| 7,266,085 B2 | 9/2007 | Stine |
| 7,266,104 B2 | 9/2007 | Belcea |
| 7,269,147 B2 | 9/2007 | Kim et al. |
| 7,271,736 B2 | 9/2007 | Siegel et al. |
| 7,281,057 B2 | 10/2007 | Cain |
| 7,295,556 B2 | 11/2007 | Roese et al. |
| 7,298,743 B2 | 11/2007 | Markki et al. |
| 7,299,038 B2 | 11/2007 | Kennedy et al. |
| 7,299,042 B2 | 11/2007 | Moore et al. |
| 7,305,459 B2 | 12/2007 | Klemba et al. |
| 7,308,369 B2 | 12/2007 | Rudran et al. |
| 7,308,370 B2 | 12/2007 | Mason, Jr. et al. |
| 7,315,548 B2 | 1/2008 | Joshi |
| 7,317,898 B2 | 1/2008 | Tegreene |
| 7,324,824 B2 | 1/2008 | Smith et al. |
| 7,327,683 B2 | 2/2008 | Ogier et al. |
| 7,327,998 B2 | 2/2008 | Kumar et al. |
| 7,330,694 B2 | 2/2008 | Lee et al. |
| 7,333,461 B2 | 2/2008 | Thubert et al. |
| 7,339,897 B2 | 3/2008 | Larsson et al. |
| 7,339,925 B2 | 3/2008 | O'Neill et al. |
| 7,342,895 B2 | 3/2008 | Serpa et al. |
| 7,346,015 B2 | 3/2008 | Shipman |
| 7,346,167 B2 | 3/2008 | Billhartz et al. |
| 7,348,895 B2 | 3/2008 | Lagassey |
| 7,349,362 B2 | 3/2008 | Belcea |
| 7,349,370 B2 | 3/2008 | Lee et al. |
| 7,356,001 B1 | 4/2008 | Jones et al. |
| 7,359,358 B2 | 4/2008 | Shipman |
| 7,362,711 B2 | 4/2008 | Golle et al. |
| 7,362,727 B1 | 4/2008 | O'Neill et al. |
| 7,366,111 B2 | 4/2008 | Thubert et al. |
| 7,366,544 B2 | 4/2008 | Tegreene |

(56) References Cited

U.S. PATENT DOCUMENTS

| | | |
|---|---|---|
| 7,367,497 B1 | 5/2008 | Hill |
| 7,376,122 B2 | 5/2008 | Draves, Jr. et al. |
| 7,382,765 B2 | 6/2008 | Kennedy et al. |
| 7,389,295 B2 | 6/2008 | Jung et al. |
| 7,391,742 B2 | 6/2008 | Zabele et al. |
| 7,394,774 B2 | 7/2008 | Calcev |
| 7,394,798 B2 | 7/2008 | Naghian |
| 7,394,826 B2 | 7/2008 | Cain et al. |
| 7,397,785 B2 | 7/2008 | Wu et al. |
| 7,397,789 B2 | 7/2008 | Chari et al. |
| 7,400,596 B1 | 7/2008 | Robertson et al. |
| 7,400,903 B2 | 7/2008 | Shoemake et al. |
| 7,406,078 B2 | 7/2008 | Jeon |
| 7,408,911 B2 | 8/2008 | Joshi |
| 7,414,977 B2 | 8/2008 | Orlik et al. |
| 7,415,019 B2 | 8/2008 | Duggi |
| 7,417,962 B2 | 8/2008 | McBride |
| 7,418,238 B2 | 8/2008 | Tegreene |
| 7,420,944 B2 | 9/2008 | Norris et al. |
| 7,420,952 B2 | 9/2008 | da Costa et al. |
| 7,420,954 B2 | 9/2008 | Elbatt et al. |
| 7,423,985 B1 | 9/2008 | Hill |
| 7,427,927 B2 | 9/2008 | Borleske et al. |
| 7,428,221 B2 | 9/2008 | Thubert et al. |
| 7,443,822 B2 | 10/2008 | Lindskog et al. |
| 7,450,517 B2 | 11/2008 | Cho |
| 7,451,365 B2 | 11/2008 | Wang et al. |
| 7,453,864 B2 | 11/2008 | Kennedy et al. |
| 7,457,304 B2 | 11/2008 | Roh et al. |
| 7,457,834 B2 | 11/2008 | Jung et al. |
| 7,463,612 B2 | 12/2008 | Fonseca, Jr. et al. |
| 7,463,907 B2 | 12/2008 | Smith et al. |
| 7,466,665 B2 | 12/2008 | Calcev et al. |
| 7,466,676 B2 | 12/2008 | Gupta et al. |
| 7,468,954 B2 | 12/2008 | Sherman |
| 7,480,248 B2 | 1/2009 | Duggi et al. |
| 7,486,651 B2 | 2/2009 | Hagiwara et al. |
| 7,489,635 B2 | 2/2009 | Evans et al. |
| 7,489,932 B2 | 2/2009 | Chari et al. |
| 7,492,787 B2 | 2/2009 | Ji et al. |
| 7,495,578 B2 | 2/2009 | Borleske |
| 7,496,059 B2 | 2/2009 | Yoon |
| 7,496,680 B2 | 2/2009 | Canright |
| 7,505,450 B2 | 3/2009 | Castagnoli |
| 7,512,079 B2 | 3/2009 | Labrador et al. |
| 7,512,094 B1 | 3/2009 | Linebarger et al. |
| 7,512,783 B2 | 3/2009 | Naghian et al. |
| 7,515,551 B2 | 4/2009 | Cook et al. |
| 7,522,547 B2 | 4/2009 | Lee et al. |
| 7,522,568 B2 | 4/2009 | Twitchell, Jr. |
| 7,522,731 B2 | 4/2009 | Klemba et al. |
| 7,529,547 B2 | 5/2009 | Twitchell, Jr. |
| 7,529,561 B2 | 5/2009 | Heinonen et al. |
| 7,532,585 B2 | 5/2009 | Kim et al. |
| 7,535,883 B2 | 5/2009 | Kim et al. |
| 7,536,388 B2 | 5/2009 | Jung et al. |
| 7,539,759 B2 | 5/2009 | Narayanan et al. |
| 7,545,285 B2 | 6/2009 | Shuey et al. |
| 7,546,126 B2 | 6/2009 | Beasley et al. |
| 7,561,024 B2 | 7/2009 | Rudnick |
| 7,561,525 B2 | 7/2009 | Saito |
| 7,564,842 B2 | 7/2009 | Callaway, Jr. et al. |
| 7,564,862 B2 | 7/2009 | Srikrishna et al. |
| 7,567,547 B2 | 7/2009 | Mosko et al. |
| 7,567,577 B2 | 7/2009 | Thubert et al. |
| 7,580,380 B2 | 8/2009 | Baker et al. |
| 7,580,382 B1 | 8/2009 | Amis et al. |
| 7,580,730 B2 | 8/2009 | Tegreene |
| 7,580,782 B2 | 8/2009 | Breed et al. |
| 7,581,095 B2 | 8/2009 | Billhartz |
| 7,586,853 B2 | 9/2009 | Bonsma et al. |
| 7,586,897 B2 | 9/2009 | Ruffino et al. |
| 7,587,001 B2 | 9/2009 | Hazani et al. |
| 7,590,589 B2 | 9/2009 | Hoffberg |
| 7,593,377 B2 | 9/2009 | Thubert et al. |
| 7,593,385 B2 | 9/2009 | Roh |
| 7,596,152 B2 | 9/2009 | Yarvis et al. |
| 7,599,696 B2 | 10/2009 | Jung et al. |
| 7,602,738 B2 | 10/2009 | Preguica |
| 7,606,176 B2 | 10/2009 | Joshi et al. |
| 7,606,178 B2 | 10/2009 | Rahman et al. |
| 7,606,938 B2 | 10/2009 | Roese et al. |
| 7,609,644 B2 | 10/2009 | Tateson |
| 7,609,672 B2 | 10/2009 | Retana et al. |
| 7,616,961 B2 | 11/2009 | Billhartz |
| 7,620,366 B2 | 11/2009 | Kim et al. |
| 7,620,708 B2 | 11/2009 | Andreasen |
| 7,626,931 B2 | 12/2009 | Wu et al. |
| 7,626,966 B1 | 12/2009 | Ruiter et al. |
| 7,626,967 B2 | 12/2009 | Yarvis et al. |
| 7,633,865 B2 | 12/2009 | Andrews et al. |
| 7,633,884 B2 | 12/2009 | Kang |
| 7,634,230 B2 | 12/2009 | Ji et al. |
| 7,639,652 B1 | 12/2009 | Amis et al. |
| 7,643,467 B2 | 1/2010 | Smith et al. |
| 7,646,754 B2 | 1/2010 | McLaughlin et al. |
| 7,649,852 B2 | 1/2010 | Thubert et al. |
| 7,649,872 B2 | 1/2010 | Naghian et al. |
| 7,649,884 B1 | 1/2010 | Ahmed et al. |
| 7,649,896 B2 | 1/2010 | Yang et al. |
| 7,653,003 B2 | 1/2010 | Stine |
| 7,653,011 B2 | 1/2010 | Rahman et al. |
| 7,653,355 B2 | 1/2010 | Ji |
| 7,656,851 B1 | 2/2010 | Ghanadan et al. |
| 7,656,857 B2 | 2/2010 | Thubert et al. |
| 7,656,901 B2 | 2/2010 | Strutt et al. |
| 7,657,354 B2 | 2/2010 | Breed et al. |
| 7,657,373 B2 | 2/2010 | Kindo |
| 7,660,305 B1 | 2/2010 | Wiget et al. |
| 7,660,318 B2 | 2/2010 | Rahman et al. |
| 7,660,950 B2 | 2/2010 | Miller et al. |
| 7,664,111 B2 | 2/2010 | Tsubota |
| 7,664,538 B2 | 2/2010 | Watanabe et al. |
| 7,668,119 B2 | 2/2010 | Thubert et al. |
| 7,668,137 B2 | 2/2010 | Srikrishna et al. |
| 7,668,173 B2 | 2/2010 | Zhao |
| 7,672,307 B2 | 3/2010 | Duggi et al. |
| 7,675,863 B2 | 3/2010 | Werb et al. |
| 7,675,882 B2 | 3/2010 | Mighani et al. |
| 7,678,068 B2 | 3/2010 | Levine et al. |
| 7,680,088 B2 | 3/2010 | George et al. |
| 7,680,091 B2 | 3/2010 | Draves, Jr. et al. |
| 7,684,314 B2 | 3/2010 | Khan et al. |
| 7,688,847 B2 | 3/2010 | Kim et al. |
| 7,689,224 B2 | 3/2010 | Chari et al. |
| 7,693,064 B2 | 4/2010 | Thubert et al. |
| 7,693,093 B2 | 4/2010 | Riedel et al. |
| 7,693,167 B2 | 4/2010 | Koenck et al. |
| 7,693,484 B2 | 4/2010 | Ting et al. |
| 7,695,446 B2 | 4/2010 | Levine et al. |
| 7,697,940 B2 | 4/2010 | Jung et al. |
| 7,698,463 B2 | 4/2010 | Ogier et al. |
| 7,701,858 B2 | 4/2010 | Werb et al. |
| 7,701,935 B2 | 4/2010 | Fukuzawa et al. |
| 7,702,594 B2 | 4/2010 | Scoggins et al. |
| 7,706,282 B2 | 4/2010 | Huang |
| 7,706,327 B2 | 4/2010 | Suzuki et al. |
| 7,706,369 B2 | 4/2010 | Roese et al. |
| 7,706,842 B2 | 4/2010 | Tegreene |
| 7,710,896 B2 | 5/2010 | Bauer et al. |
| 7,710,932 B2 | 5/2010 | Muthuswamy et al. |
| 7,715,396 B2 | 5/2010 | Castro et al. |
| 7,719,988 B1 | 5/2010 | Ruiz et al. |
| 7,720,037 B2 | 5/2010 | Bill |
| 7,725,080 B2 | 5/2010 | Tegreene |
| 7,729,336 B2 | 6/2010 | Pun et al. |
| 7,733,818 B2 | 6/2010 | Twitchell, Jr. |
| 7,739,402 B2 | 6/2010 | Roese et al. |
| 7,742,399 B2 | 6/2010 | Pun |
| 7,742,430 B2 | 6/2010 | Scoggins et al. |
| 7,746,794 B2 | 6/2010 | Sink |
| 7,751,360 B2 | 7/2010 | Yagyu et al. |
| 7,751,420 B2 | 7/2010 | Tsubota |
| 7,753,795 B2 | 7/2010 | Harris et al. |

(56) References Cited

U.S. PATENT DOCUMENTS

| | | |
|---|---|---|
| 7,756,041 B2 | 7/2010 | Whitehill et al. |
| 7,760,701 B2 | 7/2010 | Levy-Abegnoli et al. |
| 7,760,735 B1 | 7/2010 | Chen et al. |
| 7,764,617 B2 | 7/2010 | Cain et al. |
| 7,768,926 B2 | 8/2010 | Bellur et al. |
| 7,768,992 B2 | 8/2010 | Pun |
| 7,773,575 B2 | 8/2010 | Rudnick |
| 7,778,235 B2 | 8/2010 | Thubert et al. |
| 7,778,270 B1 | 8/2010 | Zhang et al. |
| 7,787,361 B2 | 8/2010 | Rahman et al. |
| 7,787,450 B1 | 8/2010 | Chan et al. |
| 7,787,480 B1 | 8/2010 | Mehta et al. |
| 7,788,387 B2 | 8/2010 | Kumar et al. |
| 7,796,511 B2 | 9/2010 | Wood |
| 7,796,573 B2 | 9/2010 | Belcea |
| 7,800,812 B2 | 9/2010 | Moskowitz |
| 7,801,042 B2 | 9/2010 | Liu et al. |
| 7,808,939 B2 | 10/2010 | Bansal et al. |
| 7,808,985 B2 | 10/2010 | Romero et al. |
| 7,808,987 B2 | 10/2010 | Bauer et al. |
| 7,813,326 B1 | 10/2010 | Kelm et al. |
| 7,813,451 B2 | 10/2010 | Binder et al. |
| 7,814,322 B2 | 10/2010 | Gurevich et al. |
| 7,817,623 B2 | 10/2010 | Dawson et al. |
| 7,821,994 B2 | 10/2010 | Sherman et al. |
| 7,822,023 B2 | 10/2010 | Lahetkangas et al. |
| 7,826,372 B1 | 11/2010 | Mabe et al. |
| 7,830,820 B2 | 11/2010 | Duke et al. |
| 7,839,791 B2 | 11/2010 | Holmer et al. |
| 7,843,861 B2 | 11/2010 | Dawson et al. |
| 7,847,734 B2 | 12/2010 | Wu |
| 7,848,702 B2 | 12/2010 | Ho et al. |
| 7,848,757 B2 | 12/2010 | Duggi et al. |
| 7,849,139 B2 | 12/2010 | Wolfson et al. |
| 7,852,816 B2 | 12/2010 | Jung |
| 7,852,826 B2 | 12/2010 | Kitchin |
| 7,855,981 B2 | 12/2010 | Enomoto et al. |
| 7,859,465 B2 | 12/2010 | Wu |
| 7,860,025 B2 | 12/2010 | Thubert et al. |
| 7,860,081 B2 | 12/2010 | Dawson et al. |
| 7,860,968 B2 | 12/2010 | Bornhoevd et al. |
| 7,869,792 B1 | 1/2011 | Zhou et al. |
| 7,873,019 B2 | 1/2011 | Dawson et al. |
| 7,881,206 B2 | 2/2011 | St. Pierre et al. |
| 7,881,229 B2 | 2/2011 | Weinstein et al. |
| 7,881,474 B2 | 2/2011 | Sun |
| 7,881,667 B2 | 2/2011 | Ji et al. |
| 7,886,075 B2 | 2/2011 | Molteni et al. |
| 7,889,655 B2 | 2/2011 | Retana et al. |
| 7,889,691 B2 | 2/2011 | Chen et al. |
| 7,889,743 B2 | 2/2011 | Evans et al. |
| 7,890,112 B2 | 2/2011 | Ito et al. |
| 7,894,374 B2 | 2/2011 | Enomoto et al. |
| 7,894,416 B2 | 2/2011 | Rudnick et al. |
| 7,894,828 B2 | 2/2011 | Dawson et al. |
| 7,898,977 B2 | 3/2011 | Roese et al. |
| 7,898,979 B2 | 3/2011 | Isozu |
| 7,898,993 B2 | 3/2011 | Dawson et al. |
| 7,899,005 B2 | 3/2011 | Retana et al. |
| 7,899,027 B2 | 3/2011 | Castagnoli et al. |
| 7,902,973 B2 | 3/2011 | Thubert et al. |
| 7,905,640 B2 | 3/2011 | Gergets et al. |
| 7,911,962 B2 | 3/2011 | Khuu et al. |
| 7,912,645 B2 | 3/2011 | Breed et al. |
| 7,912,982 B2 | 3/2011 | Murphy et al. |
| 7,924,722 B2 | 4/2011 | Thubert et al. |
| 7,924,726 B2 | 4/2011 | White et al. |
| 7,924,745 B2 | 4/2011 | Hirano et al. |
| 7,924,761 B1 | 4/2011 | Stevens |
| 7,924,796 B2 | 4/2011 | Vu Duong et al. |
| 7,929,914 B2 | 4/2011 | Tegreene |
| 7,933,236 B2 | 4/2011 | Wang et al. |
| 7,936,678 B2 | 5/2011 | Paloheimo et al. |
| 7,936,697 B2 | 5/2011 | Reza et al. |
| 7,936,732 B2 | 5/2011 | Ho et al. |
| 7,940,668 B2 | 5/2011 | Retana et al. |
| 7,940,716 B2 | 5/2011 | Twitchell, Jr. |
| 7,941,188 B2 | 5/2011 | Jung et al. |
| 7,944,878 B2 | 5/2011 | Dawson et al. |
| 7,948,931 B2 | 5/2011 | Shu et al. |
| 7,948,966 B2 | 5/2011 | Hughes et al. |
| 7,957,355 B1 | 6/2011 | Heiferling et al. |
| 7,957,410 B2 | 6/2011 | Mosko et al. |
| 7,958,271 B2 | 6/2011 | Zou et al. |
| 7,961,626 B2 | 6/2011 | Reeve |
| 7,961,650 B2 | 6/2011 | Davies |
| 7,962,101 B2 | 6/2011 | Vaswani et al. |
| 7,962,154 B2 | 6/2011 | Nakakita et al. |
| 7,965,671 B2 | 6/2011 | Anderson et al. |
| 7,965,678 B2 | 6/2011 | Giacomazzi et al. |
| 7,969,914 B1 | 6/2011 | Gerber et al. |
| 7,970,418 B2 | 6/2011 | Schmidt et al. |
| 7,974,402 B2 | 7/2011 | Pun |
| 7,978,062 B2 | 7/2011 | LaLonde et al. |
| 7,978,612 B2 | 7/2011 | Retana et al. |
| 7,978,672 B2 | 7/2011 | Draves, Jr. et al. |
| 7,978,725 B2 | 7/2011 | Gong et al. |
| 7,979,311 B2 | 7/2011 | Dawson et al. |
| 7,983,239 B1 | 7/2011 | Weinstein et al. |
| 7,983,619 B2 | 7/2011 | Ji |
| 7,983,835 B2 | 7/2011 | Lagassey |
| 7,990,897 B2 | 8/2011 | Jing et al. |
| 7,990,947 B2 | 8/2011 | Twitchell, Jr. et al. |
| 7,995,501 B2 | 8/2011 | Jetcheva et al. |
| 7,995,524 B2 | 8/2011 | Lin |
| 7,996,558 B2 | 8/2011 | Hsu et al. |
| 8,005,054 B2 | 8/2011 | Isozu |
| 8,009,591 B2 | 8/2011 | Retana et al. |
| 8,014,404 B2 | 9/2011 | Eki et al. |
| 8,023,423 B2 | 9/2011 | Chiang et al. |
| 8,027,273 B2 | 9/2011 | Nguyen |
| RE42,871 E | 10/2011 | Forslow |
| 8,031,605 B2 | 10/2011 | Oyman et al. |
| 8,031,720 B2 | 10/2011 | Yagyu et al. |
| 8,032,746 B2 | 10/2011 | Boppana et al. |
| 8,035,479 B2 | 10/2011 | Tran |
| 8,040,863 B2 | 10/2011 | Dawson et al. |
| 8,041,369 B2 | 10/2011 | Smith et al. |
| 8,042,048 B2 | 10/2011 | Wilson et al. |
| 8,054,819 B2 | 11/2011 | Chamberlain et al. |
| 8,059,544 B2 | 11/2011 | Yi et al. |
| 8,059,578 B2 | 11/2011 | Rudnick |
| 8,059,620 B2 | 11/2011 | Moon |
| 8,060,017 B2 | 11/2011 | Schlicht et al. |
| 8,060,308 B2 | 11/2011 | Breed |
| 8,060,590 B2 | 11/2011 | Lobbert |
| 8,060,649 B2 | 11/2011 | Chen et al. |
| 8,064,377 B2 | 11/2011 | Yi et al. |
| 8,064,416 B2 | 11/2011 | Liu |
| 8,065,166 B2 | 11/2011 | Maresh et al. |
| 8,065,411 B2 | 11/2011 | Spiess et al. |
| 8,072,902 B2 | 12/2011 | Moon |
| 8,072,906 B2 | 12/2011 | Naghian |
| 8,072,992 B2 | 12/2011 | Deal et al. |
| 8,073,384 B2 | 12/2011 | Shuey et al. |
| 8,077,663 B2 | 12/2011 | Mighani et al. |
| 8,081,658 B2 | 12/2011 | Zuniga et al. |
| 8,085,686 B2 | 12/2011 | Thubert et al. |
| 8,089,866 B2 | 1/2012 | Smith et al. |
| 8,089,970 B2 | 1/2012 | Ramprashad et al. |
| 8,090,596 B2 | 1/2012 | Maresh et al. |
| 8,094,583 B2 | 1/2012 | Parker et al. |
| 8,098,421 B2 | 1/2012 | Moskowitz |
| 8,099,108 B2 | 1/2012 | Camp, Jr. et al. |
| 8,099,307 B2 | 1/2012 | Maresh et al. |
| 8,102,775 B2 | 1/2012 | Thubert |
| 8,106,792 B2 | 1/2012 | Chen et al. |
| 8,107,397 B1 | 1/2012 | Bagchi et al. |
| 8,108,228 B2 | 1/2012 | Maresh et al. |
| 8,108,429 B2 | 1/2012 | Sim-Tang et al. |
| 8,111,619 B2 | 2/2012 | Liu et al. |
| 8,112,082 B2 | 2/2012 | Nylander et al. |
| 8,115,617 B2 | 2/2012 | Thubert et al. |
| 8,117,440 B2 | 2/2012 | Pei et al. |

(56) References Cited

U.S. PATENT DOCUMENTS

| | | |
|---|---|---|
| 8,120,839 B2 | 2/2012 | Moskowitz |
| 8,121,086 B2 | 2/2012 | Jung et al. |
| 8,121,628 B2 | 2/2012 | Mauti, Jr. |
| 8,121,870 B2 | 2/2012 | Maresh et al. |
| 8,125,928 B2 | 2/2012 | Mehta et al. |
| 8,126,473 B1 | 2/2012 | Kim et al. |
| 8,127,039 B2 | 2/2012 | Patton et al. |
| 8,130,654 B2 | 3/2012 | Garcia-Luna-Aceves et al. |
| 8,130,656 B2 | 3/2012 | Bear et al. |
| 8,130,663 B2 | 3/2012 | Jackson et al. |
| 8,130,708 B2 | 3/2012 | Singh |
| 8,131,569 B2 | 3/2012 | Maresh et al. |
| 8,131,838 B2 | 3/2012 | Bornhoevd et al. |
| 8,134,950 B2 | 3/2012 | Pun |
| 8,134,995 B2 | 3/2012 | Duggi et al. |
| 8,135,021 B2 | 3/2012 | Westphal |
| 8,135,362 B2 | 3/2012 | LaDue |
| 8,138,690 B2 | 3/2012 | Chemel et al. |
| 8,138,934 B2 | 3/2012 | Veillette et al. |
| 8,139,504 B2 | 3/2012 | Mankins et al. |
| 8,144,595 B1 | 3/2012 | Troxel et al. |
| 8,144,596 B2 | 3/2012 | Veillette |
| 8,144,619 B2 | 3/2012 | Hoffberg |
| 8,144,671 B2 | 3/2012 | Twitchell, Jr. |
| 8,144,708 B1 | 3/2012 | Ahmed et al. |
| 8,149,716 B2 | 4/2012 | Ramanathan et al. |
| 8,149,748 B2 | 4/2012 | Bata et al. |
| 8,151,140 B2 | 4/2012 | Sim-Tang |
| 8,155,008 B2 | 4/2012 | Jetcheva et al. |
| 8,155,045 B2 | 4/2012 | Sherman et al. |
| 8,161,097 B2 | 4/2012 | Jung et al. |
| 8,161,283 B2 | 4/2012 | Metke et al. |
| 8,165,143 B2 | 4/2012 | Samajpati |
| 8,165,585 B2 | 4/2012 | Gallagher et al. |
| 8,169,974 B2 | 5/2012 | Pratt, Jr. et al. |
| 8,170,030 B2 | 5/2012 | Eriksson |
| 8,170,577 B2 | 5/2012 | Singh |
| 8,170,957 B2 | 5/2012 | Richard |
| 8,171,364 B2 | 5/2012 | Veillette |
| 8,174,381 B2 | 5/2012 | Imes et al. |
| 8,179,837 B2 | 5/2012 | Kulkarni et al. |
| 8,180,294 B2 | 5/2012 | Ting et al. |
| 8,184,681 B2 | 5/2012 | Binder et al. |
| 8,189,561 B2 | 5/2012 | Karaoguz et al. |
| 8,194,541 B2 | 6/2012 | Leppanen et al. |
| 8,195,483 B2 | 6/2012 | Maresh et al. |
| 8,195,628 B2 | 6/2012 | Sim-Tang |
| 8,199,753 B2 | 6/2012 | Mehta et al. |
| 8,200,246 B2 | 6/2012 | Khosravy et al. |
| 8,203,463 B2 | 6/2012 | Bragg et al. |
| 8,203,464 B2 | 6/2012 | Billhartz et al. |
| 8,203,971 B2 | 6/2012 | Niranjan et al. |
| 8,208,368 B2 | 6/2012 | Holliday |
| 8,208,465 B2 | 6/2012 | Ko et al. |
| 8,213,352 B2 | 7/2012 | Watanabe et al. |
| 8,213,409 B2 | 7/2012 | Rudnick et al. |
| 8,213,895 B2 | 7/2012 | Hurwitz et al. |
| 8,217,805 B2 | 7/2012 | Billhartz et al. |
| 8,218,519 B1 | 7/2012 | Chamberlain et al. |
| 8,218,522 B2 | 7/2012 | Sy et al. |
| 8,223,680 B2 | 7/2012 | Twitchell, Jr. |
| 8,228,954 B2 | 7/2012 | Thubert et al. |
| 8,230,108 B2 | 7/2012 | Pratt, Jr. et al. |
| 8,232,745 B2 | 7/2012 | Chemel et al. |
| 8,233,463 B2 | 7/2012 | Yang |
| 8,238,288 B2 | 8/2012 | Ahn |
| 8,238,346 B2 | 8/2012 | Howe et al. |
| 8,239,169 B2 | 8/2012 | Gregory et al. |
| 8,243,603 B2 | 8/2012 | Gossain et al. |
| 8,248,947 B2 | 8/2012 | Li et al. |
| 8,249,101 B2 | 8/2012 | Crain, Jr. et al. |
| 8,249,984 B2 | 8/2012 | Dawson et al. |
| 8,254,348 B2 | 8/2012 | Wright et al. |
| 8,255,469 B2 | 8/2012 | Leppanen et al. |
| 8,256,681 B2 | 9/2012 | Wang |
| 8,266,657 B2 | 9/2012 | Margulis |
| 8,270,302 B2 | 9/2012 | Chu et al. |
| 8,270,341 B2 | 9/2012 | Langguth et al. |
| 8,271,449 B2 | 9/2012 | Jung et al. |
| 8,275,824 B2 | 9/2012 | Jung et al. |
| 8,280,345 B2 | 10/2012 | Twitchell, Jr. |
| 8,284,045 B2 | 10/2012 | Twitchell, Jr. |
| 8,284,670 B2 | 10/2012 | Suzuki et al. |
| 8,284,741 B2 | 10/2012 | Twitchell, Jr. |
| 8,289,182 B2 | 10/2012 | Vogel et al. |
| 8,289,186 B2 | 10/2012 | Osafune |
| 8,291,112 B2 | 10/2012 | Vasseur et al. |
| 8,300,538 B2 | 10/2012 | Kim et al. |
| 8,300,551 B2 | 10/2012 | Koop et al. |
| 8,300,615 B2 | 10/2012 | Copeland et al. |
| 8,311,533 B1 | 11/2012 | Alcorn |
| 8,314,717 B2 | 11/2012 | Billhartz et al. |
| 8,315,218 B2 | 11/2012 | Kim et al. |
| 8,315,231 B2 | 11/2012 | Pirzada et al. |
| 8,315,565 B2 | 11/2012 | Twitchell, Jr. |
| 8,315,636 B2 | 11/2012 | Moon et al. |
| 8,319,658 B2 | 11/2012 | Conant et al. |
| 8,319,833 B2 | 11/2012 | Weinstein et al. |
| 8,320,288 B2 | 11/2012 | Sakoda |
| 8,320,302 B2 | 11/2012 | Richeson et al. |
| 8,320,414 B2 | 11/2012 | Dawson et al. |
| 8,323,189 B2 | 12/2012 | Tran et al. |
| 8,325,612 B1 | 12/2012 | Ruiz et al. |
| 8,325,627 B2 | 12/2012 | Pratt, Jr. et al. |
| 8,330,649 B2 | 12/2012 | Menouar et al. |
| 8,331,262 B2 | 12/2012 | Hu et al. |
| 8,332,055 B2 | 12/2012 | Veillette |
| 8,334,787 B2 | 12/2012 | Bushman et al. |
| 8,335,164 B2 | 12/2012 | Liu |
| 8,335,207 B2 | 12/2012 | Singh et al. |
| 8,335,814 B2 | 12/2012 | Jung et al. |
| 8,335,989 B2 | 12/2012 | Barraclough et al. |
| 8,339,069 B2 | 12/2012 | Chemel et al. |
| 8,339,948 B2 | 12/2012 | Ramprashad et al. |
| 8,341,279 B2 | 12/2012 | Thubert et al. |
| 8,341,289 B2 | 12/2012 | Hellhake et al. |
| 8,345,098 B2 | 1/2013 | Grigsby et al. |
| 8,345,555 B2 | 1/2013 | Sendrowicz |
| 8,346,846 B2 | 1/2013 | Jung et al. |
| 8,351,339 B2 | 1/2013 | Zhen et al. |
| 8,352,420 B2 | 1/2013 | Jung et al. |
| 8,355,410 B2 | 1/2013 | Hall |
| 8,356,078 B2 | 1/2013 | Fein et al. |
| 8,358,660 B2 | 1/2013 | Pacella et al. |
| 8,359,643 B2 | 1/2013 | Low et al. |
| 8,363,662 B2 | 1/2013 | Thubert et al. |
| 8,364,648 B1 | 1/2013 | Sim-Tang |
| 8,368,321 B2 | 2/2013 | Chemel et al. |
| 8,369,216 B2 | 2/2013 | Kan |
| 8,369,880 B2 | 2/2013 | Citrano, III et al. |
| 8,370,697 B2 | 2/2013 | Veillette |
| 8,370,894 B2 | 2/2013 | Costa et al. |
| 8,373,362 B2 | 2/2013 | Chemel et al. |
| 8,373,556 B2 | 2/2013 | LaLonde et al. |
| 8,373,588 B2 | 2/2013 | Kuhn |
| 8,374,352 B2 | 2/2013 | Song et al. |
| 8,385,322 B2 | 2/2013 | Colling et al. |
| 8,385,550 B2 | 2/2013 | Sun |
| 8,386,278 B2 | 2/2013 | Maresh et al. |
| 8,391,271 B2 | 3/2013 | Mo et al. |
| 8,391,778 B2 | 3/2013 | Wang et al. |
| 8,392,541 B2 | 3/2013 | Agarwal et al. |
| 8,395,498 B2 | 3/2013 | Gaskill et al. |
| 8,396,602 B2 | 3/2013 | Imes et al. |
| 8,400,507 B2 | 3/2013 | Grigsby et al. |
| 8,401,464 B2 | 3/2013 | Wang et al. |
| 8,401,564 B2 | 3/2013 | Singh |
| 8,406,153 B2 | 3/2013 | Vasseur et al. |
| 8,406,177 B2 | 3/2013 | Sendrowicz |
| 8,406,239 B2 | 3/2013 | Hurwitz et al. |
| 8,406,248 B2 | 3/2013 | Pratt, Jr. et al. |
| 8,406,252 B1 | 3/2013 | Wuthnow et al. |
| 8,422,497 B2 | 4/2013 | Kang et al. |
| 8,422,957 B2 | 4/2013 | Ji |

(56) References Cited

U.S. PATENT DOCUMENTS

| | | |
|---|---|---|
| 8,428,517 B2 | 4/2013 | Ting et al. |
| 8,432,820 B2 | 4/2013 | Liu et al. |
| 8,441,958 B2 | 5/2013 | Thubert et al. |
| 8,442,023 B2 | 5/2013 | Ghanadan et al. |
| 8,442,057 B2 | 5/2013 | Howe et al. |
| 8,442,520 B2 | 5/2013 | Alcorn |
| 8,447,419 B1 | 5/2013 | de Anda Fast |
| 8,447,849 B2 | 5/2013 | Shaffer et al. |
| 8,447,875 B2 | 5/2013 | Liu et al. |
| 8,451,744 B2 | 5/2013 | Vasseur |
| 8,451,807 B2 | 5/2013 | Yi et al. |
| 8,457,005 B2 | 6/2013 | Brown, III et al. |
| 8,462,691 B2 | 6/2013 | Tateson |
| 8,463,238 B2 | 6/2013 | Forstall et al. |
| 8,467,297 B2 | 6/2013 | Liu et al. |
| 8,467,309 B2 | 6/2013 | Chan et al. |
| 8,467,991 B2 | 6/2013 | Khosravy et al. |
| 8,472,348 B2 | 6/2013 | Hui et al. |
| 8,473,616 B2 | 6/2013 | Eriksson |
| 8,473,633 B2 | 6/2013 | Eardley |
| 8,473,989 B2 | 6/2013 | Bahl et al. |
| 8,475,368 B2 | 7/2013 | Tran et al. |
| 8,477,687 B2 | 7/2013 | Iwasa |
| 8,477,689 B2 | 7/2013 | Zhang et al. |
| 8,483,616 B1 | 7/2013 | Hall |
| 8,484,661 B2 | 7/2013 | Walsh |
| 8,488,589 B2 | 7/2013 | Rudnick et al. |
| 8,489,701 B2 | 7/2013 | Manion et al. |
| 8,489,765 B2 | 7/2013 | Vasseur et al. |
| 8,493,849 B2 | 7/2013 | Fuste Vilella et al. |
| 8,494,458 B2 | 7/2013 | Tucker et al. |
| 8,495,244 B2 | 7/2013 | Bonar et al. |
| 8,496,181 B2 | 7/2013 | Wang |
| 8,498,224 B2 | 7/2013 | Thubert et al. |
| 8,502,148 B2 | 8/2013 | Wagner et al. |
| 8,502,640 B2 | 8/2013 | Veillette |
| 8,503,309 B2 | 8/2013 | Vasseur et al. |
| 8,503,677 B2 | 8/2013 | Yao et al. |
| 8,503,934 B2 | 8/2013 | Beghini et al. |
| 8,504,921 B2 | 8/2013 | Wilson et al. |
| 8,509,109 B2 | 8/2013 | Guo et al. |
| 8,509,245 B1 | 8/2013 | Kim et al. |
| 8,509,248 B2 | 8/2013 | Mehta et al. |
| 8,509,762 B2 | 8/2013 | Li et al. |
| 8,509,765 B2 | 8/2013 | Alcorn |
| 8,510,025 B2 | 8/2013 | Chan et al. |
| 8,514,758 B2 | 8/2013 | De Kimpe et al. |
| 8,514,825 B1 | 8/2013 | Addepalli et al. |
| 8,514,915 B2 | 8/2013 | Binder et al. |
| 8,515,409 B2 | 8/2013 | Ramo et al. |
| 8,515,547 B2 | 8/2013 | Mass et al. |
| 8,516,575 B2 | 8/2013 | Burnside et al. |
| 8,520,535 B2 | 8/2013 | Dawson et al. |
| 8,520,676 B2 | 8/2013 | Shaffer et al. |
| 8,521,156 B2 | 8/2013 | Alcorn |
| 8,525,692 B2 | 9/2013 | Mason, Jr. et al. |
| 8,527,457 B2 | 9/2013 | Moon et al. |
| 8,527,622 B2 | 9/2013 | Moreira Sa de Souza |
| 8,531,134 B2 | 9/2013 | Chemel et al. |
| 8,532,071 B2 | 9/2013 | Seok |
| 8,533,465 B2 | 9/2013 | Trostle |
| 8,533,758 B2 | 9/2013 | Ruiz-Velasco |
| 8,536,802 B2 | 9/2013 | Chemel et al. |
| 8,537,714 B2 | 9/2013 | Liu |
| 8,543,249 B2 | 9/2013 | Chemel et al. |
| 8,543,809 B2 | 9/2013 | Graffi et al. |
| 8,544,023 B2 | 9/2013 | Sim-Tang et al. |
| 8,547,875 B2 | 10/2013 | Adams et al. |
| 8,547,943 B2 | 10/2013 | Bill |
| 8,547,981 B2 | 10/2013 | Wood |
| 8,548,607 B1 | 10/2013 | Belz et al. |
| 8,552,664 B2 | 10/2013 | Chemel et al. |
| 8,553,586 B2 | 10/2013 | Smith et al. |
| 8,553,688 B2 | 10/2013 | Vasseur et al. |
| 8,554,232 B2 | 10/2013 | Wang |
| 8,559,434 B2 | 10/2013 | Esteve Rothenberg et al. |
| 8,559,442 B2 | 10/2013 | Vasseur et al. |
| 8,559,447 B2 | 10/2013 | Jetcheva et al. |
| 8,560,274 B2 | 10/2013 | Gregory et al. |
| 8,561,200 B2 | 10/2013 | Costa et al. |
| 8,570,892 B2 | 10/2013 | Ghanadan et al. |
| 8,570,954 B2 | 10/2013 | Wu et al. |
| 8,571,004 B2 | 10/2013 | Chamberlain et al. |
| 8,571,046 B2 | 10/2013 | Romero et al. |
| 8,571,518 B2 | 10/2013 | Imes et al. |
| 8,571,519 B2 | 10/2013 | Ginzboorg |
| 8,577,391 B2 | 11/2013 | Parker et al. |
| 8,578,015 B2 | 11/2013 | Billhartz |
| 8,578,054 B2 | 11/2013 | Thubert et al. |
| 8,582,470 B2 | 11/2013 | Collins et al. |
| 8,582,491 B2 | 11/2013 | Weerakoon et al. |
| 8,583,671 B2 | 11/2013 | Martin et al. |
| 8,583,978 B2 | 11/2013 | Shaffer et al. |
| 8,587,427 B2 | 11/2013 | LaLonde et al. |
| 8,588,108 B2 | 11/2013 | Vasseur et al. |
| 8,593,135 B2 | 11/2013 | Chemel et al. |
| 8,593,419 B2 | 11/2013 | Thorn |
| 8,593,986 B2 | 11/2013 | Vasseur et al. |
| 8,595,359 B2 | 11/2013 | Shaffer et al. |
| 8,599,822 B2 | 12/2013 | Castagnoli |
| 8,600,830 B2 | 12/2013 | Hoffberg |
| 8,605,671 B2 | 12/2013 | Lin |
| 8,610,376 B2 | 12/2013 | Chemel et al. |
| 8,610,377 B2 | 12/2013 | Chemel et al. |
| 8,611,256 B2 | 12/2013 | Zou et al. |
| 8,612,386 B2 | 12/2013 | Tien et al. |
| 8,612,583 B2 | 12/2013 | Hui et al. |
| 8,615,257 B2 | 12/2013 | Khosravy et al. |
| 8,619,576 B2 | 12/2013 | Vasseur et al. |
| 8,619,644 B2 | 12/2013 | Argyriou |
| 8,619,789 B2 | 12/2013 | Hui et al. |
| 8,620,772 B2 | 12/2013 | Owen |
| 8,620,784 B2 | 12/2013 | Dawson et al. |
| 8,621,201 B2 | 12/2013 | Costa et al. |
| 8,621,577 B2 | 12/2013 | Choi et al. |
| 8,622,837 B2 | 1/2014 | Harris et al. |
| 8,624,771 B2 | 1/2014 | Kuhn |
| 8,625,515 B2 | 1/2014 | Liu et al. |
| 8,625,574 B2 | 1/2014 | Twitchell, Jr. et al. |
| 8,626,344 B2 | 1/2014 | Imes et al. |
| 8,626,844 B2 | 1/2014 | Schulzrinne et al. |
| 8,626,948 B2 | 1/2014 | Holmer et al. |
| 8,630,177 B2 | 1/2014 | Vasseur et al. |
| 8,630,275 B2 | 1/2014 | Ji et al. |
| 8,630,291 B2 | 1/2014 | Shaffer et al. |
| 8,630,314 B2 | 1/2014 | York |
| 8,631,101 B2 | 1/2014 | Shaffer et al. |
| 8,636,395 B2 | 1/2014 | Gergets et al. |
| 8,638,667 B2 | 1/2014 | Shaffer et al. |
| 8,638,762 B2 | 1/2014 | Tiwari |
| 8,638,763 B2 | 1/2014 | Comstock et al. |
| 8,652,038 B2 | 2/2014 | Tran et al. |
| 8,654,627 B2 | 2/2014 | Datz et al. |
| 8,654,649 B2 | 2/2014 | Vasseur et al. |
| 8,654,782 B2 | 2/2014 | Meil et al. |
| 8,660,108 B2 | 2/2014 | Pratt, Jr. et al. |
| 8,665,890 B2 | 3/2014 | Yousefi'zadeh et al. |
| 8,667,084 B2 | 3/2014 | Vasseur et al. |
| 8,670,302 B2 | 3/2014 | Pan et al. |
| 8,670,374 B2 | 3/2014 | Bata et al. |
| 8,670,416 B2 | 3/2014 | Ree et al. |
| 8,670,746 B2 | 3/2014 | Pratt, Jr. et al. |
| 8,670,749 B2 | 3/2014 | Pratt, Jr. et al. |
| 8,675,645 B2 | 3/2014 | Bahr |
| 8,675,678 B2 | 3/2014 | Farrag et al. |
| 8,681,693 B2 | 3/2014 | Kennedy et al. |
| 8,682,982 B2 | 3/2014 | Jung et al. |
| 8,687,558 B2 | 4/2014 | Jackson et al. |
| 8,687,946 B2 | 4/2014 | Sathish et al. |
| 8,688,041 B2 | 4/2014 | Ji et al. |
| 8,693,322 B2 | 4/2014 | Zhang |
| 8,693,345 B2 | 4/2014 | Lee et al. |
| 8,693,366 B2 | 4/2014 | Furukawa et al. |
| 8,693,372 B2 | 4/2014 | Corson et al. |

(56) References Cited

U.S. PATENT DOCUMENTS

| | | | |
|---|---|---|---|
| 8,693,399 | B2 | 4/2014 | Hirata et al. |
| 8,699,333 | B2 | 4/2014 | Vasseur et al. |
| 8,699,368 | B2 | 4/2014 | Hui et al. |
| 8,699,377 | B2 | 4/2014 | Veillette |
| 8,699,410 | B2 | 4/2014 | Retana et al. |
| 8,700,301 | B2 | 4/2014 | Khosravy et al. |
| 8,700,302 | B2 | 4/2014 | Khosravy et al. |
| 8,700,536 | B2 | 4/2014 | Richard |
| 8,700,749 | B2 | 4/2014 | Elliott et al. |
| 8,705,379 | B2 | 4/2014 | Wu et al. |
| 8,705,522 | B2 | 4/2014 | Markki et al. |
| 8,706,072 | B2 | 4/2014 | Kim et al. |
| 8,707,785 | B2 | 4/2014 | Goodman et al. |
| 8,711,704 | B2 | 4/2014 | Werb et al. |
| 8,711,818 | B2 | 4/2014 | Rajappan et al. |
| 8,712,711 | B2 | 4/2014 | Nayar et al. |
| 8,715,072 | B2 | 5/2014 | Harris et al. |
| 8,718,055 | B2 | 5/2014 | Vasseur et al. |
| 8,718,093 | B2 | 5/2014 | Zuniga et al. |
| 8,719,563 | B2 | 5/2014 | Kojima et al. |
| 8,724,508 | B2 | 5/2014 | Chiang et al. |
| 8,724,533 | B2 | 5/2014 | Thubert et al. |
| 8,725,274 | B2 | 5/2014 | Veillette |
| 8,727,978 | B2 | 5/2014 | Tran et al. |
| 8,730,047 | B2 | 5/2014 | Ridder et al. |
| 8,730,875 | B2 | 5/2014 | Noda |
| 8,732,454 | B2 | 5/2014 | Furukawa et al. |
| 8,732,727 | B2 | 5/2014 | Walsh |
| 8,737,206 | B2 | 5/2014 | Li et al. |
| 8,737,268 | B2 | 5/2014 | Jetcheva et al. |
| 8,738,944 | B2 | 5/2014 | Addepalli et al. |
| 8,743,750 | B2 | 6/2014 | Tourolle et al. |
| 8,743,768 | B2 | 6/2014 | Vasseur et al. |
| 8,743,866 | B2 | 6/2014 | Vasseur |
| 8,744,516 | B2 | 6/2014 | Gurevich |
| 8,747,313 | B2 | 6/2014 | Tran et al. |
| 8,750,100 | B2 | 6/2014 | Guo et al. |
| 8,750,167 | B2 | 6/2014 | Waheed |
| 8,750,242 | B2 | 6/2014 | Forte et al. |
| 8,751,063 | B2 | 6/2014 | Bernstein et al. |
| 8,751,644 | B2 | 6/2014 | Bornhoevd et al. |
| 8,754,589 | B2 | 6/2014 | Chemel et al. |
| 8,755,294 | B2 | 6/2014 | Isozu |
| 8,755,331 | B2 | 6/2014 | Boland et al. |
| 8,755,336 | B2 | 6/2014 | Kondo et al. |
| 8,755,763 | B2 | 6/2014 | Qureshey et al. |
| 8,756,449 | B2 | 6/2014 | Shaffer et al. |
| 8,760,339 | B2 | 6/2014 | Kuhn |
| 8,761,125 | B2 | 6/2014 | Lea |
| 8,761,175 | B2 | 6/2014 | Guha et al. |
| 8,761,285 | B2 | 6/2014 | Addepalli et al. |
| 8,762,518 | B2 | 6/2014 | Chen et al. |
| 8,762,747 | B2 | 6/2014 | Liu et al. |
| 8,762,852 | B2 | 6/2014 | Davis et al. |
| 8,769,442 | B2 | 7/2014 | Khosravy et al. |
| 8,774,050 | B2 | 7/2014 | Vasseur et al. |
| 8,774,189 | B2 | 7/2014 | Eriksson |
| 8,774,192 | B2 | 7/2014 | Das et al. |
| 8,774,946 | B2 | 7/2014 | Nrusimhan N.V. et al. |
| 8,780,201 | B1 | 7/2014 | Scalisi et al. |
| 8,780,762 | B2 | 7/2014 | Patil et al. |
| 8,780,920 | B2 | 7/2014 | Bahr et al. |
| 8,780,953 | B2 | 7/2014 | Shaffer et al. |
| 8,781,462 | B2 | 7/2014 | Osterloh et al. |
| 8,787,246 | B2 | 7/2014 | Brownrigg |
| 8,787,392 | B2 | 7/2014 | Vasseur et al. |
| 8,787,944 | B2 | 7/2014 | Smith |
| 8,788,516 | B1 | 7/2014 | Jakubik |
| 8,788,899 | B2 | 7/2014 | Hiie |
| 8,792,154 | B2 | 7/2014 | Moskowitz |
| 8,792,850 | B2 | 7/2014 | Qureshey et al. |
| 8,792,880 | B2 | 7/2014 | Alcorn |
| 8,797,878 | B1 | 8/2014 | Ruiz et al. |
| 8,797,944 | B2 | 8/2014 | Choi et al. |
| 8,798,084 | B2 | 8/2014 | Pratt, Jr. et al. |
| 8,798,094 | B2 | 8/2014 | Wuthnow et al. |
| 8,799,220 | B2 | 8/2014 | O'Malley |
| 8,799,510 | B2 | 8/2014 | Vasseur et al. |
| 8,800,010 | B2 | 8/2014 | Hui et al. |
| 8,804,603 | B2 | 8/2014 | Powell, III et al. |
| 8,804,613 | B2 | 8/2014 | Iwasa |
| 8,805,550 | B2 | 8/2014 | Chemel et al. |
| 8,806,573 | B2 | 8/2014 | Mahamuni et al. |
| 8,806,633 | B2 | 8/2014 | Shaffer et al. |
| 8,811,188 | B1 | 8/2014 | Bagchi et al. |
| 8,812,419 | B1 | 8/2014 | Teller et al. |
| 8,817,665 | B2 | 8/2014 | Thubert et al. |
| 8,817,795 | B2 | 8/2014 | Wong et al. |
| 8,818,322 | B2 | 8/2014 | Murphy et al. |
| 8,818,522 | B2 | 8/2014 | Mass et al. |
| 8,819,172 | B2 | 8/2014 | Davis et al. |
| 8,819,191 | B2 | 8/2014 | Hui et al. |
| 8,821,293 | B2 | 9/2014 | Hall |
| 8,823,277 | B2 | 9/2014 | Chemel et al. |
| 8,823,795 | B1 | 9/2014 | Scalisi et al. |
| 8,824,336 | B2 | 9/2014 | Jing et al. |
| 8,824,380 | B2 | 9/2014 | Jetcheva et al. |
| 8,824,471 | B2 | 9/2014 | Hui et al. |
| 8,830,837 | B2 | 9/2014 | Vasseur et al. |
| 8,831,279 | B2 | 9/2014 | Rodriguez et al. |
| 8,831,869 | B2 | 9/2014 | Bai et al. |
| 8,832,428 | B2 | 9/2014 | Ota et al. |
| 8,837,277 | B2 | 9/2014 | Vasseur et al. |
| 8,837,528 | B2 | 9/2014 | Harris et al. |
| 8,841,859 | B2 | 9/2014 | Chemel et al. |
| 8,842,180 | B1 | 9/2014 | Kasmir et al. |
| 8,842,630 | B2 | 9/2014 | Shaffer et al. |
| 8,842,659 | B2 | 9/2014 | Conan et al. |
| 8,843,156 | B2 | 9/2014 | Prince et al. |
| 8,843,241 | B2 | 9/2014 | Saberi et al. |
| 8,848,721 | B2 | 9/2014 | Turunen et al. |
| 8,848,970 | B2 | 9/2014 | Aller et al. |
| 8,855,794 | B2 | 10/2014 | Imes et al. |
| 8,855,830 | B2 | 10/2014 | Imes et al. |
| 8,856,252 | B2 | 10/2014 | Leppanen et al. |
| 8,856,323 | B2 | 10/2014 | Enns et al. |
| 8,861,390 | B2 | 10/2014 | Hui et al. |
| 8,862,774 | B2 | 10/2014 | Vasseur et al. |
| 8,866,408 | B2 | 10/2014 | Chemel et al. |
| 8,867,329 | B2 | 10/2014 | Hui et al. |
| 8,868,374 | B2 | 10/2014 | Khosravy et al. |
| 8,872,379 | B2 | 10/2014 | Ruiz et al. |
| 8,872,767 | B2 | 10/2014 | Khosravy et al. |
| 8,872,915 | B1 | 10/2014 | Scalisi et al. |
| 8,873,391 | B2 | 10/2014 | Brown et al. |
| 8,873,526 | B2 | 10/2014 | Shaffer et al. |
| 8,874,477 | B2 | 10/2014 | Hoffberg |
| 8,874,788 | B2 | 10/2014 | Vasseur et al. |
| 8,879,604 | B2 | 11/2014 | Woo et al. |
| 8,879,613 | B1 | 11/2014 | Hui et al. |
| 8,880,060 | B2 | 11/2014 | Alcorn |
| 8,885,501 | B2 | 11/2014 | Vasseur et al. |
| 8,885,630 | B2 | 11/2014 | Pun et al. |
| 8,886,227 | B2 | 11/2014 | Schmidt et al. |
| 8,891,534 | B2 | 11/2014 | Vasseur et al. |
| 8,891,588 | B1 | 11/2014 | Hui et al. |
| 8,892,135 | B2 | 11/2014 | Werb et al. |
| 8,892,271 | B2 | 11/2014 | Breed |
| 8,892,769 | B2 | 11/2014 | Pratt, Jr. et al. |
| 8,897,158 | B2 | 11/2014 | Brown et al. |
| 8,897,745 | B2 | 11/2014 | Davis et al. |
| 8,902,794 | B2 | 12/2014 | Shah et al. |
| 8,902,904 | B2 | 12/2014 | Gast et al. |
| 8,908,516 | B2 | 12/2014 | Tzamaloukas et al. |
| 8,908,536 | B2 | 12/2014 | Hui et al. |
| 8,908,621 | B2 | 12/2014 | Vasseur et al. |
| 8,908,626 | B2 | 12/2014 | Hui et al. |
| 8,918,480 | B2 | 12/2014 | Qureshey et al. |
| 8,918,691 | B2 | 12/2014 | Hiie |
| 8,923,186 | B1 | 12/2014 | daCosta |
| 8,923,302 | B2 | 12/2014 | Eriksson |
| 8,923,422 | B2 | 12/2014 | Hui et al. |
| 8,925,084 | B2 | 12/2014 | Thubert et al. |
| 8,929,375 | B2 | 1/2015 | Iwao et al. |

(56) References Cited

U.S. PATENT DOCUMENTS

| | | | |
|---|---|---|---|
| 8,930,361 B2 | 1/2015 | Heinonen et al. |
| 8,930,374 B2 | 1/2015 | Boldyrev et al. |
| 8,934,366 B2 | 1/2015 | Hui et al. |
| 8,934,496 B2 | 1/2015 | Vasseur |
| 8,937,886 B2 | 1/2015 | Shaffer et al. |
| 8,938,270 B2 | 1/2015 | Singh |
| 8,942,120 B2 | 1/2015 | Toshiaki et al. |
| 8,942,197 B2 | 1/2015 | Rudnick et al. |
| 8,942,219 B2 | 1/2015 | Pratt, Jr. et al. |
| 8,942,301 B2 | 1/2015 | Hui et al. |
| 8,948,015 B2 | 2/2015 | Jetcheva et al. |
| 8,948,046 B2 | 2/2015 | Kang et al. |
| 8,948,052 B2 | 2/2015 | Ghanadan et al. |
| 8,948,229 B2 | 2/2015 | Hui et al. |
| 8,949,959 B2 | 2/2015 | Mahamuni et al. |
| 8,953,457 B2 | 2/2015 | Zou et al. |
| 8,954,170 B2 | 2/2015 | Chemel et al. |
| 8,954,582 B2 | 2/2015 | Vasseur et al. |
| 8,958,291 B2 | 2/2015 | Ji et al. |
| 8,958,339 B2 | 2/2015 | Le et al. |
| 8,958,417 B2 | 2/2015 | Zhao et al. |
| 8,959,539 B2 | 2/2015 | Adimatyam et al. |
| 8,964,747 B2 | 2/2015 | Albert Hu |
| 8,964,762 B2 | 2/2015 | Hui et al. |
| 8,964,773 B2 | 2/2015 | Brown, III et al. |
| 8,964,787 B2 | 2/2015 | McMullin et al. |
| 8,965,288 B2 | 2/2015 | Barnes et al. |
| 8,966,018 B2 | 2/2015 | Bugwadia et al. |
| 8,966,046 B2 | 2/2015 | Preden et al. |
| 8,966,557 B2 | 2/2015 | Corson |
| 8,970,392 B2 | 3/2015 | LaLonde et al. |
| 8,970,394 B2 | 3/2015 | Veillette |
| 8,971,188 B2 | 3/2015 | Vasseur et al. |
| 8,972,159 B2 | 3/2015 | Ferreira et al. |
| 8,972,589 B2 | 3/2015 | Roese et al. |
| 8,976,007 B2 | 3/2015 | Dugan et al. |
| 8,976,728 B2 | 3/2015 | Ghanadan et al. |
| 8,982,708 B1 | 3/2015 | McCabe et al. |
| 8,982,856 B2 | 3/2015 | Brownrigg |
| 8,984,277 B2 | 3/2015 | Dasgupta et al. |
| 8,988,990 B2 | 3/2015 | Stamatelakis et al. |
| 8,989,052 B2 | 3/2015 | Jing et al. |
| 8,995,251 B2 | 3/2015 | Huang et al. |
| 8,996,666 B2 | 3/2015 | Vasseur |
| 9,001,645 B2 | 4/2015 | Hellhake et al. |
| 9,001,669 B2 | 4/2015 | Vasseur et al. |
| 9,001,676 B2 | 4/2015 | Hui et al. |
| 9,001,787 B1 | 4/2015 | Conant et al. |
| 9,003,065 B2 | 4/2015 | Rothstein et al. |
| 9,008,092 B2 | 4/2015 | Thubert et al. |
| 9,013,173 B2 | 4/2015 | Veillette |
| 9,013,983 B2 | 4/2015 | Vasseur et al. |
| 9,019,846 B2 | 4/2015 | Shaffer et al. |
| 9,020,008 B2 | 4/2015 | Hui et al. |
| 9,026,039 B2 | 5/2015 | Wang et al. |
| 9,026,273 B2 | 5/2015 | Ziarno |
| 9,026,279 B2 | 5/2015 | Ziarno |
| 9,026,336 B2 | 5/2015 | Ziarno |
| 9,030,939 B2 | 5/2015 | Hui et al. |
| 9,037,896 B2 | 5/2015 | Addepalli et al. |
| 9,041,349 B2 | 5/2015 | Bemmel et al. |
| 9,042,267 B2 | 5/2015 | Bill |
| 9,054,952 B2 | 6/2015 | Rothstein et al. |
| 9,055,105 B2 | 6/2015 | Leppanen et al. |
| 9,055,521 B2 | 6/2015 | Iwasa |
| 9,059,929 B2 | 6/2015 | Sudhaakar et al. |
| 9,060,023 B2 | 6/2015 | Twitchell, Jr. et al. |
| 9,060,322 B2 | 6/2015 | Zou et al. |
| 9,060,386 B2 | 6/2015 | Cha et al. |
| 9,071,533 B2 | 6/2015 | Hui et al. |
| 9,072,100 B2 | 6/2015 | Vasseur et al. |
| 9,072,133 B2 | 6/2015 | Chemel et al. |
| 9,077,637 B2 | 7/2015 | Boland et al. |
| 9,077,772 B2 | 7/2015 | Hui et al. |
| 9,081,567 B1 | 7/2015 | Mahamuni et al. |
| 9,083,627 B2 | 7/2015 | Vasseur et al. |
| 9,084,120 B2 | 7/2015 | Frei |
| 9,088,983 B2 | 7/2015 | Hui et al. |
| 9,094,324 B2 | 7/2015 | Vasseur et al. |
| 9,094,853 B2 | 7/2015 | Ghanadan et al. |
| 9,100,285 B1 | 8/2015 | Choudhury et al. |
| 9,100,772 B2 | 8/2015 | Jantunen et al. |
| 9,100,989 B2 | 8/2015 | Ray et al. |
| 9,106,555 B2 | 8/2015 | Agarwal et al. |
| 9,112,805 B2 | 8/2015 | Hui et al. |
| 9,118,539 B2 | 8/2015 | Vasseur et al. |
| 9,119,130 B2 | 8/2015 | Hui et al. |
| 9,119,142 B2 | 8/2015 | Espina Perez et al. |
| 9,119,179 B1 | 8/2015 | Firoiu et al. |
| 9,124,482 B2 | 9/2015 | Vasseur et al. |
| 9,125,254 B2 | 9/2015 | Chemel et al. |
| 9,128,172 B2 | 9/2015 | Chan et al. |
| 9,128,689 B2 | 9/2015 | Shaffer et al. |
| 9,130,863 B2 | 9/2015 | Vasseur et al. |
| 9,143,456 B2 | 9/2015 | Shaffer et al. |
| 9,143,912 B2 | 9/2015 | Leppanen |
| 9,143,975 B2 | 9/2015 | Ghanadan et al. |
| 9,148,373 B2 | 9/2015 | Kahng et al. |
| 9,148,391 B2 | 9/2015 | Santoso et al. |
| 9,152,146 B2 | 10/2015 | Ziarno |
| 9,154,370 B2 | 10/2015 | Hui et al. |
| 9,154,407 B2 | 10/2015 | Hui et al. |
| 9,154,982 B2 | 10/2015 | Chan et al. |
| 9,155,020 B1 | 10/2015 | Graffagnino et al. |
| 9,160,553 B2 | 10/2015 | Wu et al. |
| 9,160,760 B2 | 10/2015 | Vasseur et al. |
| 9,161,257 B2 | 10/2015 | Ghanadan et al. |
| 9,161,290 B2 | 10/2015 | Troxel et al. |
| 9,166,845 B2 | 10/2015 | Hui et al. |
| 9,166,880 B2 | 10/2015 | Shaffer et al. |
| 9,166,908 B2 | 10/2015 | Vasseur |
| 9,167,496 B2 | 10/2015 | Jetcheva et al. |
| 9,172,613 B2 | 10/2015 | Hui et al. |
| 9,172,636 B2 | 10/2015 | Agarwal et al. |
| 9,172,662 B2 | 10/2015 | Chang et al. |
| 9,172,738 B1 | 10/2015 | daCosta |
| 9,172,812 B2 | 10/2015 | Katpelly et al. |
| 9,173,168 B2 | 10/2015 | Rodriguez et al. |
| 9,173,245 B2 | 10/2015 | Bill |
| 9,176,832 B2 | 11/2015 | Vasseur et al. |
| 9,179,353 B2 | 11/2015 | Ghanadan et al. |
| 9,185,070 B2 | 11/2015 | McPhee |
| 9,185,521 B2 | 11/2015 | Leppanen et al. |
| 9,189,822 B2 | 11/2015 | Conant et al. |
| 9,191,303 B2 | 11/2015 | Fuste Vilella et al. |
| 9,191,377 B2 | 11/2015 | Charan et al. |
| 9,197,572 B2 | 11/2015 | Garcia-Luna-Aceves et al. |
| 9,198,033 B2 | 11/2015 | Buddhikot et al. |
| 9,198,203 B2 | 11/2015 | Shaffer et al. |
| 9,203,928 B2 | 12/2015 | Fein et al. |
| 9,209,943 B1 | 12/2015 | Firoiu et al. |
| 9,210,045 B2 | 12/2015 | Shaffer et al. |
| 9,210,608 B2 | 12/2015 | Nakaya et al. |
| 9,210,647 B2 | 12/2015 | Ikemoto et al. |
| 9,218,216 B2 | 12/2015 | Vasseur et al. |
| 9,219,682 B2 | 12/2015 | Vasseur et al. |
| 9,220,049 B2 | 12/2015 | Wang et al. |
| 9,225,589 B2 | 12/2015 | Hui et al. |
| 9,225,637 B2 | 12/2015 | Ramanujan et al. |
| 9,225,639 B2 | 12/2015 | Kahng et al. |
| 9,225,782 B2 | 12/2015 | Addepalli et al. |
| 9,226,182 B2 | 12/2015 | Das et al. |
| 9,226,218 B2 | 12/2015 | Ji |
| 9,230,104 B2 | 1/2016 | Vasseur et al. |
| 9,231,850 B2 | 1/2016 | Agarwal et al. |
| 9,231,965 B1 | 1/2016 | Vasseur et al. |
| 9,232,458 B2 | 1/2016 | Vasseur et al. |
| 9,236,904 B2 | 1/2016 | Hui et al. |
| 9,236,999 B2 | 1/2016 | Alapuranen |
| 9,237,220 B2 | 1/2016 | Waris et al. |
| 9,240,913 B2 | 1/2016 | Hui et al. |
| 9,246,586 B2 | 1/2016 | Patton et al. |
| 9,247,482 B2 | 1/2016 | Sherman et al. |
| 9,253,021 B2 | 2/2016 | Vasseur et al. |

(56) References Cited

U.S. PATENT DOCUMENTS

| | | |
|---|---|---|
| 9,257,036 B2 | 2/2016 | Lund et al. |
| 9,258,702 B2 | 2/2016 | Murphy et al. |
| 9,258,765 B1 | 2/2016 | daCosta |
| 9,261,752 B2 | 2/2016 | Moskowitz |
| 9,264,349 B2 | 2/2016 | Vasseur et al. |
| 9,264,355 B2 | 2/2016 | Eriksson et al. |
| 9,264,491 B2 | 2/2016 | Bosneag et al. |
| 9,264,892 B2 | 2/2016 | Robertson |
| 9,270,584 B2 | 2/2016 | Hui et al. |
| 9,271,178 B2 | 2/2016 | Ghanadan et al. |
| 9,275,376 B2 | 3/2016 | Barraclough et al. |
| 9,276,845 B2 | 3/2016 | Shaffer et al. |
| 9,277,477 B2 | 3/2016 | Leppanen et al. |
| 9,277,482 B2 | 3/2016 | Vasseur et al. |
| 9,277,503 B2 | 3/2016 | Palankar et al. |
| 9,281,865 B2 | 3/2016 | Hui et al. |
| 9,282,059 B2 | 3/2016 | Vasseur |
| 9,282,383 B2 | 3/2016 | Carr |
| 9,286,473 B2 | 3/2016 | Cruz Mota et al. |
| 9,288,066 B2 | 3/2016 | Hui et al. |
| 9,294,488 B2 | 3/2016 | Vasseur et al. |
| 9,294,878 B2 | 3/2016 | Tian et al. |
| 9,295,099 B2 | 3/2016 | Twitchell, Jr. et al. |
| 9,300,569 B2 | 3/2016 | Hui et al. |
| 9,306,620 B2 | 4/2016 | Shaffer et al. |
| 9,306,833 B2 | 4/2016 | Shaffer et al. |
| 9,306,841 B2 | 4/2016 | Vasseur et al. |
| 9,311,670 B2 | 4/2016 | Hoffberg |
| 9,312,918 B2 | 4/2016 | Hui et al. |
| 9,313,275 B2 | 4/2016 | Addepalli et al. |
| 9,313,813 B2 | 4/2016 | Firoiu et al. |
| 9,317,378 B2 | 4/2016 | Vasseur et al. |
| 9,319,332 B2 | 4/2016 | Thubert et al. |
| 9,325,626 B2 | 4/2016 | Vasseur |
| 9,331,931 B2 | 5/2016 | Hui et al. |
| 9,332,072 B2 | 5/2016 | Hui et al. |
| 9,338,065 B2 | 5/2016 | Vasseur et al. |
| 9,338,727 B2 | 5/2016 | Castagnoli |
| 9,344,355 B2 | 5/2016 | Vasseur et al. |
| 9,344,950 B2 | 5/2016 | Ji et al. |
| 9,350,635 B2 | 5/2016 | Vasseur et al. |
| 9,350,683 B2 | 5/2016 | Hui et al. |
| 9,350,809 B2 | 5/2016 | Leppanen et al. |
| 9,351,155 B2 | 5/2016 | Wang |
| 9,351,173 B2 | 5/2016 | Giloh et al. |
| 9,356,858 B2 | 5/2016 | Vasseur et al. |
| 9,356,875 B2 | 5/2016 | Dasgupta et al. |
| 9,357,331 B2 | 5/2016 | Huang |
| 9,363,166 B2 | 6/2016 | Vasseur et al. |
| 9,363,651 B1 | 6/2016 | daCosta |
| 9,369,177 B2 | 6/2016 | Hui et al. |
| 9,369,351 B2 | 6/2016 | Di Pietro et al. |
| 9,369,381 B2 | 6/2016 | Redi et al. |
| 9,369,923 B2 | 6/2016 | Leguay et al. |
| 9,374,281 B2 | 6/2016 | Dasgupta et al. |
| 9,385,933 B2 | 7/2016 | Vasseur et al. |
| 9,386,502 B2 | 7/2016 | Reynaud et al. |
| 9,386,578 B2 | 7/2016 | Holtzman et al. |
| 9,391,784 B2 | 7/2016 | Hui et al. |
| 9,391,806 B2 | 7/2016 | Bruestle et al. |
| 9,391,839 B2 | 7/2016 | Phillips |
| 9,391,878 B2 | 7/2016 | Bade et al. |
| 9,391,891 B2 | 7/2016 | Liao et al. |
| 9,392,020 B2 | 7/2016 | Twitchell, Jr. et al. |
| 9,392,482 B2 | 7/2016 | Bourdelles et al. |
| 9,398,035 B2 | 7/2016 | Vasseur et al. |
| 9,398,467 B2 | 7/2016 | Schultz et al. |
| 9,398,568 B2 | 7/2016 | Gorgen et al. |
| 9,401,863 B2 | 7/2016 | Hui et al. |
| 9,402,216 B2 | 7/2016 | Forte et al. |
| 9,407,646 B2 | 8/2016 | Cruz Mota et al. |
| 9,411,916 B2 | 8/2016 | Cruz Mota et al. |
| 9,413,479 B2 | 8/2016 | Wetterwald et al. |
| 9,413,643 B2 | 8/2016 | Hui et al. |
| 9,413,779 B2 | 8/2016 | Vasseur et al. |
| 9,417,691 B2 | 8/2016 | Belimpasakis et al. |
| 9,418,340 B2 | 8/2016 | Vasseur et al. |
| 9,419,920 B1 | 8/2016 | Rohrer et al. |
| 9,419,981 B2 | 8/2016 | Stolfo et al. |
| 9,426,035 B2 | 8/2016 | Shetty et al. |
| 9,426,040 B2 | 8/2016 | Vasseur et al. |
| 9,426,716 B2 | 8/2016 | Thubert et al. |
| 9,438,386 B2 | 9/2016 | Wermuth et al. |
| 9,444,598 B2 | 9/2016 | Addepalli et al. |
| 9,444,721 B2 | 9/2016 | Zhang et al. |
| 9,444,727 B2 | 9/2016 | Vasseur et al. |
| 9,450,642 B2 | 9/2016 | Hui et al. |
| 9,450,857 B2 | 9/2016 | Chung et al. |
| 9,450,972 B2 | 9/2016 | Cruz Mota et al. |
| 9,450,978 B2 | 9/2016 | Vasseur et al. |
| 9,451,476 B2 | 9/2016 | Shoshan et al. |
| 9,455,903 B2 | 9/2016 | Hui et al. |
| 9,468,014 B2 | 10/2016 | Mosko |
| 9,473,364 B2 | 10/2016 | Vasseur et al. |
| 9,479,995 B2 | 10/2016 | Metke et al. |
| 9,485,153 B2 | 11/2016 | Vasseur et al. |
| 9,485,157 B2 | 11/2016 | Thubert et al. |
| 9,485,174 B2 | 11/2016 | Hui et al. |
| 9,485,185 B2 | 11/2016 | Jackson et al. |
| 9,485,673 B2 | 11/2016 | Turunen et al. |
| 9,489,506 B2 | 11/2016 | Tyson et al. |
| 9,490,419 B2 | 11/2016 | Hui et al. |
| 9,491,051 B2 | 11/2016 | Hui et al. |
| 9,491,076 B2 | 11/2016 | Mermoud et al. |
| 9,497,215 B2 | 11/2016 | Vasseur et al. |
| 9,503,359 B2 | 11/2016 | Dasgupta et al. |
| 9,503,466 B2 | 11/2016 | Vasseur et al. |
| 9,504,051 B2 | 11/2016 | Ji |
| 9,509,636 B2 | 11/2016 | Kalkunte |
| 9,510,264 B2 | 11/2016 | Hui et al. |
| 9,510,347 B2 | 11/2016 | Thubert et al. |
| 9,515,914 B2 | 12/2016 | Vasseur et al. |
| 9,516,025 B2 | 12/2016 | Dasgupta et al. |
| 9,521,158 B2 | 12/2016 | Di Pietro et al. |
| 9,525,617 B2 | 12/2016 | Vasseur et al. |
| 9,526,030 B2 | 12/2016 | Goergen et al. |
| 9,526,061 B2 | 12/2016 | Jing et al. |
| 9,531,635 B2 | 12/2016 | Vasseur et al. |
| 9,537,593 B2 | 1/2017 | Hui et al. |
| 9,537,789 B2 | 1/2017 | Wang et al. |
| 9,542,642 B2 | 1/2017 | Wood |
| 9,544,018 B2 | 1/2017 | Hui et al. |
| 9,544,162 B2 | 1/2017 | Vasseur et al. |
| 9,544,220 B2 | 1/2017 | Dasgupta et al. |
| 9,547,828 B2 | 1/2017 | Mermoud et al. |
| 9,549,363 B2 | 1/2017 | Hui et al. |
| 9,553,772 B2 | 1/2017 | Dasgupta et al. |
| 9,553,773 B2 | 1/2017 | Vasseur et al. |
| 9,553,796 B2 | 1/2017 | Hui et al. |
| 9,554,322 B2 | 1/2017 | Huang et al. |
| 9,557,188 B2 | 1/2017 | Svendsen et al. |
| 9,559,750 B2 | 1/2017 | Hui et al. |
| 9,559,918 B2 | 1/2017 | Di Pietro et al. |
| 9,563,440 B2 | 2/2017 | Vasseur et al. |
| 9,563,854 B2 | 2/2017 | Cruz Mota et al. |
| 9,565,108 B2 | 2/2017 | Hui et al. |
| 9,565,111 B2 | 2/2017 | Vasseur et al. |
| 9,576,404 B2 | 2/2017 | Ziarno et al. |
| 9,577,914 B2 | 2/2017 | Hui et al. |
| 9,577,915 B2 | 2/2017 | Hui et al. |
| 9,582,242 B2 | 2/2017 | Jantunen et al. |
| 9,585,113 B2 | 2/2017 | Nomura et al. |
| 9,589,006 B2 | 3/2017 | Boldyrev et al. |
| 9,590,692 B2 | 3/2017 | Thubert et al. |
| 9,590,790 B2 | 3/2017 | Hui et al. |
| 9,590,896 B2 | 3/2017 | Hui et al. |
| 9,590,918 B2 | 3/2017 | Lutz et al. |
| 9,596,169 B2 | 3/2017 | Choudhury et al. |
| 9,596,619 B2 | 3/2017 | Firoiu et al. |
| 9,602,159 B2 | 3/2017 | Hui et al. |
| 9,602,296 B2 | 3/2017 | Wu et al. |
| 9,602,379 B2 | 3/2017 | Hui et al. |
| 9,602,399 B2 | 3/2017 | Jetcheva et al. |
| 9,602,420 B2 | 3/2017 | Thubert et al. |

(56) References Cited

U.S. PATENT DOCUMENTS

| | | |
|---|---|---|
| 9,608,912 B2 | 3/2017 | Thubert et al. |
| 9,609,553 B2 | 3/2017 | Barkar |
| 9,614,770 B2 | 4/2017 | Vasseur et al. |
| 9,615,264 B2 | 4/2017 | Hoffberg |
| 9,615,284 B2 | 4/2017 | Ghanadan et al. |
| 9,621,457 B2 | 4/2017 | Veillette |
| 9,621,458 B2 | 4/2017 | Luo et al. |
| 9,626,628 B2 | 4/2017 | Dasgupta et al. |
| 9,628,362 B2 | 4/2017 | Vasseur et al. |
| 9,628,371 B2 | 4/2017 | Hui et al. |
| 9,634,928 B2 | 4/2017 | Choudhury et al. |
| 9,634,982 B2 | 4/2017 | Hui et al. |
| 9,635,050 B2 | 4/2017 | Di Pietro et al. |
| 9,641,382 B2 | 5/2017 | Hui et al. |
| 9,641,542 B2 | 5/2017 | Vasseur et al. |
| 9,642,064 B2 | 5/2017 | Ji et al. |
| 9,647,494 B2 | 5/2017 | Hui et al. |
| 9,648,517 B2 | 5/2017 | Giloh et al. |
| 9,648,544 B1 | 5/2017 | Arshad et al. |
| 9,648,547 B1 | 5/2017 | Hart et al. |
| 9,652,720 B2 | 5/2017 | Vasseur et al. |
| 9,654,389 B2 | 5/2017 | Hui et al. |
| 9,654,478 B2 | 5/2017 | Stolfo et al. |
| 9,658,509 B2 | 5/2017 | Moskowitz |
| 9,661,551 B2 | 5/2017 | Zhang et al. |
| 9,667,501 B2 | 5/2017 | Dasgupta et al. |
| 9,667,536 B2 | 5/2017 | Hui et al. |
| 9,667,556 B2 | 5/2017 | Jackson et al. |
| 9,668,195 B2 | 5/2017 | Sherman |
| 9,672,346 B2 | 6/2017 | Jarvis et al. |
| 9,673,858 B2 | 6/2017 | Hui et al. |
| 9,674,207 B2 | 6/2017 | Di Pietro et al. |
| 9,679,336 B2 | 6/2017 | Papakipos et al. |
| 9,686,312 B2 | 6/2017 | Di Pietro et al. |
| 9,686,369 B2 | 6/2017 | Patil et al. |
| 9,686,792 B2 | 6/2017 | Jetcheva et al. |
| 9,692,538 B2 | 6/2017 | Tyson et al. |
| 9,692,644 B2 | 6/2017 | Hui et al. |
| 9,693,179 B2 | 6/2017 | Lee et al. |
| 9,693,297 B2 | 6/2017 | Condeixa et al. |
| 9,696,884 B2 | 7/2017 | Lehtiniemi et al. |
| 9,698,864 B2 | 7/2017 | Shaffer et al. |
| 9,698,867 B2 | 7/2017 | Hui et al. |
| 9,699,768 B2 | 7/2017 | Werb |
| 9,705,737 B2 | 7/2017 | Wetterwald et al. |
| 9,705,914 B2 | 7/2017 | Di Pietro et al. |
| 9,706,420 B2 | 7/2017 | Patil et al. |
| 9,706,598 B2 | 7/2017 | Bill |
| 9,712,282 B2 | 7/2017 | Patil et al. |
| 9,712,332 B2 | 7/2017 | Kalkunte |
| 9,712,394 B2 | 7/2017 | Abe et al. |
| 9,712,423 B1 | 7/2017 | Amis et al. |
| 9,712,433 B2 | 7/2017 | Hui et al. |
| 9,713,061 B2 | 7/2017 | Ruiz et al. |
| 9,716,528 B2 | 7/2017 | Hui et al. |
| 9,722,905 B2 | 8/2017 | Mermoud et al. |
| 9,722,909 B2 | 8/2017 | Hui et al. |
| 9,723,538 B2 | 8/2017 | Shaffer et al. |
| 9,729,430 B2 | 8/2017 | Weinstein |
| 9,730,017 B2 | 8/2017 | Belimpasakis et al. |
| 9,730,078 B2 | 8/2017 | Nixon et al. |
| 9,730,100 B2 | 8/2017 | Dacosta |
| 9,736,056 B2 | 8/2017 | Vasseur et al. |
| 9,743,339 B2 | 8/2017 | Jetcheva et al. |
| 9,749,410 B2 | 8/2017 | Thubert et al. |
| 9,756,549 B2 | 9/2017 | Perdomo |
| 9,766,619 B2 | 9/2017 | Ziarno |
| 9,769,821 B2 | 9/2017 | Hui et al. |
| 9,769,871 B2 | 9/2017 | Giloh |
| 9,774,410 B2 | 9/2017 | Daoura et al. |
| 9,774,522 B2 | 9/2017 | Vasseur et al. |
| 9,774,534 B2 | 9/2017 | Vasseur et al. |
| 9,785,509 B2 | 10/2017 | Hui et al. |
| 9,788,329 B2 | 10/2017 | Hall |
| 9,794,162 B2 | 10/2017 | Fuste Vilella et al. |
| 9,794,179 B2 | 10/2017 | Dasgupta et al. |
| 9,794,797 B2 | 10/2017 | Hoffberg |
| 9,794,808 B2 | 10/2017 | Baroudi et al. |
| 9,794,934 B2 | 10/2017 | Zhang et al. |
| 9,800,493 B2 | 10/2017 | Hui et al. |
| 9,800,506 B2 | 10/2017 | Vasseur et al. |
| 9,801,215 B2 | 10/2017 | Schwartz |
| 9,816,897 B2 | 11/2017 | Ziarno |
| 9,818,136 B1 | 11/2017 | Hoffberg |
| 9,819,505 B2 | 11/2017 | Bhat et al. |
| 9,820,142 B2 | 11/2017 | Wang |
| 9,820,658 B2 | 11/2017 | Tran |
| 9,832,705 B1 | 11/2017 | Newton et al. |
| 9,838,942 B2 | 12/2017 | Murphy et al. |
| 9,842,202 B2 | 12/2017 | Jarvis et al. |
| 9,847,889 B2 | 12/2017 | Vasseur et al. |
| 9,848,345 B1 | 12/2017 | Baroudi et al. |
| 9,848,422 B2 | 12/2017 | Woo et al. |
| 9,848,459 B2 | 12/2017 | Darrow et al. |
| 9,853,883 B2 | 12/2017 | Thubert et al. |
| 9,860,961 B2 | 1/2018 | Chemel et al. |
| 9,866,395 B2 | 1/2018 | Bruestle et al. |
| 9,866,431 B2 | 1/2018 | Wetterwald et al. |
| 9,870,537 B2 | 1/2018 | Vasseur et al. |
| 9,876,747 B2 | 1/2018 | Hui et al. |
| 9,882,804 B2 | 1/2018 | Thubert et al. |
| 9,883,507 B2 | 1/2018 | Thubert et al. |
| 9,887,936 B2 | 2/2018 | Maino et al. |
| 9,887,974 B2 | 2/2018 | Charan et al. |
| 9,893,985 B2 | 2/2018 | Hui et al. |
| 9,895,604 B2 | 2/2018 | Hall |
| 9,900,079 B2 | 2/2018 | Thubert et al. |
| 9,900,119 B2 | 2/2018 | Daoura et al. |
| 9,900,169 B2 | 2/2018 | Thubert et al. |
| 9,906,434 B2 | 2/2018 | Gei et al. |
| 9,906,439 B2 | 2/2018 | Aldrin et al. |
| 9,917,785 B2 | 3/2018 | Thubert et al. |
| 9,917,871 B2 | 3/2018 | Snyder et al. |
| 9,922,196 B2 | 3/2018 | Di Pietro et al. |
| 9,923,802 B2 | 3/2018 | Wong et al. |
| 9,923,832 B2 | 3/2018 | Wetterwald et al. |
| 9,924,439 B2 | 3/2018 | Giloh |
| 9,924,550 B2 | 3/2018 | Reynaud et al. |
| 9,935,868 B2 | 4/2018 | Hui et al. |
| 9,942,894 B2 | 4/2018 | Harris et al. |
| 9,949,129 B1 | 4/2018 | Henry et al. |
| 9,955,423 B2 | 4/2018 | Kates |
| 9,955,456 B2 | 4/2018 | Hui et al. |
| 9,961,144 B2 | 5/2018 | Fein et al. |
| 9,973,596 B2 | 5/2018 | Hui et al. |
| 9,979,615 B2 | 5/2018 | Kulshreshtha et al. |
| 9,979,619 B2 | 5/2018 | Vasseur et al. |
| 9,985,716 B2 | 5/2018 | Wang et al. |
| 9,986,484 B2 | 5/2018 | Twitchell, Jr. |
| 9,992,091 B2 | 6/2018 | Martinsen et al. |
| 10,944,669 B1 * | 3/2021 | Ramanathan ........... H04L 45/02 |
| 2001/0040895 A1 | 11/2001 | Templin |
| 2002/0012320 A1 | 1/2002 | Ogier et al. |
| 2002/0039357 A1 | 4/2002 | Lipasti et al. |
| 2002/0061009 A1 | 5/2002 | Sorensen |
| 2002/0062388 A1 | 5/2002 | Ogier et al. |
| 2002/0069278 A1 | 6/2002 | Forslow |
| 2002/0071160 A1 | 6/2002 | Pavelchek |
| 2002/0080888 A1 | 6/2002 | Shu et al. |
| 2002/0083316 A1 | 6/2002 | Platenberg et al. |
| 2002/0107023 A1 | 8/2002 | Chari et al. |
| 2002/0120874 A1 | 8/2002 | Shu et al. |
| 2002/0133534 A1 | 9/2002 | Forslow |
| 2002/0145978 A1 | 10/2002 | Batsell et al. |
| 2002/0176399 A1 | 11/2002 | Wilmer |
| 2002/0188656 A1 | 12/2002 | Patton et al. |
| 2002/0191573 A1 | 12/2002 | Whitehill et al. |
| 2002/0196789 A1 | 12/2002 | Patton |
| 2002/0198994 A1 | 12/2002 | Patton et al. |
| 2003/0048749 A1 | 3/2003 | Stamatelakis et al. |
| 2003/0076837 A1 | 4/2003 | Whitehill et al. |
| 2003/0084020 A1 | 5/2003 | Shu |
| 2003/0095504 A1 | 5/2003 | Ogier |
| 2003/0161268 A1 | 8/2003 | Larsson et al. |

(56) References Cited

U.S. PATENT DOCUMENTS

| | | |
|---|---|---|
| 2003/0163729 A1 | 8/2003 | Buchegger |
| 2003/0165117 A1 | 9/2003 | Garcia-Luna-Aceves et al. |
| 2003/0179742 A1 | 9/2003 | Ogier et al. |
| 2003/0185233 A1 | 10/2003 | Ji et al. |
| 2003/0202468 A1 | 10/2003 | Cain et al. |
| 2003/0202469 A1 | 10/2003 | Cain |
| 2003/0202476 A1 | 10/2003 | Billhartz et al. |
| 2003/0202477 A1 | 10/2003 | Zhen et al. |
| 2003/0202512 A1 | 10/2003 | Kennedy |
| 2003/0204587 A1 | 10/2003 | Billhartz |
| 2003/0204616 A1 | 10/2003 | Billhartz et al. |
| 2003/0212821 A1 | 11/2003 | Gillies et al. |
| 2003/0212941 A1 | 11/2003 | Gillies et al. |
| 2003/0235175 A1 | 12/2003 | Naghian et al. |
| 2004/0014467 A1 | 1/2004 | O'Neill et al. |
| 2004/0022223 A1 | 2/2004 | Billhartz |
| 2004/0022224 A1 | 2/2004 | Billhartz |
| 2004/0025018 A1 | 2/2004 | Haas et al. |
| 2004/0028000 A1 | 2/2004 | Billhartz |
| 2004/0028016 A1 | 2/2004 | Billhartz |
| 2004/0028018 A1 | 2/2004 | Cain |
| 2004/0029553 A1 | 2/2004 | Cain |
| 2004/0029601 A1 | 2/2004 | O'Neill et al. |
| 2004/0032847 A1 | 2/2004 | Cain |
| 2004/0042417 A1 | 3/2004 | Kennedy |
| 2004/0042434 A1 | 3/2004 | Kennedy |
| 2004/0048618 A1 | 3/2004 | O'neill et al. |
| 2004/0057409 A1 | 3/2004 | Kennedy |
| 2004/0071124 A1 | 4/2004 | Saffre |
| 2004/0081152 A1 | 4/2004 | Thubert et al. |
| 2004/0085928 A1 | 5/2004 | Chari et al. |
| 2004/0090943 A1 | 5/2004 | da Costa et al. |
| 2004/0095915 A1 | 5/2004 | Saffre et al. |
| 2004/0103275 A1 | 5/2004 | Ji et al. |
| 2004/0117339 A1 | 6/2004 | Thubert et al. |
| 2004/0121786 A1 | 6/2004 | Radcliffe et al. |
| 2004/0125795 A1 | 7/2004 | Corson et al. |
| 2004/0143678 A1 | 7/2004 | Chari et al. |
| 2004/0157557 A1 | 8/2004 | Barnett et al. |
| 2004/0160943 A1 | 8/2004 | Cain |
| 2004/0174900 A1 | 9/2004 | Volpi et al. |
| 2004/0179502 A1 | 9/2004 | Naghian et al. |
| 2004/0185889 A1 | 9/2004 | Shipman |
| 2004/0190468 A1 | 9/2004 | Saijonmaa |
| 2004/0190476 A1 | 9/2004 | Bansal et al. |
| 2004/0196854 A1 | 10/2004 | Thubert et al. |
| 2004/0203385 A1 | 10/2004 | Narayanan et al. |
| 2004/0203797 A1 | 10/2004 | Burr |
| 2004/0203820 A1 | 10/2004 | Billhartz |
| 2004/0210657 A1 | 10/2004 | Narayanan et al. |
| 2004/0213167 A1 | 10/2004 | Garcia-Luna-Aceves et al. |
| 2004/0215687 A1 | 10/2004 | Klemba et al. |
| 2004/0218528 A1 | 11/2004 | Shipman |
| 2004/0218548 A1 | 11/2004 | Kennedy et al. |
| 2004/0218582 A1 | 11/2004 | Kennedy et al. |
| 2004/0219909 A1 | 11/2004 | Kennedy et al. |
| 2004/0223491 A1 | 11/2004 | Levy-Abegnoli et al. |
| 2004/0223497 A1 | 11/2004 | Sanderson et al. |
| 2004/0223498 A1 | 11/2004 | Sanderson et al. |
| 2004/0223499 A1 | 11/2004 | Sanderson et al. |
| 2004/0223500 A1 | 11/2004 | Sanderson et al. |
| 2004/0225740 A1 | 11/2004 | Klemba et al. |
| 2004/0228304 A1 | 11/2004 | Riedel et al. |
| 2004/0228343 A1 | 11/2004 | Molteni et al. |
| 2004/0228490 A1 | 11/2004 | Klemba et al. |
| 2004/0240426 A1 | 12/2004 | Wu et al. |
| 2004/0246144 A1 | 12/2004 | Siegel et al. |
| 2004/0246902 A1 | 12/2004 | Weinstein et al. |
| 2004/0246931 A1 | 12/2004 | Thubert et al. |
| 2004/0246975 A1 | 12/2004 | Joshi |
| 2004/0264422 A1 | 12/2004 | Calcev et al. |
| 2004/0264466 A1 | 12/2004 | Huang |
| 2005/0013253 A1 | 1/2005 | Lindskog et al. |
| 2005/0014510 A1 | 1/2005 | Jeon |
| 2005/0021725 A1 | 1/2005 | Lobbert |
| 2005/0041591 A1 | 2/2005 | Duggi et al. |
| 2005/0041627 A1 | 2/2005 | Duggi |
| 2005/0041628 A1 | 2/2005 | Duggi et al. |
| 2005/0041676 A1 | 2/2005 | Weinstein et al. |
| 2005/0053003 A1 | 3/2005 | Cain et al. |
| 2005/0053004 A1 | 3/2005 | Cain et al. |
| 2005/0053005 A1 | 3/2005 | Cain et al. |
| 2005/0053007 A1 | 3/2005 | Bernhardt et al. |
| 2005/0053094 A1 | 3/2005 | Cain et al. |
| 2005/0054346 A1 | 3/2005 | Windham et al. |
| 2005/0058149 A1 | 3/2005 | Howe |
| 2005/0073962 A1 | 4/2005 | Zabele et al. |
| 2005/0073992 A1 | 4/2005 | Lee et al. |
| 2005/0076054 A1 | 4/2005 | Moon et al. |
| 2005/0078678 A1 | 4/2005 | Kim et al. |
| 2005/0083859 A1 | 4/2005 | Kang |
| 2005/0088993 A1 | 4/2005 | Jung et al. |
| 2005/0094574 A1 | 5/2005 | Han et al. |
| 2005/0094594 A1 | 5/2005 | Roh |
| 2005/0094620 A1 | 5/2005 | Calcev |
| 2005/0099971 A1 | 5/2005 | Droms et al. |
| 2005/0100029 A1 | 5/2005 | Das |
| 2005/0105524 A1 | 5/2005 | Stevens et al. |
| 2005/0129000 A1 | 6/2005 | Sivakumar et al. |
| 2005/0135379 A1 | 6/2005 | Callaway, Jr. et al. |
| 2005/0136972 A1 | 6/2005 | Smith et al. |
| 2005/0141706 A1 | 6/2005 | Regli et al. |
| 2005/0152305 A1 | 7/2005 | Ji et al. |
| 2005/0152318 A1 | 7/2005 | Elbatt et al. |
| 2005/0153725 A1 | 7/2005 | Naghian et al. |
| 2005/0157661 A1 | 7/2005 | Cho |
| 2005/0163144 A1 | 7/2005 | Srikrishna et al. |
| 2005/0169257 A1 | 8/2005 | Lahetkangas et al. |
| 2005/0175009 A1 | 8/2005 | Bauer |
| 2005/0185632 A1 | 8/2005 | Draves, Jr. et al. |
| 2005/0190717 A1 | 9/2005 | Shu et al. |
| 2005/0190759 A1 | 9/2005 | Lee et al. |
| 2005/0190767 A1 | 9/2005 | Lee et al. |
| 2005/0195814 A1 | 9/2005 | Hagiwara et al. |
| 2005/0226195 A1* | 10/2005 | Paris ............... H04L 1/1838 370/254 |
| 2005/0243757 A1 | 11/2005 | Yagyu et al. |
| 2005/0249215 A1* | 11/2005 | Kelsey ............... H04L 45/52 370/392 |
| 2005/0254472 A1 | 11/2005 | Roh et al. |
| 2005/0254473 A1 | 11/2005 | Preguica et al. |
| 2005/0259588 A1 | 11/2005 | Preguica |
| 2005/0259595 A1 | 11/2005 | Preguica |
| 2005/0259671 A1 | 11/2005 | Jung et al. |
| 2005/0265259 A1 | 12/2005 | Thubert et al. |
| 2005/0271006 A1 | 12/2005 | Chari et al. |
| 2005/0276608 A1 | 12/2005 | Pavelchek |
| 2005/0286419 A1 | 12/2005 | Joshi et al. |
| 2006/0002328 A1 | 1/2006 | Naghian |
| 2006/0007863 A1 | 1/2006 | Naghian |
| 2006/0007865 A1 | 1/2006 | White et al. |
| 2006/0013177 A1 | 1/2006 | Saito |
| 2006/0023632 A1 | 2/2006 | Ozer et al. |
| 2006/0023677 A1 | 2/2006 | Labrador et al. |
| 2006/0029074 A2 | 2/2006 | Bauer |
| 2006/0030318 A1 | 2/2006 | Moore et al. |
| 2006/0031576 A1 | 2/2006 | Canright |
| 2006/0034232 A1 | 2/2006 | McLaughlin et al. |
| 2006/0034233 A1 | 2/2006 | Strutt et al. |
| 2006/0039371 A1 | 2/2006 | Castro et al. |
| 2006/0056353 A1 | 3/2006 | McBride |
| 2006/0067213 A1 | 3/2006 | Evans et al. |
| 2006/0089119 A1 | 4/2006 | Lipasti et al. |
| 2006/0092043 A1 | 5/2006 | Lagassey |
| 2006/0092898 A1 | 5/2006 | Kim et al. |
| 2006/0092939 A1 | 5/2006 | Duggi et al. |
| 2006/0095199 A1 | 5/2006 | Lagassey |
| 2006/0098608 A1 | 5/2006 | Joshi |
| 2006/0101157 A1 | 5/2006 | Eardley |
| 2006/0114851 A1 | 6/2006 | Gupta et al. |
| 2006/0117113 A1 | 6/2006 | Elliott et al. |
| 2006/0120303 A1 | 6/2006 | Yarvis et al. |
| 2006/0126514 A1 | 6/2006 | Lee et al. |
| 2006/0126524 A1 | 6/2006 | Tateson |

(56) References Cited

U.S. PATENT DOCUMENTS

| | | |
|---|---|---|
| 2006/0126535 A1 | 6/2006 | Sherman |
| 2006/0126587 A1 | 6/2006 | Tsubota |
| 2006/0128349 A1 | 6/2006 | Yoon |
| 2006/0136721 A1 | 6/2006 | Bruestle et al. |
| 2006/0146846 A1 | 7/2006 | Yarvis et al. |
| 2006/0155827 A1 | 7/2006 | Prehofer et al. |
| 2006/0159024 A1 | 7/2006 | Hester |
| 2006/0159082 A1 | 7/2006 | Cook et al. |
| 2006/0165037 A1 | 7/2006 | Jung et al. |
| 2006/0167784 A1 | 7/2006 | Hoffberg |
| 2006/0176829 A1 | 8/2006 | McLaughlin et al. |
| 2006/0176863 A1 | 8/2006 | Robinson et al. |
| 2006/0182145 A1 | 8/2006 | Seo et al. |
| 2006/0187893 A1 | 8/2006 | Joshi |
| 2006/0188327 A1 | 8/2006 | Moon |
| 2006/0195590 A1 | 8/2006 | Tsubota |
| 2006/0206857 A1 | 9/2006 | Liu et al. |
| 2006/0215605 A1 | 9/2006 | Srikrishna et al. |
| 2006/0227724 A1 | 10/2006 | Thubert et al. |
| 2006/0229090 A1 | 10/2006 | LaDue |
| 2006/0233377 A1 | 10/2006 | Chang et al. |
| 2006/0251115 A1 | 11/2006 | Haque et al. |
| 2006/0253747 A1 | 11/2006 | Gillies et al. |
| 2006/0265508 A1 | 11/2006 | Angel et al. |
| 2006/0268688 A1 | 11/2006 | Isozu |
| 2006/0268749 A1 | 11/2006 | Rahman et al. |
| 2006/0268796 A1 | 11/2006 | Watanabe et al. |
| 2006/0280131 A1 | 12/2006 | Rahman et al. |
| 2006/0291404 A1 | 12/2006 | Thubert et al. |
| 2006/0291485 A1 | 12/2006 | Thubert et al. |
| 2006/0291864 A1 | 12/2006 | Pavelchek |
| 2007/0025274 A1 | 2/2007 | Rahman et al. |
| 2007/0038743 A1 | 2/2007 | Hellhake et al. |
| 2007/0053053 A1 | 3/2007 | Moskowitz |
| 2007/0064950 A1 | 3/2007 | Suzuki et al. |
| 2007/0070909 A1 | 3/2007 | Reeve |
| 2007/0070983 A1 | 3/2007 | Redi et al. |
| 2007/0086358 A1 | 4/2007 | Thubert et al. |
| 2007/0087756 A1 | 4/2007 | Hoffberg |
| 2007/0087758 A1 | 4/2007 | Norris et al. |
| 2007/0091805 A1 | 4/2007 | Ramprashad et al. |
| 2007/0091811 A1 | 4/2007 | Thubert et al. |
| 2007/0110024 A1 | 5/2007 | Meier |
| 2007/0110102 A1 | 5/2007 | Yagyuu et al. |
| 2007/0115810 A1 | 5/2007 | Stamatelakis et al. |
| 2007/0124063 A1 | 5/2007 | Kindo |
| 2007/0127379 A1 | 6/2007 | Gossain et al. |
| 2007/0127503 A1 | 6/2007 | Zhao |
| 2007/0129015 A1 | 6/2007 | Iwamoto et al. |
| 2007/0140129 A1 | 6/2007 | Bauer et al. |
| 2007/0140239 A1 | 6/2007 | Bauer et al. |
| 2007/0147321 A1 | 6/2007 | Jung |
| 2007/0153707 A1 | 7/2007 | Thubert et al. |
| 2007/0153737 A1 | 7/2007 | Singh et al. |
| 2007/0153764 A1 | 7/2007 | Thubert et al. |
| 2007/0161388 A1 | 7/2007 | Ji |
| 2007/0171862 A1 | 7/2007 | Tang et al. |
| 2007/0183346 A1 | 8/2007 | Thubert et al. |
| 2007/0195400 A2 | 8/2007 | Moskowitz |
| 2007/0195702 A1 | 8/2007 | Yuen et al. |
| 2007/0195713 A1 | 8/2007 | Khan et al. |
| 2007/0195728 A1 | 8/2007 | Chen et al. |
| 2007/0195768 A1 | 8/2007 | Kanazawa et al. |
| 2007/0195799 A1 | 8/2007 | Kanazawa et al. |
| 2007/0197262 A1 | 8/2007 | Smith et al. |
| 2007/0201428 A1 | 8/2007 | Morita et al. |
| 2007/0206547 A1 | 9/2007 | Gong et al. |
| 2007/0214046 A1 | 9/2007 | Falchuk et al. |
| 2007/0214254 A1 | 9/2007 | Aguinik |
| 2007/0223310 A1 | 9/2007 | Tran |
| 2007/0223436 A1 | 9/2007 | Lenardi et al. |
| 2007/0229231 A1 | 10/2007 | Hurwitz et al. |
| 2007/0230410 A1 | 10/2007 | Thubert et al. |
| 2007/0237150 A1 | 10/2007 | Wood |
| 2007/0247368 A1 | 10/2007 | Wu |
| 2007/0248117 A1 | 10/2007 | Zuniga et al. |
| 2007/0258473 A1 | 11/2007 | Ruffino et al. |
| 2007/0258508 A1 | 11/2007 | Werb et al. |
| 2007/0280136 A1 | 12/2007 | Chen et al. |
| 2007/0280174 A1 | 12/2007 | Pun |
| 2007/0280192 A1 | 12/2007 | Yagyu et al. |
| 2007/0286097 A1 | 12/2007 | Davies |
| 2007/0286139 A1* | 12/2007 | Niu ................. H04L 45/26 370/338 |
| 2007/0297371 A1 | 12/2007 | Lea |
| 2007/0297375 A1 | 12/2007 | Bonta et al. |
| 2007/0297808 A1 | 12/2007 | Pavelchek |
| 2008/0004904 A1 | 1/2008 | Tran |
| 2008/0008138 A1 | 1/2008 | Pun |
| 2008/0008201 A1 | 1/2008 | Imahase et al. |
| 2008/0019298 A1 | 1/2008 | Rudnick |
| 2008/0019328 A1 | 1/2008 | Rudnick |
| 2008/0025270 A1 | 1/2008 | Moon |
| 2008/0026781 A1 | 1/2008 | Ho et al. |
| 2008/0031187 A1 | 2/2008 | Draves et al. |
| 2008/0031203 A1 | 2/2008 | Bill |
| 2008/0036589 A1 | 2/2008 | Werb et al. |
| 2008/0037431 A1 | 2/2008 | Werb et al. |
| 2008/0037454 A1 | 2/2008 | Werb et al. |
| 2008/0037560 A1 | 2/2008 | Jia et al. |
| 2008/0037569 A1 | 2/2008 | Werb et al. |
| 2008/0040507 A1 | 2/2008 | Hsu et al. |
| 2008/0040509 A1 | 2/2008 | Werb et al. |
| 2008/0043316 A2 | 2/2008 | Moskowitz |
| 2008/0051036 A1 | 2/2008 | Vaswani et al. |
| 2008/0051099 A1 | 2/2008 | Moore et al. |
| 2008/0056157 A1 | 3/2008 | Retana et al. |
| 2008/0056207 A1 | 3/2008 | Eriksson et al. |
| 2008/0059652 A1 | 3/2008 | Preguica |
| 2008/0062916 A1 | 3/2008 | Mosko et al. |
| 2008/0062947 A1 | 3/2008 | Retana et al. |
| 2008/0069105 A1 | 3/2008 | Costa et al. |
| 2008/0075010 A1* | 3/2008 | Song ................. H04W 40/02 370/238 |
| 2008/0075029 A1* | 3/2008 | Song ................. H04L 45/16 370/329 |
| 2008/0080520 A1 | 4/2008 | Westphal |
| 2008/0095058 A1 | 4/2008 | Dalmases et al. |
| 2008/0095059 A1 | 4/2008 | Chu |
| 2008/0101332 A1 | 5/2008 | Kim et al. |
| 2008/0107034 A1 | 5/2008 | Jetcheva et al. |
| 2008/0112422 A1 | 5/2008 | Jetcheva et al. |
| 2008/0117885 A1 | 5/2008 | Kim et al. |
| 2008/0117896 A1 | 5/2008 | Romero et al. |
| 2008/0123584 A1 | 5/2008 | Behrendt et al. |
| 2008/0126403 A1 | 5/2008 | Moon |
| 2008/0130500 A1 | 6/2008 | Retana et al. |
| 2008/0130640 A1 | 6/2008 | Hurwitz et al. |
| 2008/0144497 A1 | 6/2008 | Ramprashad et al. |
| 2008/0144566 A1 | 6/2008 | Duggi et al. |
| 2008/0151793 A1 | 6/2008 | Wright |
| 2008/0151841 A1 | 6/2008 | Yi et al. |
| 2008/0151889 A1 | 6/2008 | Yi et al. |
| 2008/0151916 A1 | 6/2008 | Jetcheva et al. |
| 2008/0159142 A1 | 7/2008 | Nagarajan et al. |
| 2008/0159143 A1 | 7/2008 | Nagarajan et al. |
| 2008/0159144 A1 | 7/2008 | Nagarajan et al. |
| 2008/0159151 A1 | 7/2008 | Datz et al. |
| 2008/0159358 A1 | 7/2008 | Ruiz et al. |
| 2008/0165745 A1 | 7/2008 | Rudnick et al. |
| 2008/0170513 A1 | 7/2008 | Niranjan et al. |
| 2008/0170518 A1 | 7/2008 | Duggi et al. |
| 2008/0170550 A1 | 7/2008 | Liu et al. |
| 2008/0175149 A1 | 7/2008 | Andrews et al. |
| 2008/0175244 A1 | 7/2008 | Iyer et al. |
| 2008/0183853 A1 | 7/2008 | Manion et al. |
| 2008/0186562 A2 | 8/2008 | Moskowitz |
| 2008/0192713 A1 | 8/2008 | Mighani et al. |
| 2008/0192724 A1 | 8/2008 | Kondo et al. |
| 2008/0195360 A1 | 8/2008 | Chiang et al. |
| 2008/0198789 A1 | 8/2008 | Brown et al. |
| 2008/0198824 A1 | 8/2008 | Wu et al. |
| 2008/0198865 A1 | 8/2008 | Rudnick et al. |
| 2008/0200165 A1 | 8/2008 | Sharma et al. |

(56) References Cited

U.S. PATENT DOCUMENTS

| | | |
|---|---|---|
| 2008/0205312 A1 | 8/2008 | Metke et al. |
| 2008/0205332 A1 | 8/2008 | Kim |
| 2008/0205385 A1 | 8/2008 | Zeng et al. |
| 2008/0212494 A1 | 9/2008 | Thubert et al. |
| 2008/0219185 A1 | 9/2008 | Zou et al. |
| 2008/0219237 A1 | 9/2008 | Thubert et al. |
| 2008/0228940 A1 | 9/2008 | Thubert |
| 2008/0232338 A1 | 9/2008 | Ji et al. |
| 2008/0240050 A1 | 10/2008 | Pun |
| 2008/0247335 A1 | 10/2008 | Rudnick |
| 2008/0247353 A1 | 10/2008 | Pun |
| 2008/0247355 A1 | 10/2008 | Ahn |
| 2008/0252485 A1 | 10/2008 | Lagassey |
| 2008/0253340 A1 | 10/2008 | Hirano et al. |
| 2008/0259927 A1 | 10/2008 | Evans et al. |
| 2008/0261580 A1 | 10/2008 | Wallentin et al. |
| 2008/0262893 A1 | 10/2008 | Hoffberg |
| 2008/0267116 A1 | 10/2008 | Kang et al. |
| 2008/0273487 A1 | 11/2008 | Naghian |
| 2008/0273518 A1 | 11/2008 | Pratt et al. |
| 2008/0279155 A1 | 11/2008 | Pratt, Jr. et al. |
| 2008/0279204 A1 | 11/2008 | Pratt, Jr. et al. |
| 2008/0291843 A1 | 11/2008 | Sonnenberg et al. |
| 2008/0291855 A1 | 11/2008 | Bata et al. |
| 2008/0298251 A1 | 12/2008 | Khuu et al. |
| 2008/0310325 A1 | 12/2008 | Yang |
| 2008/0310340 A1 | 12/2008 | Isozu |
| 2008/0310390 A1 | 12/2008 | Pun et al. |
| 2008/0320305 A1 | 12/2008 | Bruestle et al. |
| 2009/0003324 A1 | 1/2009 | Zhao et al. |
| 2009/0003366 A1 | 1/2009 | Chen et al. |
| 2009/0010204 A1 | 1/2009 | Pratt, Jr. et al. |
| 2009/0010205 A1 | 1/2009 | Pratt, Jr. et al. |
| 2009/0016262 A1 | 1/2009 | Kulkarni et al. |
| 2009/0043909 A1 | 2/2009 | Patton et al. |
| 2009/0046688 A1 | 2/2009 | Volpi et al. |
| 2009/0046714 A1 | 2/2009 | Holmer et al. |
| 2009/0046732 A1 | 2/2009 | Pratt, Jr. et al. |
| 2009/0047938 A1 | 2/2009 | Khedher et al. |
| 2009/0052429 A1 | 2/2009 | Pratt, Jr. et al. |
| 2009/0054033 A1 | 2/2009 | Pratt, Jr. et al. |
| 2009/0059814 A1 | 3/2009 | Nixon et al. |
| 2009/0059816 A1 | 3/2009 | Reza et al. |
| 2009/0061835 A1 | 3/2009 | Schmidt et al. |
| 2009/0062887 A1 | 3/2009 | Mass et al. |
| 2009/0075625 A1 | 3/2009 | Jackson et al. |
| 2009/0085769 A1 | 4/2009 | Thubert et al. |
| 2009/0086663 A1 | 4/2009 | Ho et al. |
| 2009/0086973 A1 | 4/2009 | Buddhikot et al. |
| 2009/0092074 A1 | 4/2009 | Jamalipour et al. |
| 2009/0097490 A1 | 4/2009 | Sanderson et al. |
| 2009/0109898 A1 | 4/2009 | Adams et al. |
| 2009/0116393 A1 | 5/2009 | Hughes et al. |
| 2009/0116511 A1 | 5/2009 | Anderson et al. |
| 2009/0122738 A1 | 5/2009 | Chen et al. |
| 2009/0122748 A1 | 5/2009 | Gourhant et al. |
| 2009/0122753 A1 | 5/2009 | Hughes et al. |
| 2009/0122766 A1 | 5/2009 | Hughes et al. |
| 2009/0122797 A1 | 5/2009 | Thubert et al. |
| 2009/0129316 A1 | 5/2009 | Ramanathan et al. |
| 2009/0135824 A1 | 5/2009 | Liu |
| 2009/0147702 A1 | 6/2009 | Buddhikot et al. |
| 2009/0147766 A1 | 6/2009 | Chamberlain et al. |
| 2009/0168653 A1 | 7/2009 | St. Pierre et al. |
| 2009/0174569 A1 | 7/2009 | Smith et al. |
| 2009/0175170 A1 | 7/2009 | Langguth et al. |
| 2009/0175238 A1 | 7/2009 | Jetcheva et al. |
| 2009/0185508 A1 | 7/2009 | Duke et al. |
| 2009/0185538 A1 | 7/2009 | Choi et al. |
| 2009/0190514 A1 | 7/2009 | Yi et al. |
| 2009/0196194 A1 | 8/2009 | Paloheimo et al. |
| 2009/0201860 A1 | 8/2009 | Sherman et al. |
| 2009/0201899 A1 | 8/2009 | Liu et al. |
| 2009/0210495 A1 | 8/2009 | Wolfson et al. |
| 2009/0215411 A1 | 8/2009 | Tucker et al. |
| 2009/0217033 A1 | 8/2009 | Costa et al. |
| 2009/0219194 A1 | 9/2009 | Menouar et al. |
| 2009/0225751 A1 | 9/2009 | Koenck et al. |
| 2009/0228575 A1 | 9/2009 | Thubert et al. |
| 2009/0228693 A1 | 9/2009 | Koenck et al. |
| 2009/0228708 A1 | 9/2009 | Trostle |
| 2009/0232119 A1 | 9/2009 | Seok |
| 2009/0245159 A1 | 10/2009 | Oyman et al. |
| 2009/0252102 A1 | 10/2009 | Seidel et al. |
| 2009/0252134 A1 | 10/2009 | Schlicht et al. |
| 2009/0267540 A1 | 10/2009 | Chemel et al. |
| 2009/0274106 A1 | 11/2009 | Weerakoon et al. |
| 2009/0286531 A1 | 11/2009 | Bhatt et al. |
| 2009/0290494 A1 | 11/2009 | Govindan et al. |
| 2009/0310488 A1 | 12/2009 | Mighani et al. |
| 2009/0316682 A1 | 12/2009 | Twitchell, Jr. et al. |
| 2009/0323519 A1 | 12/2009 | Pun |
| 2010/0008231 A1 | 1/2010 | Retana et al. |
| 2010/0014444 A1 | 1/2010 | Ghanadan et al. |
| 2010/0017045 A1 | 1/2010 | Nesler et al. |
| 2010/0020721 A1 | 1/2010 | Parker et al. |
| 2010/0020740 A1 | 1/2010 | Watanabe et al. |
| 2010/0020756 A1 | 1/2010 | Kennedy |
| 2010/0029216 A1 | 2/2010 | Jovicic et al. |
| 2010/0058442 A1 | 3/2010 | Costa et al. |
| 2010/0061299 A1 | 3/2010 | Kennedy et al. |
| 2010/0061352 A1 | 3/2010 | Fasolo et al. |
| 2010/0070600 A1 | 3/2010 | Schulzrinne et al. |
| 2010/0074141 A1 | 3/2010 | Nguyen |
| 2010/0074194 A1 | 3/2010 | Liu et al. |
| 2010/0091823 A1 | 4/2010 | Retana et al. |
| 2010/0091924 A1 | 4/2010 | Wu |
| 2010/0097957 A1 | 4/2010 | Pirzada et al. |
| 2010/0097969 A1 | 4/2010 | De Kimpe et al. |
| 2010/0097971 A1 | 4/2010 | Kang et al. |
| 2010/0103870 A1 | 4/2010 | Garcia-Luna-Aceves et al. |
| 2010/0106961 A1 | 4/2010 | Pei et al. |
| 2010/0111063 A1 | 5/2010 | Ji |
| 2010/0118727 A1 | 5/2010 | Draves, Jr. et al. |
| 2010/0118750 A1 | 5/2010 | Iwasa |
| 2010/0118775 A1 | 5/2010 | Iwasa |
| 2010/0118776 A1 | 5/2010 | Iwasa |
| 2010/0123572 A1 | 5/2010 | Thubert et al. |
| 2010/0124196 A1 | 5/2010 | Bonar et al. |
| 2010/0124207 A1 | 5/2010 | Ghanadan et al. |
| 2010/0125671 A1 | 5/2010 | Thubert et al. |
| 2010/0125674 A1 | 5/2010 | Vasseur et al. |
| 2010/0135195 A1 | 6/2010 | Sakoda |
| 2010/0142421 A1 | 6/2010 | Schlicht et al. |
| 2010/0142445 A1 | 6/2010 | Schlicht et al. |
| 2010/0142446 A1 | 6/2010 | Schlicht et al. |
| 2010/0142447 A1 | 6/2010 | Schlicht et al. |
| 2010/0142448 A1 | 6/2010 | Schlicht et al. |
| 2010/0142551 A1 | 6/2010 | Mosko et al. |
| 2010/0150027 A1 | 6/2010 | Atwal et al. |
| 2010/0150120 A1 | 6/2010 | Schlicht et al. |
| 2010/0152619 A1 | 6/2010 | Kalpaxis et al. |
| 2010/0157888 A1 | 6/2010 | Aggarwal et al. |
| 2010/0157889 A1* | 6/2010 | Aggarwal ............... H04L 45/16 370/328 |
| 2010/0165995 A1 | 7/2010 | Mehta et al. |
| 2010/0166003 A1 | 7/2010 | Eriksson |
| 2010/0169937 A1 | 7/2010 | Atwal et al. |
| 2010/0172249 A1 | 7/2010 | Liu |
| 2010/0172298 A1 | 7/2010 | Shin et al. |
| 2010/0177753 A1 | 7/2010 | Bahr |
| 2010/0185753 A1 | 7/2010 | Liu et al. |
| 2010/0187832 A1 | 7/2010 | Holland et al. |
| 2010/0188979 A1 | 7/2010 | Thubert et al. |
| 2010/0202355 A1 | 8/2010 | Kim et al. |
| 2010/0203878 A1 | 8/2010 | Kim et al. |
| 2010/0208662 A1 | 8/2010 | Fuste Vilella et al. |
| 2010/0214934 A1 | 8/2010 | Conan et al. |
| 2010/0214960 A1 | 8/2010 | Bahr et al. |
| 2010/0226284 A1 | 9/2010 | Bill |
| 2010/0226342 A1 | 9/2010 | Colling et al. |
| 2010/0226381 A1 | 9/2010 | Mehta et al. |
| 2010/0232317 A1 | 9/2010 | Jing et al. |
| 2010/0232354 A1 | 9/2010 | Patil et al. |

(56) References Cited

U.S. PATENT DOCUMENTS

| | | |
|---|---|---|
| 2010/0235285 A1 | 9/2010 | Hoffberg |
| 2010/0238890 A1 | 9/2010 | Mo et al. |
| 2010/0246549 A1 | 9/2010 | Zhang et al. |
| 2010/0254282 A1 | 10/2010 | Chan et al. |
| 2010/0254309 A1 | 10/2010 | Mankins et al. |
| 2010/0254312 A1 | 10/2010 | Kennedy |
| 2010/0259931 A1 | 10/2010 | Chemel et al. |
| 2010/0260131 A1 | 10/2010 | Ghanadan et al. |
| 2010/0264846 A1 | 10/2010 | Chemel et al. |
| 2010/0265955 A1* | 10/2010 | Park .................. H04L 45/00 370/400 |
| 2010/0270933 A1 | 10/2010 | Chemel et al. |
| 2010/0271934 A1 | 10/2010 | Holliday |
| 2010/0279776 A1 | 11/2010 | Hall |
| 2010/0285774 A1 | 11/2010 | Ginzboorg |
| 2010/0295473 A1 | 11/2010 | Chemel et al. |
| 2010/0295474 A1 | 11/2010 | Chemel et al. |
| 2010/0295475 A1 | 11/2010 | Chemel et al. |
| 2010/0295482 A1 | 11/2010 | Chemel et al. |
| 2010/0296285 A1 | 11/2010 | Chemel et al. |
| 2010/0301768 A1 | 12/2010 | Chemel et al. |
| 2010/0301769 A1 | 12/2010 | Chemel et al. |
| 2010/0301770 A1 | 12/2010 | Chemel et al. |
| 2010/0301771 A1 | 12/2010 | Chemel et al. |
| 2010/0301773 A1 | 12/2010 | Chemel et al. |
| 2010/0301774 A1 | 12/2010 | Chemel et al. |
| 2010/0301834 A1 | 12/2010 | Chemel et al. |
| 2010/0302624 A1 | 12/2010 | Moskowitz |
| 2010/0302779 A1 | 12/2010 | Chemel et al. |
| 2010/0302945 A1 | 12/2010 | Leppanen et al. |
| 2010/0302947 A1 | 12/2010 | Leppanen et al. |
| 2010/0303082 A1 | 12/2010 | Wood |
| 2010/0304759 A1 | 12/2010 | Leppanen et al. |
| 2010/0306320 A1 | 12/2010 | Leppanen et al. |
| 2010/0308207 A1 | 12/2010 | Moskowitz |
| 2010/0309912 A1 | 12/2010 | Mehta et al. |
| 2010/0316033 A1 | 12/2010 | Atwal |
| 2010/0317420 A1 | 12/2010 | Hoffberg |
| 2010/0329274 A1 | 12/2010 | Romero et al. |
| 2011/0001436 A1 | 1/2011 | Chemel et al. |
| 2011/0001438 A1 | 1/2011 | Chemel et al. |
| 2011/0002243 A1 | 1/2011 | Sherman et al. |
| 2011/0004513 A1 | 1/2011 | Hoffberg |
| 2011/0006913 A1 | 1/2011 | Chen et al. |
| 2011/0007687 A1 | 1/2011 | Howe et al. |
| 2011/0010446 A1 | 1/2011 | Chen et al. |
| 2011/0019540 A1 | 1/2011 | Isozu |
| 2011/0019652 A1 | 1/2011 | Atwal |
| 2011/0019678 A1 | 1/2011 | Mehta et al. |
| 2011/0047230 A1 | 2/2011 | McGee |
| 2011/0050457 A1 | 3/2011 | Billhartz et al. |
| 2011/0051662 A1 | 3/2011 | Billhartz et al. |
| 2011/0051702 A1 | 3/2011 | Billhartz et al. |
| 2011/0058545 A1 | 3/2011 | Eriksson |
| 2011/0066297 A1 | 3/2011 | Saberi et al. |
| 2011/0072156 A1 | 3/2011 | Holmer et al. |
| 2011/0075578 A1 | 3/2011 | Kim et al. |
| 2011/0078461 A1 | 3/2011 | Hellhake et al. |
| 2011/0078775 A1 | 3/2011 | Yan |
| 2011/0080853 A1 | 4/2011 | Thubert et al. |
| 2011/0085530 A1 | 4/2011 | Hellhake et al. |
| 2011/0090787 A1 | 4/2011 | Smith et al. |
| 2011/0099153 A1 | 4/2011 | Barraclough et al. |
| 2011/0099189 A1 | 4/2011 | Barraclough et al. |
| 2011/0099490 A1 | 4/2011 | Barraclough et al. |
| 2011/0099611 A1 | 4/2011 | Ji et al. |
| 2011/0107225 A1 | 5/2011 | Sukanen et al. |
| 2011/0107420 A1 | 5/2011 | Eriksson |
| 2011/0107431 A1 | 5/2011 | Sukanen |
| 2011/0110273 A1 | 5/2011 | Copeland |
| 2011/0116366 A1 | 5/2011 | Smith et al. |
| 2011/0116376 A1 | 5/2011 | Pacella et al. |
| 2011/0117852 A1 | 5/2011 | Copeland et al. |
| 2011/0119637 A1 | 5/2011 | Tuli et al. |
| 2011/0125765 A1 | 5/2011 | Tuli |
| 2011/0128884 A1 | 6/2011 | Reynaud et al. |
| 2011/0131180 A1 | 6/2011 | Tuli et al. |
| 2011/0133924 A1 | 6/2011 | Thubert et al. |
| 2011/0141888 A1 | 6/2011 | Leguay et al. |
| 2011/0142057 A1 | 6/2011 | Deal et al. |
| 2011/0149756 A1 | 6/2011 | Chan et al. |
| 2011/0149849 A1 | 6/2011 | Brownrig |
| 2011/0149973 A1 | 6/2011 | Esteve Rothenberg et al. |
| 2011/0158153 A1 | 6/2011 | Luo |
| 2011/0164527 A1 | 7/2011 | Mishra et al. |
| 2011/0164546 A1 | 7/2011 | Mishra et al. |
| 2011/0185047 A1 | 7/2011 | Vaidyanathan et al. |
| 2011/0187527 A1 | 8/2011 | Goodwill et al. |
| 2011/0188378 A1 | 8/2011 | Collins et al. |
| 2011/0188653 A1 | 8/2011 | Yao et al. |
| 2011/0200026 A1 | 8/2011 | Ji et al. |
| 2011/0204720 A1 | 8/2011 | Ruiz et al. |
| 2011/0205925 A1 | 8/2011 | Anderson et al. |
| 2011/0211472 A1 | 9/2011 | Ghanadan et al. |
| 2011/0211534 A1 | 9/2011 | Schmidt et al. |
| 2011/0216656 A1 | 9/2011 | Pratt, Jr. et al. |
| 2011/0216667 A1 | 9/2011 | Zou et al. |
| 2011/0222435 A1 | 9/2011 | Zou et al. |
| 2011/0223937 A1 | 9/2011 | Leppanen et al. |
| 2011/0225311 A1 | 9/2011 | Liu et al. |
| 2011/0225312 A1 | 9/2011 | Liu et al. |
| 2011/0228696 A1 | 9/2011 | Agarwal et al. |
| 2011/0228777 A1 | 9/2011 | Samajpati |
| 2011/0228788 A1 | 9/2011 | Thubert et al. |
| 2011/0231573 A1 | 9/2011 | Vasseur et al. |
| 2011/0231862 A1 | 9/2011 | Walsh |
| 2011/0235550 A1 | 9/2011 | Adams et al. |
| 2011/0235573 A1 | 9/2011 | Crain, Jr. et al. |
| 2011/0238751 A1 | 9/2011 | Belimpasakis et al. |
| 2011/0239158 A1 | 9/2011 | Barraclough et al. |
| 2011/0255399 A1 | 10/2011 | Huang et al. |
| 2011/0255479 A1 | 10/2011 | Liu |
| 2011/0261799 A1 | 10/2011 | Ji |
| 2011/0267981 A1 | 11/2011 | Davies |
| 2011/0273568 A1 | 11/2011 | Lagassey |
| 2011/0280156 A1 | 11/2011 | Jing et al. |
| 2011/0280246 A1 | 11/2011 | Isozu |
| 2011/0289320 A1 | 11/2011 | Twitchell, Jr. et al. |
| 2011/0302635 A1 | 12/2011 | Pratt, Jr. et al. |
| 2011/0305136 A1 | 12/2011 | Pan et al. |
| 2011/0314504 A1 | 12/2011 | Ruiz-Velasco |
| 2012/0005041 A1 | 1/2012 | Mehta et al. |
| 2012/0008527 A1 | 1/2012 | Le et al. |
| 2012/0014309 A1 | 1/2012 | Iizuka et al. |
| 2012/0023171 A1 | 1/2012 | Redmond |
| 2012/0026877 A1 | 2/2012 | Rajappan et al. |
| 2012/0030150 A1 | 2/2012 | McAuley et al. |
| 2012/0039186 A1 | 2/2012 | Vasseur |
| 2012/0039190 A1 | 2/2012 | Vasseur |
| 2012/0039235 A1* | 2/2012 | Chen .................. H04L 45/00 370/312 |
| 2012/0044864 A1 | 2/2012 | Zhang et al. |
| 2012/0051339 A1 | 3/2012 | Chamberlain et al. |
| 2012/0057515 A1 | 3/2012 | Wu et al. |
| 2012/0063436 A1 | 3/2012 | Thubert et al. |
| 2012/0091315 A1 | 4/2012 | Moskowitz |
| 2012/0092984 A1 | 4/2012 | Mighani et al. |
| 2012/0092993 A1 | 4/2012 | Kan |
| 2012/0093134 A1 | 4/2012 | Zuniga et al. |
| 2012/0106428 A1 | 5/2012 | Schlicht et al. |
| 2012/0113807 A1 | 5/2012 | Vasseur et al. |
| 2012/0113863 A1 | 5/2012 | Vasseur et al. |
| 2012/0113896 A1 | 5/2012 | Karol |
| 2012/0113901 A1 | 5/2012 | Jackson et al. |
| 2012/0113986 A1 | 5/2012 | Shaffer et al. |
| 2012/0116559 A1 | 5/2012 | Davis et al. |
| 2012/0117208 A1 | 5/2012 | Shaffer et al. |
| 2012/0117213 A1 | 5/2012 | Shaffer et al. |
| 2012/0117268 A1 | 5/2012 | Shaffer et al. |
| 2012/0117438 A1 | 5/2012 | Shaffer et al. |
| 2012/0127977 A1 | 5/2012 | Copeland et al. |
| 2012/0134287 A1 | 5/2012 | Turunen et al. |
| 2012/0134361 A1 | 5/2012 | Wong et al. |
| 2012/0134548 A1 | 5/2012 | Rhoads et al. |

(56) References Cited

U.S. PATENT DOCUMENTS

| | | |
|---|---|---|
| 2012/0135723 A1 | 5/2012 | Ramo et al. |
| 2012/0154633 A1 | 6/2012 | Rodriguez |
| 2012/0155260 A1 | 6/2012 | Vasseur et al. |
| 2012/0155276 A1 | 6/2012 | Vasseur et al. |
| 2012/0155284 A1 | 6/2012 | Shaffer et al. |
| 2012/0155329 A1 | 6/2012 | Shaffer et al. |
| 2012/0155397 A1 | 6/2012 | Shaffer et al. |
| 2012/0155463 A1 | 6/2012 | Vasseur et al. |
| 2012/0155475 A1 | 6/2012 | Vasseur et al. |
| 2012/0155511 A1 | 6/2012 | Shaffer et al. |
| 2012/0158933 A1 | 6/2012 | Shetty et al. |
| 2012/0176931 A1 | 7/2012 | Jetcheva et al. |
| 2012/0176941 A1 | 7/2012 | Bata et al. |
| 2012/0182867 A1 | 7/2012 | Farrag et al. |
| 2012/0188968 A1 | 7/2012 | Mie et al. |
| 2012/0196636 A1 | 8/2012 | Pratt, Jr. et al. |
| 2012/0197988 A1 | 8/2012 | Leppanen et al. |
| 2012/0207294 A1 | 8/2012 | Katpelly et al. |
| 2012/0208592 A1 | 8/2012 | Davis et al. |
| 2012/0209808 A1 | 8/2012 | Tien et al. |
| 2012/0209910 A1 | 8/2012 | Svendsen et al. |
| 2012/0210233 A1 | 8/2012 | Davis et al. |
| 2012/0213124 A1 | 8/2012 | Vasseur et al. |
| 2012/0224587 A1 | 9/2012 | Eriksson |
| 2012/0224743 A1 | 9/2012 | Rodriguez et al. |
| 2012/0230204 A1 | 9/2012 | Vasseur et al. |
| 2012/0230222 A1 | 9/2012 | Shaffer et al. |
| 2012/0230370 A1 | 9/2012 | Shaffer et al. |
| 2012/0233326 A1 | 9/2012 | Shaffer et al. |
| 2012/0233485 A1 | 9/2012 | Shaffer et al. |
| 2012/0235579 A1 | 9/2012 | Chemel et al. |
| 2012/0236724 A1 | 9/2012 | Rudnick et al. |
| 2012/0242501 A1 | 9/2012 | Tran et al. |
| 2012/0243408 A1 | 9/2012 | Leppanen et al. |
| 2012/0243621 A1 | 9/2012 | Hurwitz et al. |
| 2012/0250575 A1 | 10/2012 | Chiang et al. |
| 2012/0253974 A1 | 10/2012 | Haikonen et al. |
| 2012/0254338 A1 | 10/2012 | Agarwal et al. |
| 2012/0257624 A1 | 10/2012 | Thubert et al. |
| 2012/0258777 A1 | 10/2012 | Huang |
| 2012/0272295 A1 | 10/2012 | Patton et al. |
| 2012/0275642 A1 | 11/2012 | Aller et al. |
| 2012/0277893 A1 | 11/2012 | Davis et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0287941 A1 | 11/2012 | Howe et al. |
| 2012/0294152 A1 | 11/2012 | Yousefi'zadeh et al. |
| 2012/0300758 A1 | 11/2012 | Turunen et al. |
| 2012/0307624 A1 | 12/2012 | Vasseur et al. |
| 2012/0307629 A1 | 12/2012 | Vasseur et al. |
| 2012/0307652 A1 | 12/2012 | Vasseur et al. |
| 2012/0307653 A1 | 12/2012 | Vasseur et al. |
| 2012/0307676 A1 | 12/2012 | Chan et al. |
| 2012/0307752 A1 | 12/2012 | Hirata et al. |
| 2012/0307825 A1 | 12/2012 | Hui et al. |
| 2012/0309417 A1 | 12/2012 | Blom et al. |
| 2012/0311334 A1 | 12/2012 | Bruestle et al. |
| 2012/0314660 A1 | 12/2012 | Leppanen et al. |
| 2012/0320768 A1 | 12/2012 | Shaffer et al. |
| 2012/0320781 A1 | 12/2012 | Furukawa et al. |
| 2012/0320790 A1 | 12/2012 | Shaffer et al. |
| 2012/0320923 A1 | 12/2012 | Vasseur et al. |
| 2012/0324273 A1 | 12/2012 | Shaffer et al. |
| 2012/0327792 A1 | 12/2012 | Guo et al. |
| 2012/0331316 A1 | 12/2012 | Liu et al. |
| 2013/0010590 A1 | 1/2013 | Vasseur et al. |
| 2013/0010615 A1 | 1/2013 | Hui et al. |
| 2013/0010798 A1 | 1/2013 | Shaffer et al. |
| 2013/0012220 A1 | 1/2013 | Waris et al. |
| 2013/0013806 A1 | 1/2013 | Woo et al. |
| 2013/0013809 A1 | 1/2013 | Vasseur et al. |
| 2013/0016612 A1 | 1/2013 | Vasseur et al. |
| 2013/0016757 A1 | 1/2013 | Hui et al. |
| 2013/0016758 A1 | 1/2013 | Hui et al. |
| 2013/0016759 A1 | 1/2013 | Hui et al. |
| 2013/0018993 A1 | 1/2013 | Hui et al. |
| 2013/0019005 A1 | 1/2013 | Hui et al. |
| 2013/0022042 A1 | 1/2013 | Vasseur et al. |
| 2013/0022046 A1 | 1/2013 | Vasseur et al. |
| 2013/0022053 A1 | 1/2013 | Vasseur et al. |
| 2013/0022083 A1 | 1/2013 | Vasseur et al. |
| 2013/0022084 A1 | 1/2013 | Vasseur et al. |
| 2013/0024149 A1 | 1/2013 | Nayar et al. |
| 2013/0024560 A1 | 1/2013 | Vasseur et al. |
| 2013/0028095 A1 | 1/2013 | Vasseur et al. |
| 2013/0028103 A1 | 1/2013 | Hui et al. |
| 2013/0028104 A1 | 1/2013 | Hui et al. |
| 2013/0028140 A1 | 1/2013 | Hui et al. |
| 2013/0028143 A1 | 1/2013 | Vasseur et al. |
| 2013/0028295 A1 | 1/2013 | Hui et al. |
| 2013/0031253 A1 | 1/2013 | Hui et al. |
| 2013/0033987 A1 | 2/2013 | Jetcheva et al. |
| 2013/0034031 A1 | 2/2013 | Sherman et al. |
| 2013/0042301 A1 | 2/2013 | Mahamuni et al. |
| 2013/0045759 A1 | 2/2013 | Smith |
| 2013/0051250 A1 | 2/2013 | Shaffer et al. |
| 2013/0055383 A1 | 2/2013 | Shaffer et al. |
| 2013/0059585 A1 | 3/2013 | Giloh |
| 2013/0064072 A1 | 3/2013 | Vasseur et al. |
| 2013/0064102 A1 | 3/2013 | Chang et al. |
| 2013/0064137 A1 | 3/2013 | Santoso et al. |
| 2013/0067063 A1 | 3/2013 | Vasseur et al. |
| 2013/0069780 A1 | 3/2013 | Tran et al. |
| 2013/0070597 A1 | 3/2013 | Liu |
| 2013/0070751 A1 | 3/2013 | Atwal et al. |
| 2013/0079152 A1 | 3/2013 | Hall |
| 2013/0080307 A1 | 3/2013 | Hoffberg |
| 2013/0083658 A1 | 4/2013 | Vasseur et al. |
| 2013/0083688 A1 | 4/2013 | Mageed Al-Talib et al. |
| 2013/0086601 A1 | 4/2013 | Adimatyam et al. |
| 2013/0088999 A1 | 4/2013 | Thubert et al. |
| 2013/0089011 A1 | 4/2013 | Alapuranen |
| 2013/0094366 A1 | 4/2013 | Lee et al. |
| 2013/0094398 A1 | 4/2013 | Das et al. |
| 2013/0094536 A1 | 4/2013 | Hui et al. |
| 2013/0094537 A1 | 4/2013 | Hui et al. |
| 2013/0100872 A1 | 4/2013 | Zou et al. |
| 2013/0100942 A1 | 4/2013 | Rudnick et al. |
| 2013/0103765 A1 | 4/2013 | Papakipos et al. |
| 2013/0107726 A1 | 5/2013 | Hughes et al. |
| 2013/0107758 A1 | 5/2013 | Waheed |
| 2013/0111038 A1 | 5/2013 | Girard |
| 2013/0121176 A1 | 5/2013 | Addepalli et al. |
| 2013/0121331 A1 | 5/2013 | Vasseur et al. |
| 2013/0121335 A1 | 5/2013 | Hui et al. |
| 2013/0122807 A1 | 5/2013 | Tenarvitz et al. |
| 2013/0124883 A1 | 5/2013 | Addepalli et al. |
| 2013/0128726 A1 | 5/2013 | Hellhake et al. |
| 2013/0128773 A1 | 5/2013 | Thubert et al. |
| 2013/0136416 A1 | 5/2013 | Sathish et al. |
| 2013/0138792 A1 | 5/2013 | Preden et al. |
| 2013/0143529 A1 | 6/2013 | Leppanen |
| 2013/0143535 A1 | 6/2013 | Leppanen et al. |
| 2013/0148573 A1 | 6/2013 | Boland et al. |
| 2013/0151563 A1 | 6/2013 | Addepalli et al. |
| 2013/0159479 A1 | 6/2013 | Vasseur |
| 2013/0159548 A1 | 6/2013 | Vasseur et al. |
| 2013/0159550 A1 | 6/2013 | Vasseur |
| 2013/0169838 A1 | 7/2013 | Rodriguez et al. |
| 2013/0170393 A1 | 7/2013 | Bill |
| 2013/0170394 A1 | 7/2013 | Bill |
| 2013/0177025 A1 | 7/2013 | Hurwitz et al. |
| 2013/0178718 A1 | 7/2013 | Tran et al. |
| 2013/0182566 A1 | 7/2013 | Goergen et al. |
| 2013/0183952 A1 | 7/2013 | Davis et al. |
| 2013/0188471 A1 | 7/2013 | Bade et al. |
| 2013/0188492 A1 | 7/2013 | Gorgen et al. |
| 2013/0188513 A1 | 7/2013 | Vasseur et al. |
| 2013/0188562 A1 | 7/2013 | Espina Perez et al. |

(56) References Cited

U.S. PATENT DOCUMENTS

| | | |
|---|---|---|
| 2013/0191688 A1 | 7/2013 | Agarwal et al. |
| 2013/0194970 A1 | 8/2013 | Bill |
| 2013/0195095 A1 | 8/2013 | Bill |
| 2013/0201316 A1 | 8/2013 | Binder et al. |
| 2013/0201869 A1 | 8/2013 | Wilden et al. |
| 2013/0201891 A1 | 8/2013 | Rodriguez et al. |
| 2013/0208583 A1 | 8/2013 | Guo et al. |
| 2013/0208714 A1 | 8/2013 | Bill |
| 2013/0215739 A1 | 8/2013 | Zhang |
| 2013/0215942 A1 | 8/2013 | Addepalli et al. |
| 2013/0219045 A1 | 8/2013 | Agarwal et al. |
| 2013/0219046 A1 | 8/2013 | Wetterwald et al. |
| 2013/0219478 A1 | 8/2013 | Mahamuni et al. |
| 2013/0223218 A1 | 8/2013 | Vasseur et al. |
| 2013/0223225 A1 | 8/2013 | Hui et al. |
| 2013/0223229 A1 | 8/2013 | Hui et al. |
| 2013/0223237 A1 | 8/2013 | Hui et al. |
| 2013/0223275 A1 | 8/2013 | Vasseur et al. |
| 2013/0223447 A1 | 8/2013 | Kahng et al. |
| 2013/0227055 A1 | 8/2013 | Vasseur et al. |
| 2013/0227114 A1 | 8/2013 | Vasseur et al. |
| 2013/0227336 A1 | 8/2013 | Agarwal et al. |
| 2013/0235799 A1 | 9/2013 | Ji |
| 2013/0242929 A1 | 9/2013 | Gorgen et al. |
| 2013/0242956 A1 | 9/2013 | Hall |
| 2013/0250754 A1 | 9/2013 | Vasseur et al. |
| 2013/0250795 A1 | 9/2013 | Chan et al. |
| 2013/0250808 A1 | 9/2013 | Hui et al. |
| 2013/0250809 A1 | 9/2013 | Hui et al. |
| 2013/0250811 A1 | 9/2013 | Vasseur et al. |
| 2013/0250866 A1 | 9/2013 | Hui et al. |
| 2013/0250945 A1 | 9/2013 | Hui et al. |
| 2013/0250953 A1 | 9/2013 | Hui et al. |
| 2013/0250969 A1 | 9/2013 | Hui et al. |
| 2013/0251053 A1 | 9/2013 | Hui et al. |
| 2013/0251054 A1 | 9/2013 | Hui et al. |
| 2013/0259096 A1 | 10/2013 | Romero et al. |
| 2013/0275513 A1 | 10/2013 | Borovyk et al. |
| 2013/0279365 A1 | 10/2013 | Hui et al. |
| 2013/0279540 A1 | 10/2013 | Hui et al. |
| 2013/0283347 A1 | 10/2013 | Hui et al. |
| 2013/0283360 A1 | 10/2013 | Hui et al. |
| 2013/0286892 A1 | 10/2013 | Fuste Vilella et al. |
| 2013/0286942 A1 | 10/2013 | Bonar et al. |
| 2013/0290560 A1 | 10/2013 | Chaki |
| 2013/0290843 A1 | 10/2013 | Lehtiniemi et al. |
| 2013/0290985 A1 | 10/2013 | Walsh |
| 2013/0301405 A1 | 11/2013 | Fuste Vilella et al. |
| 2013/0301584 A1 | 11/2013 | Addepalli et al. |
| 2013/0308495 A1 | 11/2013 | Tucker et al. |
| 2013/0310896 A1 | 11/2013 | Mass |
| 2013/0311661 A1 | 11/2013 | McPhee |
| 2013/0315077 A1 | 11/2013 | Toshiaki et al. |
| 2013/0315078 A1 | 11/2013 | Brown et al. |
| 2013/0315102 A1 | 11/2013 | Kahng et al. |
| 2013/0315131 A1 | 11/2013 | Brown et al. |
| 2013/0322294 A1 | 12/2013 | Jing et al. |
| 2013/0332010 A1 | 12/2013 | Ziarno |
| 2013/0332011 A1 | 12/2013 | Ziarno |
| 2013/0332025 A1 | 12/2013 | Ziarno |
| 2013/0336199 A1 | 12/2013 | Schwartz et al. |
| 2013/0336289 A1 | 12/2013 | Koifman et al. |
| 2013/0336316 A1 | 12/2013 | Sudhaakar et al. |
| 2013/0342355 A1 | 12/2013 | Lund et al. |
| 2014/0006411 A1 | 1/2014 | Boldyrev et al. |
| 2014/0006893 A1 | 1/2014 | Shetty et al. |
| 2014/0016643 A1 | 1/2014 | Vasseur et al. |
| 2014/0022906 A1 | 1/2014 | Vasseur et al. |
| 2014/0029432 A1 | 1/2014 | Vasseur et al. |
| 2014/0029445 A1 | 1/2014 | Hui et al. |
| 2014/0029470 A1 | 1/2014 | Ghanadan et al. |
| 2014/0029603 A1 | 1/2014 | Nomura et al. |
| 2014/0029610 A1 | 1/2014 | Vasseur et al. |
| 2014/0029624 A1 | 1/2014 | Vasseur |
| 2014/0036722 A1 | 2/2014 | Giloh et al. |
| 2014/0036727 A1 | 2/2014 | Chung et al. |
| 2014/0036908 A1 | 2/2014 | Hui et al. |
| 2014/0036912 A1 | 2/2014 | Hui et al. |
| 2014/0036925 A1 | 2/2014 | Hui et al. |
| 2014/0046882 A1 | 2/2014 | Wood |
| 2014/0055284 A1 | 2/2014 | Tran et al. |
| 2014/0064172 A1 | 3/2014 | Hui et al. |
| 2014/0068105 A1 | 3/2014 | Thubert et al. |
| 2014/0071826 A1 | 3/2014 | Leguay et al. |
| 2014/0071837 A1 | 3/2014 | Werb et al. |
| 2014/0080492 A1 | 3/2014 | Shoshan et al. |
| 2014/0081793 A1 | 3/2014 | Hoffberg |
| 2014/0086041 A1 | 3/2014 | Shah et al. |
| 2014/0092752 A1 | 4/2014 | Hui et al. |
| 2014/0092753 A1 | 4/2014 | Vasseur et al. |
| 2014/0092769 A1 | 4/2014 | Shaffer et al. |
| 2014/0092905 A1 | 4/2014 | Hui et al. |
| 2014/0095864 A1 | 4/2014 | Dasgupta et al. |
| 2014/0105015 A1 | 4/2014 | Hui et al. |
| 2014/0105027 A1 | 4/2014 | Shaffer et al. |
| 2014/0105033 A1 | 4/2014 | Vasseur et al. |
| 2014/0105211 A1 | 4/2014 | Hui et al. |
| 2014/0108643 A1 | 4/2014 | Hui et al. |
| 2014/0114549 A1 | 4/2014 | Ziarno |
| 2014/0114554 A1 | 4/2014 | Lagassey |
| 2014/0114555 A1 | 4/2014 | Lagassey |
| 2014/0121476 A1 | 5/2014 | Tran et al. |
| 2014/0122673 A1 | 5/2014 | Shaffer et al. |
| 2014/0123227 A1 | 5/2014 | Twitchell, Jr. et al. |
| 2014/0123278 A1 | 5/2014 | Thubert et al. |
| 2014/0126348 A1 | 5/2014 | Mahamuni et al. |
| 2014/0126354 A1 | 5/2014 | Hui et al. |
| 2014/0126419 A1 | 5/2014 | Boland et al. |
| 2014/0126423 A1 | 5/2014 | Vasseur et al. |
| 2014/0126426 A1 | 5/2014 | Vasseur et al. |
| 2014/0126431 A1 | 5/2014 | Hui et al. |
| 2014/0126610 A1 | 5/2014 | Hui et al. |
| 2014/0129734 A1 | 5/2014 | Vasseur et al. |
| 2014/0129876 A1 | 5/2014 | Addepalli et al. |
| 2014/0136881 A1 | 5/2014 | Vasseur et al. |
| 2014/0161015 A1 | 6/2014 | Brown, III et al. |
| 2014/0167912 A1 | 6/2014 | Snyder et al. |
| 2014/0171021 A1 | 6/2014 | Davis et al. |
| 2014/0185499 A1 | 7/2014 | Ray et al. |
| 2014/0195668 A1 | 7/2014 | Selvakumar et al. |
| 2014/0219078 A1 | 8/2014 | Dasgupta et al. |
| 2014/0219103 A1 | 8/2014 | Vasseur et al. |
| 2014/0219114 A1 | 8/2014 | Vasseur et al. |
| 2014/0219133 A1 | 8/2014 | Dasgupta et al. |
| 2014/0222725 A1 | 8/2014 | Vasseur et al. |
| 2014/0222726 A1 | 8/2014 | Mermoud et al. |
| 2014/0222727 A1 | 8/2014 | Vasseur et al. |
| 2014/0222728 A1 | 8/2014 | Vasseur et al. |
| 2014/0222729 A1 | 8/2014 | Dasgupta et al. |
| 2014/0222730 A1 | 8/2014 | Vasseur et al. |
| 2014/0222731 A1 | 8/2014 | Mermoud et al. |
| 2014/0222748 A1 | 8/2014 | Mermoud et al. |
| 2014/0222975 A1 | 8/2014 | Vasseur et al. |
| 2014/0222983 A1 | 8/2014 | Dasgupta et al. |
| 2014/0222996 A1 | 8/2014 | Vasseur et al. |
| 2014/0222997 A1 | 8/2014 | Mermoud et al. |
| 2014/0222998 A1 | 8/2014 | Vasseur et al. |
| 2014/0223155 A1 | 8/2014 | Vasseur et al. |
| 2014/0233426 A1 | 8/2014 | Eriksson |
| 2014/0245055 A1 | 8/2014 | Shaffer et al. |
| 2014/0247726 A1 | 9/2014 | Vasseur |
| 2014/0247752 A1 | 9/2014 | Patil et al. |
| 2014/0247804 A1 | 9/2014 | Wermuth et al. |
| 2014/0254433 A1 | 9/2014 | Abe et al. |
| 2014/0269402 A1 | 9/2014 | Vasseur et al. |
| 2014/0269413 A1 | 9/2014 | Hui et al. |
| 2014/0269487 A1 | 9/2014 | Kalkunte |
| 2014/0269514 A1 | 9/2014 | Leppanen et al. |
| 2014/0269592 A1 | 9/2014 | Addepalli et al. |
| 2014/0269759 A1 | 9/2014 | Thubert et al. |
| 2014/0273920 A1 | 9/2014 | Smith |
| 2014/0278475 A1 | 9/2014 | Tran |
| 2014/0281670 A1 | 9/2014 | Vasseur et al. |
| 2014/0285090 A1 | 9/2014 | Chemel et al. |

(56) References Cited

U.S. PATENT DOCUMENTS

| | | |
|---|---|---|
| 2014/0285095 A1 | 9/2014 | Chemel et al. |
| 2014/0286301 A1 | 9/2014 | Werb et al. |
| 2014/0286377 A1 | 9/2014 | Shaffer et al. |
| 2014/0293605 A1 | 10/2014 | Chemel et al. |
| 2014/0293787 A1 | 10/2014 | Bourdelles et al. |
| 2014/0297206 A1 | 10/2014 | Silverman |
| 2014/0302773 A1 | 10/2014 | Jantunen et al. |
| 2014/0302774 A1 | 10/2014 | Burke et al. |
| 2014/0304427 A1 | 10/2014 | Vasseur et al. |
| 2014/0307614 A1 | 10/2014 | Ruiz et al. |
| 2014/0310243 A1 | 10/2014 | McGee et al. |
| 2014/0310349 A1 | 10/2014 | Rainisto |
| 2014/0314096 A1 | 10/2014 | Hui et al. |
| 2014/0320021 A1 | 10/2014 | Conwell |
| 2014/0321325 A1 | 10/2014 | Jing et al. |
| 2014/0324596 A1 | 10/2014 | Rodriguez |
| 2014/0324833 A1 | 10/2014 | Davis et al. |
| 2014/0328346 A1 | 11/2014 | Hui et al. |
| 2014/0330947 A1 | 11/2014 | Hui et al. |
| 2014/0330985 A1 | 11/2014 | Wong et al. |
| 2014/0333990 A1 | 11/2014 | Moskowitz |
| 2014/0335952 A1 | 11/2014 | Hall |
| 2014/0341227 A1 | 11/2014 | Redi et al. |
| 2014/0349684 A1 | 11/2014 | Leppanen et al. |
| 2014/0355425 A1 | 12/2014 | Vasseur et al. |
| 2014/0357295 A1 | 12/2014 | Skomra et al. |
| 2014/0357312 A1 | 12/2014 | Davis et al. |
| 2014/0362847 A1 | 12/2014 | Turunen et al. |
| 2014/0369550 A1 | 12/2014 | Davis et al. |
| 2014/0372577 A1 | 12/2014 | Hui et al. |
| 2014/0372585 A1 | 12/2014 | Hui et al. |
| 2014/0376361 A1 | 12/2014 | Hui et al. |
| 2014/0376407 A1 | 12/2014 | Ghanadan et al. |
| 2014/0376427 A1 | 12/2014 | Hui et al. |
| 2014/0379896 A1 | 12/2014 | Vasseur et al. |
| 2014/0379900 A1 | 12/2014 | Dasgupta et al. |
| 2015/0002336 A1 | 1/2015 | Thubert et al. |
| 2015/0003251 A1 | 1/2015 | Shaffer et al. |
| 2015/0003292 A1 | 1/2015 | Ghanadan et al. |
| 2015/0003293 A1 | 1/2015 | Ghanadan et al. |
| 2015/0003428 A1 | 1/2015 | Woo et al. |
| 2015/0009829 A1 | 1/2015 | Ghanadan et al. |
| 2015/0010153 A1 | 1/2015 | Robertson |
| 2015/0016688 A1 | 1/2015 | Aller |
| 2015/0023174 A1 | 1/2015 | Dasgupta et al. |
| 2015/0023186 A1 | 1/2015 | Vasseur et al. |
| 2015/0023205 A1 | 1/2015 | Vasseur et al. |
| 2015/0023363 A1 | 1/2015 | Hui et al. |
| 2015/0023369 A1 | 1/2015 | Hui et al. |
| 2015/0026268 A1 | 1/2015 | Hui et al. |
| 2015/0030033 A1 | 1/2015 | Vasseur et al. |
| 2015/0031400 A1 | 1/2015 | Tian et al. |
| 2015/0043384 A1 | 2/2015 | Hui et al. |
| 2015/0043519 A1 | 2/2015 | Hui et al. |
| 2015/0046696 A1 | 2/2015 | Zheng |
| 2015/0055650 A1 | 2/2015 | Bhat et al. |
| 2015/0061511 A1 | 3/2015 | Chemel et al. |
| 2015/0063365 A1 | 3/2015 | Hui et al. |
| 2015/0066650 A1 | 3/2015 | Liu et al. |
| 2015/0071295 A1 | 3/2015 | Hui et al. |
| 2015/0072728 A1 | 3/2015 | Rodriguez et al. |
| 2015/0078182 A1 | 3/2015 | Das et al. |
| 2015/0081840 A1 | 3/2015 | Patil et al. |
| 2015/0089081 A1 | 3/2015 | Thubert et al. |
| 2015/0092529 A1 | 4/2015 | Vasseur et al. |
| 2015/0092538 A1 | 4/2015 | Vasseur et al. |
| 2015/0092560 A1 | 4/2015 | Hui et al. |
| 2015/0092661 A1 | 4/2015 | Huang et al. |
| 2015/0103813 A1 | 4/2015 | Jetcheva et al. |
| 2015/0109962 A1 | 4/2015 | Liao et al. |
| 2015/0110104 A1 | 4/2015 | Jetcheva et al. |
| 2015/0111591 A1 | 4/2015 | Hoffberg |
| 2015/0117221 A1 | 4/2015 | Ghanadan et al. |
| 2015/0117305 A1 | 4/2015 | Palankar et al. |
| 2015/0138977 A1 | 5/2015 | Dacosta |
| 2015/0139034 A1 | 5/2015 | Kang et al. |
| 2015/0139231 A1 | 5/2015 | Moeskops et al. |
| 2015/0146603 A1 | 5/2015 | Wu et al. |
| 2015/0149469 A1 | 5/2015 | Xu et al. |
| 2015/0154239 A1 | 6/2015 | Boldyrev et al. |
| 2015/0155637 A1 | 6/2015 | Kuiper |
| 2015/0156199 A1 | 6/2015 | Dasgupta et al. |
| 2015/0172953 A1 | 6/2015 | Firoiu et al. |
| 2015/0180772 A1 | 6/2015 | Hui et al. |
| 2015/0180800 A1 | 6/2015 | Vasseur |
| 2015/0186642 A1 | 7/2015 | Cruz Mota et al. |
| 2015/0186775 A1 | 7/2015 | Cruz Mota et al. |
| 2015/0186799 A1 | 7/2015 | Dasgupta et al. |
| 2015/0188754 A1 | 7/2015 | Stamatelakis et al. |
| 2015/0188801 A1 | 7/2015 | Dasgupta et al. |
| 2015/0188934 A1 | 7/2015 | Vasseur et al. |
| 2015/0188935 A1 | 7/2015 | Vasseur et al. |
| 2015/0188949 A1 | 7/2015 | Mahaffey et al. |
| 2015/0193693 A1 | 7/2015 | Vasseur et al. |
| 2015/0193694 A1 | 7/2015 | Vasseur et al. |
| 2015/0193695 A1 | 7/2015 | Cruz Mota et al. |
| 2015/0193696 A1 | 7/2015 | Vasseur et al. |
| 2015/0193697 A1 | 7/2015 | Vasseur et al. |
| 2015/0195126 A1 | 7/2015 | Vasseur et al. |
| 2015/0195136 A1 | 7/2015 | Mermoud et al. |
| 2015/0195144 A1 | 7/2015 | Vasseur et al. |
| 2015/0195145 A1 | 7/2015 | Di Pietro et al. |
| 2015/0195146 A1 | 7/2015 | Di Pietro et al. |
| 2015/0195149 A1 | 7/2015 | Vasseur et al. |
| 2015/0195171 A1 | 7/2015 | Mermoud et al. |
| 2015/0195184 A1 | 7/2015 | Vasseur et al. |
| 2015/0195185 A1 | 7/2015 | Dasgupta et al. |
| 2015/0195192 A1 | 7/2015 | Vasseur et al. |
| 2015/0195212 A1 | 7/2015 | Vasseur et al. |
| 2015/0195216 A1 | 7/2015 | Di Pietro et al. |
| 2015/0195296 A1 | 7/2015 | Vasseur et al. |
| 2015/0195692 A1 | 7/2015 | Chow et al. |
| 2015/0200713 A1 | 7/2015 | Hui et al. |
| 2015/0200714 A1 | 7/2015 | Hui et al. |
| 2015/0200738 A1 | 7/2015 | Wetterwald et al. |
| 2015/0200810 A1 | 7/2015 | Vasseur et al. |
| 2015/0200846 A1 | 7/2015 | Hui et al. |
| 2015/0201415 A1 | 7/2015 | Jetcheva et al. |
| 2015/0207677 A1 | 7/2015 | Choudhury et al. |
| 2015/0207724 A1 | 7/2015 | Choudhury et al. |
| 2015/0207916 A1 | 7/2015 | Xue et al. |
| 2015/0208316 A1 | 7/2015 | Mosko et al. |
| 2015/0208318 A1 | 7/2015 | Mosko et al. |
| 2015/0237130 A1 | 8/2015 | Hui et al. |
| 2015/0237556 A1 | 8/2015 | Giloh |
| 2015/0237559 A1 | 8/2015 | Giloh |
| 2015/0244481 A1 | 8/2015 | Tyson et al. |
| 2015/0244484 A1 | 8/2015 | Tyson et al. |
| 2015/0244623 A1 | 8/2015 | Heydon et al. |
| 2015/0244648 A1 | 8/2015 | Tyson et al. |
| 2015/0245179 A1 | 8/2015 | Jarvis et al. |
| 2015/0245203 A1 | 8/2015 | Tyson et al. |
| 2015/0245231 A1 | 8/2015 | Jarvis et al. |
| 2015/0245412 A1 | 8/2015 | Tyson et al. |
| 2015/0263863 A1 | 9/2015 | Kalkunte |
| 2015/0264626 A1 | 9/2015 | Perdomo |
| 2015/0264627 A1 | 9/2015 | Perdomo |
| 2015/0271080 A1 | 9/2015 | Garcia-Luna-Aceves et al. |
| 2015/0304209 A1 | 10/2015 | Choudhury et al. |
| 2015/0311948 A1 | 10/2015 | Hui et al. |
| 2015/0316926 A1 | 11/2015 | Ziarno |
| 2015/0318891 A1 | 11/2015 | Hui et al. |
| 2015/0318892 A1 | 11/2015 | Hui et al. |
| 2015/0319076 A1 | 11/2015 | Vasseur et al. |
| 2015/0319077 A1 | 11/2015 | Vasseur et al. |
| 2015/0319084 A1 | 11/2015 | Hui et al. |
| 2015/0324582 A1 | 11/2015 | Vasseur et al. |
| 2015/0326450 A1 | 11/2015 | Cruz Mota et al. |
| 2015/0326598 A1 | 11/2015 | Vasseur et al. |
| 2015/0326609 A1 | 11/2015 | Cruz Mota et al. |
| 2015/0327260 A1 | 11/2015 | Hui et al. |
| 2015/0327261 A1 | 11/2015 | Thubert et al. |
| 2015/0330869 A1 | 11/2015 | Ziarno |
| 2015/0331652 A1 | 11/2015 | Jantunen et al. |

(56) References Cited

U.S. PATENT DOCUMENTS

| | | |
|---|---|---|
| 2015/0332165 A1 | 11/2015 | Mermoud et al. |
| 2015/0333997 A1 | 11/2015 | Mermoud et al. |
| 2015/0334031 A1 | 11/2015 | Vasseur et al. |
| 2015/0334123 A1 | 11/2015 | Di Pietro et al. |
| 2015/0334209 A1 | 11/2015 | Song |
| 2015/0341140 A1 | 11/2015 | Hui et al. |
| 2015/0341874 A1 | 11/2015 | Nguyen-Dang |
| 2015/0350018 A1 | 12/2015 | Hui et al. |
| 2015/0350245 A1 | 12/2015 | Twitchell, Jr. et al. |
| 2015/0351084 A1 | 12/2015 | Werb |
| 2015/0359020 A1 | 12/2015 | Reynaud et al. |
| 2015/0363981 A1 | 12/2015 | Ziarno et al. |
| 2015/0372903 A1 | 12/2015 | Hui et al. |
| 2015/0373700 A1 | 12/2015 | Holtzman et al. |
| 2015/0381489 A1 | 12/2015 | Jetcheva et al. |
| 2015/0382275 A1 | 12/2015 | Pragada et al. |
| 2015/0382278 A1 | 12/2015 | Fallon et al. |
| 2016/0006573 A1 | 1/2016 | Wu et al. |
| 2016/0020864 A1 | 1/2016 | Thubert et al. |
| 2016/0020967 A1 | 1/2016 | Thubert et al. |
| 2016/0020979 A1 | 1/2016 | Thubert et al. |
| 2016/0020987 A1 | 1/2016 | Wetterwald et al. |
| 2016/0020988 A1 | 1/2016 | Hui et al. |
| 2016/0020997 A1 | 1/2016 | Hui et al. |
| 2016/0021006 A1 | 1/2016 | Vasseur et al. |
| 2016/0021009 A1 | 1/2016 | Hui et al. |
| 2016/0021011 A1 | 1/2016 | Vasseur et al. |
| 2016/0021013 A1 | 1/2016 | Vasseur et al. |
| 2016/0021014 A1 | 1/2016 | Wetterwald et al. |
| 2016/0021017 A1 | 1/2016 | Thubert et al. |
| 2016/0021018 A1 | 1/2016 | Hui et al. |
| 2016/0021126 A1 | 1/2016 | Vasseur et al. |
| 2016/0021596 A1 | 1/2016 | Hui et al. |
| 2016/0021647 A1 | 1/2016 | Hui et al. |
| 2016/0026542 A1 | 1/2016 | Vasseur et al. |
| 2016/0027054 A1 | 1/2016 | Leppanen et al. |
| 2016/0028609 A1 | 1/2016 | Hui et al. |
| 2016/0028750 A1 | 1/2016 | Di Pietro et al. |
| 2016/0028751 A1 | 1/2016 | Cruz Mota et al. |
| 2016/0028752 A1 | 1/2016 | Di Pietro et al. |
| 2016/0028753 A1 | 1/2016 | Di Pietro et al. |
| 2016/0028754 A1 | 1/2016 | Cruz Mota et al. |
| 2016/0028755 A1 | 1/2016 | Vasseur et al. |
| 2016/0028762 A1 | 1/2016 | Di Pietro et al. |
| 2016/0028763 A1 | 1/2016 | Cruz Mota et al. |
| 2016/0028764 A1 | 1/2016 | Vasseur et al. |
| 2016/0029182 A1 | 1/2016 | Leppanen |
| 2016/0044035 A1 | 2/2016 | Huang |
| 2016/0057116 A1 | 2/2016 | Charan et al. |
| 2016/0072699 A1 | 3/2016 | Gei et al. |
| 2016/0073271 A1 | 3/2016 | Schultz et al. |
| 2016/0080030 A1 | 3/2016 | Hui et al. |
| 2016/0081102 A1 | 3/2016 | Ji |
| 2016/0088424 A1* | 3/2016 | Polo .................... H04W 88/04 455/41.1 |
| 2016/0094398 A1 | 3/2016 | Choudhury et al. |
| 2016/0099770 A1 | 4/2016 | Glottmann |
| 2016/0100316 A1 | 4/2016 | Mosko et al. |
| 2016/0100417 A1 | 4/2016 | Mosko |
| 2016/0105356 A1 | 4/2016 | Dowdell et al. |
| 2016/0105523 A1 | 4/2016 | Dowdell |
| 2016/0112929 A1* | 4/2016 | Das .................... H04W 40/06 370/315 |
| 2016/0116819 A1 | 4/2016 | Moskowitz |
| 2016/0119739 A1 | 4/2016 | Hampel et al. |
| 2016/0127257 A1 | 5/2016 | Wang et al. |
| 2016/0127942 A1 | 5/2016 | Ghanadan et al. |
| 2016/0127978 A1 | 5/2016 | Jing et al. |
| 2016/0132397 A1 | 5/2016 | Hui et al. |
| 2016/0134161 A1 | 5/2016 | Hui et al. |
| 2016/0134468 A1 | 5/2016 | Hui et al. |
| 2016/0134514 A1 | 5/2016 | Hui et al. |
| 2016/0134516 A1 | 5/2016 | Hui et al. |
| 2016/0134539 A1 | 5/2016 | Hui et al. |
| 2016/0142248 A1 | 5/2016 | Thubert et al. |
| 2016/0142901 A1 | 5/2016 | Leppanen et al. |
| 2016/0149805 A1 | 5/2016 | Hui et al. |
| 2016/0149856 A1 | 5/2016 | Hui et al. |
| 2016/0150501 A1 | 5/2016 | Hui et al. |
| 2016/0156450 A1 | 6/2016 | Hui et al. |
| 2016/0182121 A1 | 6/2016 | Shaffer et al. |
| 2016/0182170 A1 | 6/2016 | Daoura et al. |
| 2016/0183351 A1 | 6/2016 | Snyder et al. |
| 2016/0191487 A1 | 6/2016 | Twitchell, Jr. et al. |
| 2016/0191488 A1 | 6/2016 | Twitchell, Jr. et al. |
| 2016/0192274 A1 | 6/2016 | Metke et al. |
| 2016/0197800 A1 | 7/2016 | Hui et al. |
| 2016/0197831 A1 | 7/2016 | De Foy et al. |
| 2016/0198244 A1 | 7/2016 | Lund et al. |
| 2016/0212729 A1 | 7/2016 | Bulten et al. |
| 2016/0212740 A1 | 7/2016 | Hui et al. |
| 2016/0224951 A1 | 8/2016 | Hoffberg |
| 2016/0248661 A1 | 8/2016 | Dasgupta et al. |
| 2016/0249254 A1 | 8/2016 | Giloh et al. |
| 2016/0269275 A1 | 9/2016 | Garcia-Luna-Aceves et al. |
| 2016/0269976 A1 | 9/2016 | Jetcheva et al. |
| 2016/0277201 A1 | 9/2016 | Thubert et al. |
| 2016/0277469 A1 | 9/2016 | Gilson et al. |
| 2016/0277874 A1 | 9/2016 | Lee et al. |
| 2016/0294493 A2 | 10/2016 | Daoura et al. |
| 2016/0302195 A1 | 10/2016 | Zhang et al. |
| 2016/0308793 A1 | 10/2016 | Levy-Abegnoli et al. |
| 2016/0309392 A1 | 10/2016 | Agardh |
| 2016/0315848 A1 | 10/2016 | Weinstein |
| 2016/0323012 A1 | 11/2016 | Kwon et al. |
| 2016/0323113 A1 | 11/2016 | Bruestle et al. |
| 2016/0330107 A1 | 11/2016 | Thubert et al. |
| 2016/0345236 A1 | 11/2016 | Shoshan et al. |
| 2016/0359592 A1 | 12/2016 | Kulshreshtha et al. |
| 2016/0359677 A1 | 12/2016 | Kulshreshtha et al. |
| 2016/0366553 A1 | 12/2016 | Belimpasakis et al. |
| 2016/0380776 A1 | 12/2016 | Thubert et al. |
| 2017/0019970 A1 | 1/2017 | Chemel et al. |
| 2017/0034041 A1 | 2/2017 | Carofiglio et al. |
| 2017/0034760 A1 | 2/2017 | Ge |
| 2017/0041246 A1 | 2/2017 | Maino et al. |
| 2017/0041822 A1 | 2/2017 | Thommana et al. |
| 2017/0041868 A1 | 2/2017 | Palin et al. |
| 2017/0048783 A1 | 2/2017 | Savolainen |
| 2017/0048853 A1 | 2/2017 | Thubert et al. |
| 2017/0054644 A1 | 2/2017 | Dasgupta et al. |
| 2017/0070942 A1 | 3/2017 | Denteneer et al. |
| 2017/0078170 A1 | 3/2017 | Vasseur et al. |
| 2017/0078400 A1 | 3/2017 | Binder et al. |
| 2017/0086279 A1 | 3/2017 | Chemel et al. |
| 2017/0093687 A1 | 3/2017 | Wu et al. |
| 2017/0099226 A1 | 4/2017 | Vasseur et al. |
| 2017/0099567 A1 | 4/2017 | Kwon et al. |
| 2017/0099684 A1 | 4/2017 | Hui et al. |
| 2017/0103213 A1 | 4/2017 | Di Pietro et al. |
| 2017/0104727 A1 | 4/2017 | Jerkeby et al. |
| 2017/0111271 A1 | 4/2017 | Thubert et al. |
| 2017/0135021 A1 | 5/2017 | Ko et al. |
| 2017/0149639 A1 | 5/2017 | Vasseur et al. |
| 2017/0149651 A1 | 5/2017 | Kalkunte |
| 2017/0149882 A1 | 5/2017 | Roy |
| 2017/0149901 A1 | 5/2017 | Condeixa et al. |
| 2017/0150418 A1 | 5/2017 | Kim et al. |
| 2017/0155566 A1 | 6/2017 | Martinsen et al. |
| 2017/0156118 A1 | 6/2017 | Hellhake et al. |
| 2017/0161609 A1 | 6/2017 | Wood et al. |
| 2017/0163527 A1 | 6/2017 | Vasseur et al. |
| 2017/0164263 A1 | 6/2017 | Lindoff et al. |
| 2017/0164264 A1 | 6/2017 | Kato et al. |
| 2017/0180262 A1 | 6/2017 | Thubert et al. |
| 2017/0181053 A1 | 6/2017 | Aoun et al. |
| 2017/0187661 A1 | 6/2017 | Hui et al. |
| 2017/0195826 A1 | 7/2017 | Shaikh et al. |
| 2017/0206512 A1 | 7/2017 | Hoffberg |
| 2017/0237669 A1 | 8/2017 | Hui et al. |
| 2017/0238197 A1 | 8/2017 | Baroudi et al. |
| 2017/0244838 A1 | 8/2017 | Moato et al. |
| 2017/0250856 A1 | 8/2017 | Jetcheva et al. |
| 2017/0250898 A1 | 8/2017 | Sakoda et al. |

(56) References Cited

U.S. PATENT DOCUMENTS

| | | |
|---|---|---|
| 2017/0251246 A1 | 8/2017 | Hua |
| 2017/0251387 A1 | 8/2017 | Rossebo et al. |
| 2017/0259942 A1 | 9/2017 | Ziarno |
| 2017/0272144 A1 | 9/2017 | Thubert et al. |
| 2017/0272315 A1 | 9/2017 | Wetterwald et al. |
| 2017/0272978 A1 | 9/2017 | Giloh et al. |
| 2017/0273003 A1 | 9/2017 | Zhang et al. |
| 2017/0278198 A1 | 9/2017 | Papakipos et al. |
| 2017/0284839 A1 | 10/2017 | Ojala |
| 2017/0289225 A1 | 10/2017 | Snyder et al. |
| 2017/0289812 A1 | 10/2017 | Werb |
| 2017/0294988 A1 | 10/2017 | Condeixa et al. |
| 2017/0295081 A1 | 10/2017 | Mermoud et al. |
| 2017/0295455 A1 | 10/2017 | Kwon |
| 2017/0295609 A1 | 10/2017 | Darrow et al. |
| 2017/0300693 A1 | 10/2017 | Zhang et al. |
| 2017/0302663 A1 | 10/2017 | Nainar et al. |
| 2017/0303187 A1 | 10/2017 | Crouthamel et al. |
| 2017/0310553 A1 | 10/2017 | Welters et al. |
| 2017/0311423 A1 | 10/2017 | Clark et al. |
| 2017/0317713 A1 | 11/2017 | Tsai et al. |
| 2017/0317906 A1 | 11/2017 | Tsai et al. |
| 2017/0318453 A1 | 11/2017 | Raghu et al. |
| 2017/0324618 A1 | 11/2017 | Lapukhov et al. |
| 2017/0325127 A1 | 11/2017 | Raghu et al. |
| 2017/0331899 A1 | 11/2017 | Binder et al. |
| 2017/0332439 A1 | 11/2017 | Savolainen et al. |
| 2017/0339099 A1 | 11/2017 | Levy-Abegnoli et al. |
| 2017/0364409 A1 | 12/2017 | Hui et al. |
| 2017/0366456 A1 | 12/2017 | Dara et al. |
| 2017/0373775 A1 | 12/2017 | Daoura et al. |
| 2018/0006833 A1 | 1/2018 | Tatlicioglu et al. |
| 2018/0007687 A1 | 1/2018 | Baldemair et al. |
| 2018/0013573 A1 | 1/2018 | Kalkunte |
| 2018/0014241 A1 | 1/2018 | Perdomo |
| 2018/0024091 A1 | 1/2018 | Wang et al. |
| 2018/0026891 A1 | 1/2018 | Vasseur et al. |
| 2018/0027473 A1 | 1/2018 | Kalogridis et al. |
| 2018/0049043 A1 | 2/2018 | Hoffberg |
| 2018/0068358 A1 | 3/2018 | Hoffberg |
| 2018/0083862 A1 | 3/2018 | Thubert et al. |
| 2018/0103094 A1 | 4/2018 | Wetterwald et al. |
| 2018/0109492 A1 | 4/2018 | Thubert et al. |
| 2018/0109495 A1 | 4/2018 | Vasseur et al. |
| 2018/0109496 A1 | 4/2018 | Thubert et al. |
| 2018/0109533 A1 | 4/2018 | Thubert et al. |
| 2018/0109551 A1 | 4/2018 | Wetterwald et al. |
| 2018/0109954 A1 | 4/2018 | Henry et al. |
| 2018/0124812 A1 | 5/2018 | Thubert et al. |
| 2018/0131455 A1 | 5/2018 | Daoura et al. |
| 2018/0145841 A1 | 5/2018 | Thubert et al. |
| 2018/0145876 A1 | 5/2018 | Palankar |
| 2018/0184269 A1 | 6/2018 | Christoval et al. |

OTHER PUBLICATIONS

Corson, M. Scott, and Anthony Ephremides. "A distributed routing algorithm for mobile wireless networks." Wireless networks 1, No. 1 (1995): 61-81. doi.org/10.1007/BF01196259).

Abolhasan, M., Wysocki, T. & Dutkiewicz, E. (2004). A review of routing protocols for mobile ad hoc networks. Ad Hoc Networks, 2 (1), 1-22.

G. Aggelou, R. Tafazolli, RDMAR: a bandwidth-efficient routing protocol for mobile ad hoc networks, in: ACM International Workshop on Wireless Mobile Multimedia (WoWMoM), 1999, pp. 26-33.

S. Basagni, I. Chlamtac, V.R. Syrotivk, B.A. Woodward, A distance effect algorithm for mobility (DREAM), in: Proceedings of the Fourth Annual ACM/IEEE International Conference on Mobile Computing and Networking (Mobicom'98), Dallas, TX, 1998.

R.E. Bellman, Dynamic Programming, Princeton University Press, Princeton, NJ (1957).

B. Bellur, R.G. Ogier, F.L Templin, Topology broadcast based on reverse-path forwarding routing protocol (tbrpf), in: Internet Draft, draft-ietf-manet-tbrpf-06.txt, work in progress, 2003.

T.- W. Chen, M. Gerla, Global state routing: a new routing scheme for ad-hoc wireless networks, in: Proceedings of the IEEE Icc, 1998.

C.- C. Chiang, Routing in clustered multihop mobile wireless networks with fading channel, in: Proceedings of IEEE Sicon, Apr. 1997, pp. 197-211.

M.S. Corson, A. Ephremides, A distributed routing algorithm for mobile wireless networks, ACM/Baltzer Wireless Networks, 1 (1) (1995), pp. 61-81.

S. Das, C. Perkins, E. Royer, Ad hoc on demand distance vector (AODV) routing, Internet Draft, draft-ietf-manet-aodv-11.txt, work in progress, 2002.

R. Dube, C. Rais, K. Wang, S. Tripathi, Signal stability based adaptive routing (ssa) for ad hoc mobile networks, IEEE Personal Communication, 4 (1) (1997), pp. 36-45.

L.R. Ford, D.R. Fulkerson, Flows in Networks, Princeton University Press, Princeton, NJ (1962).

J.J. Garcia-Luna-Aceves, C. Marcelo Spohn, Source-tree routing in wireless networks, in: Proceedings of the Seventh Annual International Conference on Network Protocols Toronto, Canada, Oct. 1999, p. 273.

M. Gerla, Fisheye state routing protocol (FSR) for ad hoc networks, Internet Draft, draft-ietf-manet- aodv-03.txt, work in progress, 2002.

M. Günes, U. Sorges, I. Bouazizi, Ara—the ant-colony based routing algorithm for manets, in: ICPP workshop on Ad Hoc Networks (IWAHN 2002), Aug. 2002, pp. 79-85.

Z.J. Hass, R. Pearlman, Zone routing protocol for ad-hoc networks, Internet Draft, draft-ietf-manet-zrp-02.txt, work in progress, 1999.

A. Iwata, C. Chiang, G. Pei, M. Gerla, T. Chen, Scalable routing strategies for multi-hop ad hoc wireless networks, IEEE Journal on Selected Areas in Communcations, 17 (8) (1999), pp. 1369-1379.

P. Jacquet, P. Muhlethaler, T. Clausen, A. Laouiti, A. Qayyum, L. Viennot, Optimized link state routing protocol for ad hoc networks, IEEE INMIC, Pakistan, 2001.

M. Jiang, J. Ji, Y.C. Tay, Cluster based routing protocol, Internet Draft, draft-ietf-manet-cbrp-spec-01.txt, work in progress, 1999.

M. Joa-Ng, I.-T. Lu, A peer-to-peer zone-based two-level link state routing for mobile ad hoc networks, IEEE Journal on Selected Areas in Communications, 17 (8) (1999), pp. 1415-1425.

D. Johnson, D. Maltz, J. Jetcheva, The dynamic source routing protocol for mobile ad hoc networks, Internet Draft, draft-ietf-manet-dsr-07.txt, work in progress, 2002.

K.K. Kasera, R. Ramanathan, A location management protocol for hierarchically organised multihop mobile wireless networks, in: Proceedings of the IEEE ICUPC'97, San Diego, CA, Oct. 1997, pp. 158-162.

Y.-B. Ko, N.H. Vaidya, Location-aided routing (LAR) in mobile ad hoc networks, in: Proceedings of the Fourth Annual ACM/IEEE International Conference on Mobile Computing and Networking (Mobicom'98), Dallas, TX, 1998.

S. Murthy J.J. Garcia-Luna-Aceves, A routing protocol for packet radio networks, in: Proceedings of the First Annual ACM International Conference on Mobile Computing and Networking, Berkeley, CA, 1995, pp. 86-95.

N. Nikaein, C. Bonnet, N. Nikaein, Harp-hybrid ad hoc routing protocol, in: Proceedings of IST: International Symposium on Telecommunications, Sep. 1-3 Tehran, Iran, 2001.

N. Nikaein, H. Laboid, C. Bonnet, Distributed dynamic routing algorithm (ddr) for mobile ad hoc networks, in: Proceedings of the MobiHOC 2000: First Annual Workshop on Mobile Ad Hoc Networking and Computing, 2000.

V.D. Park, M.S. Corson, A highly adaptive distributed routing algorithm for mobile wireless networks, in: Proceedings of INFOCOM, Apr. 1997.

G. Pei, M. Gerla, X. Hong, C. Chiang, A wireless hierarchical routing protocol with group mobility, in: Proceedings of Wireless Communications and Networking, New Orleans, 1999.

(56) References Cited

OTHER PUBLICATIONS

C.E. Perkins, T.J. Watson, Highly dynamic destination sequenced distance vector routing (DSDV) for mobile computers, in: ACM SIGCOMM'94 Conference on Communications Architectures, London, UK, 1994.

S. Radhakrishnan, N.S.V Rao, G. Racherla, C.N. Sekharan, S.G. Batsell, DST—A routing protocol for ad hoc networks using distributed spanning trees, in: IEEE Wireless Communications and Networking Conference, New Orleans, 1999.

J. Raju, J. Garcia-Luna-Aceves, A new approach to on-demand loop-free multipath routing, in: Proceedings of the 8th Annual IEEE International Conference on Computer Communications and Networks (ICCCN), Boston, MA, Oct. 1999, pp. 522-527.

E.M. Royer, C.-K. Toh, A review of current routing protocols for ad hoc mobile wireless networks, IEEE Personal Communications, 6 (2) (1999), pp. 46-55.

A. Udaya Shankar, C. Alaettinoglu, I. Matta, K. Dussa-Zieger, Performance comparison of routing protocols using MaRS: distance-vector versus link-state, in: Proceedings of the 1992 ACM Sigmetrics and Performance '92 Int'l. Conf. on Measurement and Modeling of Computer Systems, Newport, RI, USA, Jun. 1-5, 1992, p. 181.

W. Su, M. Gerla, Ipv6 flow handoff in ad-hoc wireless networks using mobility prediction, in: IEEE Global Communications Conference, Rio de Janeiro, Brazil, Dec. 1999, pp. 271-275.

C. Toh, A novel distributed routing protocol to support ad-hoc mobile computing, in: IEEE 15th Annual International Phoenix Conf., 1996, pp. 480-486.

S.-C. Woo, S. Singh, Scalable routing protocol for ad hoc networks, Wireless Networks, 7 (5) (2001), pp. 513-529.

G. Pei, M. Gerla and X. Hong, "LANMAR: Landmark Routing for Large Scale Wireless Ad Hoc Networks with Group Mobility," Proc. IEEE/ACM MobiHOC 2000, Boston, MA, Aug. 2000, pp. 11-18.

X. Hong et al., "Scalable Ad Hoc Routing in Large, Dense Wireless Networks Using Clustering and Landmarks," Proc. ICC 2002, New York, NY, Apr. 2002.

M. Gerla, X. Hong, and G. Pei, "Landmark Routing for Large Ad Hoc Wireless Networks," Proc. IEEE GLOBECOM 2000, San Francisco, CA, Nov. 2000.

C. E. Perkins and P. Bhagwat, "Highly Dynamic Destination-Sequenced Distance-Vector Routing (DSDV) for Mobile Computers," Proc. ACM SIGCOMM '94, London, U.K., Sep. 1994, pp. 234-244.

X. Hong, K. Xu, M. Gerla, "Scalable Routing Protocols for Mobile Ad Hoc Networks", IEEE Network, Jul./Aug. 2002, pp. 11-21.

J. C. Navas and T. Imielinski, "Geographic Addressing and Routing," Proc. 3rd ACM/IEEE Intn'l. Conf. Mobile Comp. Net., Budapest, Hungary, Sep. 26-30, 1997.

B. Karp and H. T. Kung, "GPSR: Greedy Perimeter Stateless Routing for Wireless Networks," Proc. 6th Annual Int'l. Conf. Mobile Computing and Networking (MobiCom 2000), Boston, MA, USA, 2000, pp. 243-254.

Tanenbaum, Andrew S.; Wetherall, David J. (Mar. 23, 2010). Computer Networks (5th ed.). Pearson Education. p. 368-370. ISBN 978-0-13-212695-3.

Rahman, Ashikur; Olesinski, Wlodek; Gburzynski, Pawel (2004). "Controlled Flooding in Wireless Ad-hoc Networks" (PDF). International Workshop on Wireless Ad-Hoc Networks. Edmonton, Alberta, Canada: University of Alberta, Department of Computing Science. Archived (PDF) from the original on Feb. 10, 2017. Retrieved Oct. 15, 2015.
www.cs.cornell.edu/projects/quicksilver/ricochet.html.

Thomas Zahn, Greg O'Shea and Antony Rowstron, "An Empirical Study of Flooding in Mesh Networks", Microsoft Research, Cambridge, UK, Apr. 2009 Technical Report MSR-TR-2009-37.

A. Iwata, C.-C. Chiang, G. Pei, M. Gerla, and T.-W. Chen. Scalable Routing Strategies for Ad Hoc Wireless Networks. In IEEE Journal on Selected Areas in Communications, Special Issue on Ad-Hoc Networks, pp. 1369-1379, Aug. 1999.

A. Qayyum, L. Viennot, and A. Laouiti. Multipoint relaying: An efficient technique for flooding in mobile wireless networks. Technical Report 3898, INRIA—Rapport de recherche, 2000.

A. Savvides, C. C. Han and M. B. Srivastava. Dynamic Fine-Grained Localization in Ad-Hoc Networks of Sensors. In Proceedings of MOBICOM'01, Jul. 2001.

B. Das and V. Bharghavan. Routing in Ad hoc Networks using Minimum Connected Dominating Sets(MCDS), Proceedings of 1997 IEEE International Conference on Communications (ICC'97), 1997.

Brad Williams, Tracy Camp. Comparison of broadcasting techniques for mobile ad hoc networks. Proceedings of the third ACM international symposium on Mobile ad hoc networking & computing, Jun. 2002.

C. Ho, K. Obraczka, G. Tsudik, and K. Viswanath. Flooding for reliable multicast in multi-hop ad hoc networks. In Proceedings of the International Workshop on Discrete Algorithms and Methods for Mobile Computing and Communication (DIALM), pp. 64-71, 1999.

C.E. Perkins and P. Bhagwat. Highly Dynamic Destination Sequenced Distance Vector Routing (DSDV) for mobile computers. In proceedings of ACM SIGCOMM, pp. 234-244, 1994.

C.E. Perkins. Ad hoc on-demand distance vector routing, Internet Draft, Internet Engineering Task Force, work in progress, Dec. 1997.

C.-H. Toh. A novel distributed routing protocol to support ad-hoc mobile computing, Proceeding of 15th IEEE Annual International Phoenix Conference on Computer Communications, pp. 480-486, 1996.

C-C. Chiang, H. Wu, W. Liu and M. Gerla. Routing in Clustered, Multihop, Mobile Wireless Networks with Fading Channel, The IEEE International Conference on Networks, pp. 197-211, Singapore, Apr. 1997.

D. Niculescu and B. Nath. Ad Hoc Positioning System (APS) using AoA. INFOCOM'03, San Francisco, CA.

D.B. Johnson and D.A. Maltz. Dynamic Source Routing in mobile ad hoc networks, Mobile Computing, (Ed. T. Imielinski and H. Korth), Kluwer Academic Publishers, 1996.

E. Pagani and G.P. Rossi. Reliable broadcast in mobile multi-hop packet networks., Proceedings of the third annual ACM/IEEE International Conference on mobile computing and networking (MOBICOM'97), pp. 34-42, 1997.

G. Dommety and R. Jain. Potential networking applications of global positioning systems (GPS). Tech. Rep. TR-24, CS Dept., The Ohio State University, Apr. 1996.

H. Lim and C. Kim. Multicast tree construction and flooding in wireless ad hoc networks. In Proceedings of the ACM International Workshop on Modeling, Analysis and Simulation of Wireless and Mobile Systems (MSWIM), 2000.

Haas, Halpern, Li. Gossip based Ad Hoc Routing. In IEEE INFOCOM, Jun. 2002.

I. Chlamtac and O. Weinstein. The wave expansion approach to broadcasting in multi-hop radio networks. IEEE Trans. Commun., vol. 39, pp. 426-433, Mar. 1991.

I. Gaber and Y. Mansour. Broadcast in radio networks. In Proc. 6th Annu. ACM-SIAM Symp. Discrete Algorithms, San Francisco, CA, Jan. 1995, pp. 577-585.

I. Stojmenovic, M. Seddigh, and J. Zunic. Internal node based broadcasting in wireless networks. In Proceedings of the Hawaii International Conference on System Sciences (HICSS), 2001.

J. Jetcheva, Y. Hu, D. Maltz, and D. Johnson. A simple protocol for multicast and broadcast in mobile ad hoc networks. Internet Draft: draft-ietf-manet-simple-mbcast-01.txt, Jul. 2001.

J. Li, C. Blake, D. S. J. De Couto, H. I. Lee, and R. Morris. Capacity of ad hoc wireless networks. In Proc. Seventh Annual ACM/IEEE International Conference on Mobile Computing and Networking (MobiCom), 2001.

J. Sucec and I. Marsic. An efficient distributed network-wide broadcast algorithm for mobile ad hoc networks. CAIP Technical Report 248—Rutgers University, Sep. 2000.

J. Wu and H. Li. On calculating connected dominating sets for efficient routing in ad hoc wireless networks. In Proceedings of the International Workshop on Discrete Algorithms and methods for Mobile Computing and Communication (DIAL-M), pp. 7-14, 1999.

(56) References Cited

OTHER PUBLICATIONS

J.P. Macker and M.S. Corson. Mobile Ad hoc networking and IETF Mobile computing and communication review, 2(1):9-14, Jan. 1998.
Jie Wu and Fei Dai. Broadcasting in Ad Hoc Networks Based on Self-Pruning. In Proceedings of IEEE INFOCOM 2003, San Francisco, CA.
Kershner, R. The Number of Circles Covering a Set. Amer. J. Math. 61, 665-671, 1939.
M. Sanchez. Mobility models. www.disca.upv.es/misan/mobmodel.htm, 1998.
M. Sun and T.H. Lai. Location Aided Broadcast in Wireless Ad Hoc Network Systems. Proc. IEEE WCNC 2002, pp. 597-602, Mar. 2002.
M.K. Denko and W. Goddard. Limited Flooding in Mobile Ad hoc Networks. In proceedings of the 14th MSc/PhD Annual Conference in Computer Science, Golden Gate, South Africa, pp. 21-24, Jun. 1999.
M.K. Denko and W. Goddard. Routing Algorithms in Mobile Ad hoc Networks using Clustering Proceedings of 1998 MSc/PhD annual Conference, University of Stellenbosch, South Africa, pp. 6-18, Jul. 1998.
M.K. Denko and W. Goddard: Clustering in Mobile Ad hoc Networks. In proceedings of the 5th International Conference in Communication systems (AFRICOM 2001), Cape Town, South Africa, May 2001.
M.M. Zonoozi and P. Dassanayake. User mobility modeling and characterisation of mobility patterns. IEEE Journal of Selected Areas in Communications, 15(7):1239-1252, Sep. 1997.
M.S. Corson and A. Ephremides. A highly adaptive distributed routing algorithm for mobile wireless networks. ACM/Baltzer Wireless Networks Journal, 1(1):61-81, 1995.
N. Alon, A. Bar-Noy, N. Linial, and D. Peleg. A lower bound for radio broadcast. J. Comput. Syst. Sci., vol. 43, pp. 290-298, Oct. 1991.
O. Lesser, R. Rom. Routing by controlled flooding in communication networks in proceeding of IEEE INFOCOM'90, (San Francisco, CA), pp. 910-917, Jun. 1990.
P. Bahl and V. N. Padmanabhan. RADAR: An In-Building RF-Based User Location and Tracking System. In Proceedings of the IEEE INFOCOM'00.
P. Krishna, M. Chatterjee, N.H. Vaidya and D.K. Pradhan. A Cluster-based Approach for Routing in Ad hoc Networks. In proceedings of Second USENIX Symposium on mobile and Location Independent Computing, pp. 1-10, Jan. 1996.
R. Bagrodia and R.A. Meyer. PARSEC User Manual, Release 1.0, UCLA Parallel Computing Laboratory, University of California, Los Angeles, Feb. 1998.
R. Dube. Signal Stability based adaptive routing for Ad Hoc Mobile Networks. IEEE Personal Communications, pp. 36-45, Feb. 1997.

S. Basagni, I. Chlamtac, V.R. Syrotiuk and B.A. Woodward. A Distance Routing Effect Algorithm for Mobility (DREAM), Proceedings of the fourth Annual mobile computing and networking, Oct. 1998.
S. Guha and S. Khuller. Approximation algorithms for connected dominating sets. In Proceedings of European Symposium on Algorithms (ESA), 1996.
S. Murthy and J.J. Garcia-Luna-Aceves. An Efficient Routing Protocol for Wireless Networks. ACM Mobile Networks and Applications, Special Issue on Routing in Mobile Communication Networks, 1(1):183-197, Oct. 1996.
S. Y. Ni et al. The Broadcast Storm Problem in a Mobile Ad Hoc Network. ACM MOBICOM, pp. 151-162, Aug. 1999.
T. Camp, J. Boleng, and V. Davies. A Survey of Mobility Models for Ad Hoc Network Research. Wireless Communication & Mobile Computing (WCMC), vol. 2, No. 5, pp. 483-502, 2002.
T.S. Rappaport. Wireless Communications: Principles and Practices. Prentice Hall, Oct. 1995.
Tian He, Chengdu Huang, B. M. Blum,John A. Stankovic,and Tarek F. Abdelzaher. Range-Free Localization Schemes in Large Scale Sensor Networks. Ninth Annual International Conference on Mobile Computing and Networking (MobiCom 2003), San Diego, CA, Sep. 2003. To appear.
V.D. Park and M.S. Corson. A highly adaptive distributed routing algorithm for mobile wireless networks, Proceedings of 1997 IEEE Conference on Computer Communications (INFOCOM'97), Apr. 1997.
W. Peng and X. Lu. AHBP: An efficient broadcast protocol for mobile ad hoc networks. Journal of Science and Technology—Beijing, China, 2002.
W. Peng and X. Lu. On the reduction of broadcast redundancy in mobile ad hoc networks. In Proceedings of MOBIHOC, 2000.
Y. Azar, J. Naor, R. Rom. Routing Strategies in Fast Networks IEEE Transactions on Computers, 45(2):165-173, 1996.
Y-B.Ko, N.H. Vaidya. Location Aided Routing for mobile ad hoc networks Proceedings of the fourth Annual mobile computing and networking, Oct. 1998.
Z.J. Haas and M. Pearlman. Zone Routing Protocol (ZRP) for ad hoc networks, Internet Draft, Internet Engineering Task Force, work in progress, Dec. 1997.
people.cs.clemson.edu/~goddard/papers/limitedFlooding.pdf.
Mesh wireless sensor networks: Choosing the appropriate technology, Industrial Embedded Systems—Jul. 21, 2009, industrial.embedded-computing.com/article-id/?4098=, describes mesh wireless sensor networks (WSN).
Vamsi K Paruchuria, Arjan Durresib, Raj Jain, "Optimized Flooding Protocol for Ad hoc Networks", ai2-s2-pdfs.s3.amazonaws.com/4871/fddb1defd8b202c8e4d3103d691079996d4e.pdf.
en.wikipedia.org/wiki/List_of_ad_hoc_routing_protocols.

* cited by examiner

VINE™: ZERO-CONTROL ROUTING USING DATA PACKET INSPECTION FOR WIRELESS MESH NETWORKS

CROSS REFERENCE TO RELATED APPLICATIONS

The present application is a Continuation of U.S. patent application Ser. No. 16/523,757, filed Jul. 26, 2019, now U.S. Pat. No. 11,082,324, issued Aug. 3, 2021, which is a Non-provisional of, and claims benefit of priority from U.S. Provisional Patent Application No. 62/711,274, filed Jul. 27, 2018, the entirety of which are each expressly incorporated herein by reference.

FIELD OF THE INVENTION

The present invention relates to the field of mobile ad hoc network communication protocols.

BACKGROUND OF THE INVENTION

All references cited herein are expressly incorporated by reference in their entirety.

A mesh network, see en.wikipedia.org/wiki/Mesh_Network is a local network in which the infrastructure (i.e., bridges, switches and other infrastructure devices) connect directly, dynamically and non-hierarchically to other nodes and cooperate with one another to efficiently route data from/to clients. This lack of dependency on one node allows for every node to participate in the relay of information. Mesh networks dynamically self-organize and self-configure, which can reduce installation overhead. The ability to self-configure enables dynamic distribution of workloads, particularly in the event that a few nodes should fail. This in turn contributes to fault-tolerance and reduced maintenance costs. See, Akyildiz, I. F., Wang, X., & Wang, W. (2005). Wireless mesh networks: a survey. *Computer networks*, 47(4), 445-487.

A mobile mesh network is a mesh network in which the nodes can be mobile. A mobile mesh network is also referred to as a mobile ad hoc network (MANET). In such a network, the protocol does not presume persistence of the routing architecture, and therefore multihop routes require a mechanism for route discovery for communication of a message from a message-generating source node to a destination node. Such a procedure, often referred to as "routing" in the MANET/Mesh literature, is typically done by choosing a set of relaying nodes from the source to the destination, which could be the set of all nodes or a subset thereof, depending upon the solution.

A typical mesh network protocol strategy is to broadcast packets, which are then responded to by neighboring nodes. This, however, imposes particular inefficiencies. Even where these inefficiencies were sought to be minimized, packet transmission is typically nevertheless included in the protocol. See, Corson, M. Scott, and Anthony Ephremides. "A distributed routing algorithm for mobile wireless networks." Wireless networks 1, no. 1 (1995): 61-81. doi.org/10.1007/BF01196259), which explicitly mentions that it exchanges short messages to build routes.

Ad hoc networks or mesh network protocols have been studied. These protocols permit peer-to-peer communications between devices over a variety of frequency bands, and a range of capabilities. In a multihop network, communications are passed from one node to another in series between the source and destination. Because of various risks, as the number of hops grows, the reliability of a communication successfully reaching its destination tends to decrease, such that hop counts of more than 10 or 20 in a mobility permissive network are rarely considered feasible. A typical mesh network protocol maintains a routing table at each node, which is then used to control the communication. This routing table may be established proactively or reactively. In proactive routing, the network state information is pushed to the various nodes, often appended to other communications, such that when a communication is to be established, the nodes rely on the then-current routing information to control the communication. This paradigm suffers from the possibility of stale or incorrect routing information or overly burdensome administrative overhead, or both. Reactive routing seeks to determine the network state at the time of, and for the purpose of, a single set of communications, and therefore may require significant communications possibly far exceeding the amount of data to be communicated in order to establish a link. Because the network state is requested at the time of communication, there is less opportunity to piggyback the administrative information on other communications. There are also various hybrid ad hoc network routing protocols, which seek to compromise between these two strategies, and other paradigms as well.

Abolhasan, M., Wysocki, T. & Dutkiewicz, E. (2004). A review of routing protocols for mobile ad hoc networks. Ad Hoc Networks, 2 (1), 1-22, discusses various ad hoc networking protocols. Wired networks used two main algorithms; the link-state algorithm and the distance vector algorithm. In link-state routing, each node maintains an up-to-date view of the network by periodically broadcasting the link-state costs of its neighboring nodes to all other nodes using a flooding strategy. When each node receives an update packet, it updates its view of the network and the link-state information by applying a shortest-path algorithm to choose the next hop node for each destination. In distance-vector routing, for every destination x, each node i maintains a set of distances $Dx_{ij}$ where j ranges over the neighbors of node i. Node i selects a neighbor, k, to be the next hop for x if $Dx_{ik}=\min_j\{Dx_{ij}\}$. This allows each node to select the shortest path to each destination. The distance-vector information is updated at each node by a periodical dissemination of the current estimate of the shortest distance to every node [31].

The traditional link-state and distance-vector algorithm do not scale in large MANETs. This is because periodic or frequent route updates in large networks may consume significant part of the available bandwidth, increase channel contention and may require each node to frequently recharge their power supply. Where the network changes rapidly, or bandwidth is low, the routing information may prove inaccurate or stale.

To overcome the problems associated with the link-state and distance-vector algorithms a number of routing protocols have been proposed for MANETs. These protocols can be classified into three different groups: global/proactive, on-demand/reactive, and hybrid. In proactive routing protocols, the routes to all the destination (or parts of the network) are determined at the start up (before a need for communication), and maintained by using a periodic route update process.

In reactive protocols, routes are determined when they are required by the source using a route discovery process. Hybrid routing protocols combine the basic properties of the first two classes of protocols into one. That is, they are both reactive and proactive in nature. Each group has a number of different routing strategies, which employ a flat or a hierarchical routing structure.

Proactive Routing Protocols

In proactive routing protocols, each node maintains routing information to every other node (or nodes located in a specific part) in the network. The routing information is usually kept in a number of different tables. These tables are periodically updated and/or if the network topology changes. The difference between these protocols exist in the way the routing information is updated, detected and the type of information kept at each routing table. Furthermore, each routing protocol may maintain different number of tables.

Destination-Sequenced Distance Vector (DSDV)

The DSDV algorithm [27] is a modification of DBF [3, 10], which guarantees loop free routes. It provides a single path to a destination, which is selected using the distance vector shortest path routing algorithm. In order to reduce the amount of overhead transmitted through the network, two types of update packets are used. These are referred to as a "full dump" and "incremental" packets. The full dump packet carries all the available routing information and the incremental packet carries only the information changed since the last full dump. The incremental update messages are sent more frequently than the full dump packets. However, DSDV still introduces large amounts of overhead to the network due to the requirement of the periodic update messages, and the overhead grows according to $O(N^2)$. Therefore, the protocol will not scale in large network since a large portion of the network bandwidth is used in the updating procedures.

Wireless Routing Protocol (WRP)

The WRP protocol [22] also guarantees freedom from loops, and it avoids temporary routing loops by using the predecessor information. However, WRP requires each node to maintain four routing tables. This introduces a significant amount of memory overhead at each node as the size of the network increases. Another disadvantage of WRP is that it ensures connectivity through the use of "hello" messages. These hello messages are exchanged between neighboring nodes whenever there an absence of recent packet transmission. This will also consume a significant amount of bandwidth and power as each node is required to stay active at all times (i.e., they cannot enter sleep mode to conserve their power).

Global State Routing (GSR)

The GSR protocol [5] is based on the traditional Link State algorithm. However, GSR improves the way information is disseminated per the Link State algorithm by restricting the update messages between intermediate nodes only. In GSR, each node maintains a link state table based on the up-to-date information received from neighboring nodes, and periodically exchanges its link state information with neighboring nodes only. This significantly reduces the number of control message transmitted through the network. However, the size of update messages is relatively large, and as the size of the network grows, they will get even larger. Therefore, a considerable amount of bandwidth is consumed by these update messages.

Fisheye State Routing (FSR)

The FSR protocol [12] is the descendent of GSR. FSR reduces the size of the update messages in GSR by updating the network information for nearby nodes at a higher frequency than for the remote nodes, which lie outside the fisheye scope. This makes FSR more scalable to large networks than the protocols described above. However, scalability comes at the price of reduced accuracy. This is because as mobility increases, the routes to remote destinations become less accurate. This can be overcome by making the frequency at which updates are sent to remote destinations proportional to the level of mobility. However, communication of mobility information increases the information communication overhead, and requires detection or determination of movement or other network configuration changes.

Source-Tree Adaptive Routing (STAR)

The STAR protocol [11] is also based on the link state algorithm. Each router maintains a source tree, which is a set of links containing the preferred paths to destinations. This protocol significantly reduces the amount of routing overhead disseminated into the network by using a least overhead routing approach (LORA), to exchange routing information. It also supports an optimum routing approach (ORA) if required. This approach eliminates the periodic updating procedure present in the Link State algorithm by making update dissemination conditional. As a result, the Link State updates are exchanged only when certain events occur. Therefore, STAR will scale well in large network since it has significantly reduced the bandwidth consumption for the routing updates, while at the same time reduces latency by using predetermined routes. However, this protocol may have significant memory and processing overheads in large and highly mobile networks, because each node is required to maintain a partial topology graph of the network (it is determined from the source tree reported by its neighbors), which may change frequently as the neighbors keep reporting different source trees. Further, if the correlated contingencies occur across the network, a global network failure may occur requiring a full link state communication to recover.

Distance Routing Effect Algorithm for Mobility (DREAM)

The DREAM routing protocol [2] employs a different approach to routing when compared to the prior discussed routing protocols. In DREAM, each node knows its geographical coordinates through GPS. These coordinates are periodically exchanged between each node and stored in a routing table (called a location table). The advantage of exchanging location information is that it consumes significantly less bandwidth than exchanging complete link state or distance vector information, which means that it is more scalable. In DREAM, routing overhead is further reduced, by making the frequency at which update messages are disseminated proportional to mobility and the distance effect. This means that stationary nodes do not need to send any update messages. The reliability of DREAM is dependent on communications cost and reliability being correlated with geographic distance, or that a map be available for translating geographic location into communications proximity.

Multimedia Support in Mobile Wireless Networks (MMWN)

In MMWN routing protocol [20] the network is maintained using a clustering hierarchy. Each cluster has two types of mobile nodes: switches and endpoints. Each cluster also has location manager (LM), which performs the location management for each cluster. All information in MMWN is stored in a dynamically distributed database. The advantage of MMWN is that only LMs perform location updating and location finding, which means that routing overhead is significantly reduced when compared to the traditional table-driven algorithms (such as DSDV and WRP). However, location management is closely related to the hierarchical structure of the network, making the location finding and updating very complex. This is because in the location finding and updating process, messages have to travel through the hierarchical tree of the LMs. The changes in the hierarchical cluster membership of LMs will also affect the hierarchical management tree and introduce a complex consistency management. This feature introduces implementation problems, which are difficult to overcome [26].

Clusterhead Gateway Switch Routing (CGSR)

CGSR [6] is another hierarchical routing protocol where the nodes are grouped into cluster. However, the addressing scheme used is simpler than MMWN. In CGSR, there is no need to maintain a cluster hierarchy (which is required in MMWN). Instead, each cluster is maintained with a clusterhead, which is a mobile node elected to manage all the other nodes within the cluster (see FIG. 2). This node controls the transmission medium and all inter-cluster communications occur through this node. The advantage of this protocol is that each node only maintains routes to its clusterhead, which means that routing overheads are lower compared to flooding routing information throughout the network. However, there are significant overheads associated with maintaining clusters. This is because each node needs to periodically broadcast its cluster member table and update its table based on the received updates.

1.9 Hierarchical State Routing (HSR)

HSR [26] is also based on the traditional Link State algorithm. However, unlike the other link state-based algorithms described above, HSR maintains a hierarchical addressing and topology map. A clustering algorithm such as CGSR can be used to organize the nodes with close proximity into clusters. Each cluster has three types of nodes: a clusterhead node which acts as a local coordinator for each node, Gateway nodes which are nodes that lie in two different clusters, and internal nodes that are all the other nodes in each cluster. All nodes have a unique ID, which is typically the MAC address for each node. The nodes within each cluster broadcast their link information to each other. In HSR, each node also has a hierarchical ID (HID), which is a sequence of the MAC addresses from the top hierarchy to the source node. The HID can be used to send a packet from any source to any destination in the network. For example, a packet sent from a node in one cluster to a node in another cluster traverses the local hierarchy to its "top" node, is communicated to the corresponding "top" node of the other hierarchy, and then to the destination node, along a "virtual link".

Logical clustering provides a logical relationship between the clusterhead at a higher level. Here, the nodes are assigned logical address of the form <subnet,host>. The logical nodes are connected via logical links, which form a "tunnel" between lower level clusters. Logical nodes exchange logical link information as well as a summary information of the lower level clusters. The logical link state information is then flooded down to the lower levels. The physical nodes at the lowest level will then have a "hierarchical" topology of the network. The advantage of HSR over other hierarchical routing protocols (such as MMWN) is the separation of mobility management from the physical hierarchy. This is done via Home Agents. This protocol also has far less control overhead when compared to GSR and FSR. However, this protocol (similar to any other cluster-based protocol) introduces extra overheads to the network from cluster formation and maintenance.

1.10 Optimized Link State Routing (OLSR)

OLSR [16] is a point-to-point routing protocol based on the traditional link-state algorithm. In this strategy, each node maintains topology information about the network by periodically exchanging link-state messages. OLSR minimizes the size of each control message and the number of rebroadcasting nodes during each route update by employing multipoint replaying (MPR) strategy. During each topology update, each node in the network selects a set of neighboring nodes to retransmit its packets. This set of nodes is called the multipoint relays of that node. Any node which is not in the set can read and process each packet but do not retransmit. To select the MPRs, each node periodically broadcasts a list of its one hop neighbors using "hello" messages. From the list of nodes in the hello messages, each node selects a subset of one hop neighbors, which covers all of its two hop neighbors. These MPR nodes cover all the nodes which are two hops away. Each node determines an optimal route (in terms of hops) to every known destination using its topology information (from the topology table and neighboring table), and stores this information in a routing table. Therefore, routes to every destination are immediately available when data transmission begins.

1.11 Topology Broadcast Reverse Path Forwarding (TBRPF)

TBRPF [4] is another link-state based routing protocol, which performs hop-by-hop routing. The protocol uses reverse-path forwarding (RPF) to disseminate its update packets in the reverse direction along the spanning tree, which is made up of the minimum-hop path from the nodes leading to the source of the update message. Each node calculates a source tree, which provides a path to all reachable destinations, by applying a modified version of Dijkstra's algorithm on the partial topology information stored in their topology table. In TBRPF, each node minimizes overhead by reporting only part of their source tree to their neighbors. The reportable part of each source tree is exchanged with neighboring nodes by periodic and differential "hello" messages. The differential hello messages only report the changes of the status of the neighboring nodes. As a result, the hello messages in TBRPF are smaller than in protocols which report the complete link-state information.

1.12 Landmark Ad Hoc Routing Protocol

Landmark Ad Hoc Routing Protocol (LANMAR) [35, 37, 39] is designed for an ad hoc network that exhibits group mobility. Namely, one can identify logical subnets in which the members have a commonality of interests and are likely to move as a group (e.g., a brigade or tank battalion in the battlefield). LANMAR uses an IP-like address consisting of a group ID (or subnet ID) and a host ID: <GroupID, HostID>. LANMAR uses the notion of landmarks to keep track of such logical groups. Each logical group has one dynamically elected node serving as a landmark. A global distance vector mechanism (e.g., DSDV [38]) propagates the routing information about all the landmarks in the entire network. Furthermore, LANMAR works in symbiosis with a local scope routing scheme. The local routing scheme can use the flat proactive protocols mentioned previously (e.g., FSR). FSR maintains detailed routing information for nodes within a given scope D (i.e., FSR updates propagate only up to hop distance D). As a result, each node has detailed topology information about nodes within its local scope and has a distance and routing vector to all landmarks. When a node needs to relay a packet to a destination within its scope, it uses the FSR routing tables directly. Otherwise, the packet will be routed toward the landmark corresponding to the destination's logical subnet, which is read from the logical address carried in the packet header. When the packet arrives within the scope of the destination, it is routed using local tables (that contain the destination), possibly without going through the landmark. LANMAR reduces both routing table size and control overhead effectively through the truncated local routing table and "summarized" routing information for remote groups of nodes. In general, by adopting different local routing schemes [36], LANMAR provides a flexible routing framework for scalable routing while still preserving the benefits introduced by the associated local scope routing scheme.

1.13 Summary of Proactive Routing

Most flat routed global routing protocols do not scale very well. This is because their updating procedure consumes a significant amount of network bandwidth. Of the flat routed protocols, OLSR may scale the best. This increase in scalability is achieved by reducing the number of rebroadcasting nodes through the use of multipoint relaying, which elects only a number of neighboring nodes to rebroadcast the message. This has the advantage of reducing, channel contention and the number of control packet travelling through the network when compared to strategies which use blind or pure flooding where all nodes rebroadcast the messages. The DREAM routing protocol also has scalability potential since it has significantly reduced the amount of overhead transmitted through the network, by exchanging location information rather than complete (or partial) link state information. The hierarchically routed global routing protocols will scale better than most of the flat routed protocols, since they have introduced a structure to the network, which control the amount of overhead transmitted through the network. This is done by allowing only selected nodes such as a clusterhead to rebroadcast control information. The common disadvantage associated with all the hierarchical protocols is mobility management. Mobility management introduces unnecessary overhead to the network (such as extra processing overheads for cluster formation and maintenance).

Reactive Routing Protocols

On-demand routing protocols were designed to reduce the overheads in proactive protocols by maintaining information for active routes only. This means that routes are determined and maintained for nodes that are required to send data to a particular destination. Route discovery usually occurs by flooding a route request packets through the network. When a node with a route to the destination (or the destination itself) is reached, a route reply is sent back to the source node using link reversal, if the route request has travelled through bi-directional links or by piggy-backing the route in a route reply packet via flooding. Therefore, the route discovery overhead (in the worst-case scenario) will grow by O(N+M) when link reversal is possible and O(2N) for uni-directional links.

Reactive protocols can be classified into two categories: source routing and hop-by-hop routing. In Source routed on-demand protocols [19] and [33], each data packet carries the complete source to destination address. Therefore, each intermediate node forwards these packets according to the information kept in the header of each packet. This means that the intermediate nodes do not need to maintain up-to-date routing information for each active route in order to forward the packet towards the destination. Furthermore, nodes do not need to maintain neighbor connectivity through periodic beaconing messages. The major drawback with source routing protocols is that in large networks they do not perform well. This is due to two main reasons: first, as the number of intermediate nodes in each route grows, then so does the probability of route failure. Second, as the number of intermediate nodes in each route grows, then the amount of overhead carried in each header of each data packet grows as well. Therefore, in large networks with significant levels of multihoping and high levels of mobility, these protocols may not scale well.

In hop-by-hop routing (also known as point-to-point routing) [8], each data packet only carries the destination address and the next hop address. Therefore, each intermediate node in the path to the destination uses its routing table to forward each data packet towards the destination. The advantage of this strategy is that routes are adaptable to the dynamically changing environment of MANETs, since each node can update its routing table when they receiver fresher topology information and hence forward the data packets over fresher and better routes. Using fresher routes also means that fewer route recalculations are required during data transmission. The disadvantage of this strategy is that each intermediate node must store and maintain routing information for each active route and each node may be required to be aware of their surrounding neighbors through the use of beaconing messages.

A number of different reactive routing protocols have been proposed to increase the performance of reactive routing.

Ad Hoc On-Demand Distance Vector (AODV)

The AODV [8] routing protocol is based on the DSDV and DSR [19] algorithms. It uses the periodic beaconing and sequence numbering procedure of DSDV and a similar route discovery procedure as in DSR. However, there are two major differences between DSR and AODV. The most distinguishing difference is that in DSR, each packet carries full routing information, whereas in AODV the packets carry the destination address. This means that AODV has potentially less routing overhead than DSR. The other difference is that the route replies in DSR carry the address of every node along the route, whereas in AODV the route replies only carry the destination IP address and the sequence number. The advantage of AODV is that it is adaptable to highly dynamic networks. However, a node may experience large delays during route construction, and link failure may initiate another route discovery, which introduces extra delays and consumes more bandwidth as the size of the network increases.

Dynamic Source Routing (DSR)

The DSR protocol requires each packet to carry the full address (every hop in the route), from source to the destination. This means that the protocol will not be very effective in large networks, as the amount of overhead carried in the packet will continue to increase as the network diameter increases. In highly dynamic and large networks, the overhead may consume most of the bandwidth. This protocol has a number of advantages over routing protocols such as AODV, LMR [7] and TORA [25], and in small to moderately size networks (perhaps up to a few hundred nodes), this protocol may perform better. An advantage of DSR is that nodes can store multiple routes in their route cache, which means that the source node can check its route cache for a valid route before initiating route discovery, and if a valid route is found there is no need for route discovery. This is beneficial in networks with low mobility, since the routes stored in the route cache will be valid longer. Another advantage of DSR is that it does not require any periodic beaconing (or hello message exchanges), therefore nodes can enter sleep node to conserve their power. This also saves a considerable amount of bandwidth in the network.

Routing On-Demand Acyclic Multi-Path (ROAM)

The ROAM [29] routing protocol uses internodal coordination along directed acyclic subgraphs, which is derived from the routers' distance to destination. This operation is referred to as a "diffusing computation". The advantage of this protocol is that it eliminates the search-to-infinity problem present in some of the on-demand routing protocols by stopping multiple flood searches when the required destination is no longer reachable. Another advantage is that each router maintains entries (in a route table) for destinations, which flow data packets through them (i.e., the router is a node which completes/or connects a router to the destination). This reduces significant amount of storage space and bandwidth needed to maintain an up-to-date routing table. Another novelty of ROAM is that each time the distance of a router to a destination changes by more than a defined threshold, it broadcasts update messages to its neighboring nodes. Although this has the benefit of increasing the network connectivity, in highly dynamic networks it may prevent nodes entering sleep mode to conserve power.

Light-Weight Mobile Routing (LMR)

The LMR protocol is an on-demand routing protocol, which uses a flooding technique to determine its routes. The nodes in LMR maintain multiple routes to each required destination. This increases the reliability of the protocol by allowing nodes to select the next available route to a particular destination without initiating a route discovery procedure. Another advantage of this protocol is that each node only maintains routing information to their neighbors. This means avoids extra delays and storage overheads associated with maintaining complete routes. However, LMR may produce temporary invalid routes, which introduces extra delays in determining a correct loop.

Temporally Ordered Routing Algorithm (TORA)

The TORA routing protocol is based on the LMR protocol. It uses similar link reversal and route repair procedure as in LMR, and also the creation of a DAGs, which is similar to the query/reply process used in LMR [30]. Therefore, it also has similar benefits to LMR. The advantage of TORA is that it has reduced the far-reaching control messages to a set of neighboring nodes, where the topology change has occurred. Another advantage of TORA is that it also supports multicasting, however this is not incorporated into its basic operation. TORA can be used in conjunction with lightweight adaptive multicast algorithm (LAM) to provide multicasting. The disadvantage of TORA is that the algorithm may also produce temporary invalid routes as in LMR.

Associativity-Based Routing (ABR)

ABR [33] is another source-initiated routing protocol, which also uses a query-reply technique to determine routes to the required destinations. However, in ABR route selection is primarily based on stability. To select stable route each node maintains an associativity tick with their neighbors, and the links with higher associativity tick are selected in preference to the once with lower associativity tick. However, although this may not lead to the shortest path to the destination, the routes tend to last longer. Therefore, fewer route reconstructions are needed, and more bandwidth will be available for data transmission. The disadvantage of ABR is that it requires periodic beaconing to determine the degree of associativity of the links. This beaconing requirement requires all nodes to stay active at all times, which may result in additional power consumption. Another disadvantage is that it does not maintain multiple routes or a route cache, which means that alternate routes will not be immediately available, and a route discovery will be required using link failure. However, ABR has to some degree compensated for not having multiple routes by initiating a localized route discovery procedure (i.e., LBQ).

Signal Stability Adaptive (SSA)

SSA [9] is a descendent of ABR. However, SSA selects routes based on signal strength and location stability rather than using an associativity tick. As in ABR, the routes selected in SSA may not result in the shortest path to the destination. However, they tend to live longer, which means fewer route reconstructions are needed. One disadvantage of SSA when compared to DSR and AODV is that intermediate nodes cannot reply to route requests sent toward a destination, which may potentially create long delays before a route can be discovered. This is because the destination is responsible for selecting the route for data transfer. Another disadvantage of SSA is that no attempt is made to repair routes at the point where the link failure occurs (i.e., such as an LBQ in ABR). In SSA the reconstruction occurs at the source. This may introduce extra delays, since the source must be notified of the broken like before another one can be found.

Relative Distance Micro-Discovery Ad Hoc Routing (RDMAR)

RDMR [1] attempts to minimize the routing overheads by calculating the distance between the source and the destination and therefore limiting each route request packet to certain number of hops. This means that the route discovery procedure can be confined to localized region (i.e., it will not have a global affect). RDMR also uses the same technique when link failures occur (i.e., route maintenance), thus conserving a significant amount of bandwidth and battery power. Another advantage of RDMR is that it does not require a location aided technology (such as a GPS) to determine the routing patterns. However, the relative-distance micro-discovery procedure can only be applied if the source and the destinations have communicated previously. If no previous communication record is available for a particular source and destination, then the protocol will behave in the same manner as the flooding algorithms (i.e., route discovery will have a global affect).

Location-Aided Routing (LAR)

LAR [21] is based on flooding algorithms (such as DSR). However, LAR attempts to reduce the routing overheads present in the traditional flooding algorithm by using location information. This protocol assumes that each node knows its location through a GPS. Two different LAR schemes were proposed in [21], the first scheme calculates a request zone which defines a boundary where the route request packets can travel to reach the required destination. The second method stores the coordinates of the destination in the route request packets. These packets can only travel in the direction where the relative distance to the destination becomes smaller as they travel from one hop to another. Both methods limit the control overhead transmitted through the network and hence conserve bandwidth. They will also determine the shortest path (in most cases) to the destination, since the route request packets travel away from the source and towards the destination. The disadvantage of this protocol is that each node is required to carry a GPS. Another disadvantage is (especially for the first method), that protocols may behave similar to flooding protocols (e.g., DSR and AODV) in highly mobile networks.

Ant-Colony-Based Routing Algorithm (ARA)

ARA [13] attempt to reduce routing overheads by adopting the food searching behavior of ants. When ants search for food they start from their nest and walk towards the food, while leaving behind a transient trail of pheromones. This indicates the path that has been taken by the ant and allows others to follow, until the pheromone disappears. Similar to AODV and DSR, ARA is also made up of two phases (route discovery and route maintenance). During route discovery, a Forwarding Ant (FANT) is propagated through the network (similar to a RREQ). At each hop, each node calculates a pheromone value depending on how many hops the FANT has taken to reach them. The nodes then forward the FANT to their neighbors. Once the destination is reached, it creates a Backward Ant (BANT), and returns it to the source. When the source receives the BANT from the destination node, a path is determined, and data packet dissemination begins. To maintain each route, each time a data packet travels between intermediate nodes the pheromone value is increased. Otherwise, the pheromone value is decreased overtime until it expires. To repair a broken link, the nodes firstly check their routing table, if no route is found they inform their neighbors for an alternate route. If the neighbors do have a route they inform their neighbors by backtracking. If the source node is reached and no route is found, a new route discovery process is initiated. The advantage of this strategy is that the size of each FANT and BANT is small, which means the amount of overhead per control packet introduced in the network is minimized. However, the route discovery process it based on flooding, which means that the protocol may have scalability problems as the number of nodes and flows in the network grows.

Flow Oriented Routing Protocol (FORP)

FORP [32] attempts to reduce the effect of link failure due to mobility during data transmission, by predicting when a route is going to be broken and therefore using an alternate link before route failure is experienced. To do this, when a node requires a route to a particular destination and a route is not already available, a Flow_REQ message is broadcasted through the network in a similar manner to a Route Request in DSR. However, in FORP, each node that receives a Flow_REQ calculates a Link Expiration Time (LET) with the previous hop (using a GPS) and appends this value to the Flow_REQ packet which is then rebroadcasted. When a Flow_REQ packet reaches the destination, a Route Expiration Time (RET) is calculated using the minimum of all the LETs for each node in the route and a Flow_SETUP packet is sent back toward the source. During data transmission, each intermediate node appends their LET to the data packet. This allows the destination to predict when a link failure could occur. When the destination determines that a route is about to expire, a Flow_HANDOFF message is generated and propagated via flooding (similar to a Flow_ REQ). Therefore, when the source receives a Flow_HANDOFF message, it can determine the best route to handoff the flow based on the given information (such as RET and hop count, etc.) in the Flow_HANDOFF packet. The source the sends a Flow_SETUp message along the newly chosen route. The advantage of this strategy compared to other on-demand routing protocols described above is that it minimizes the disruptions of real time sessions due to mobility by attempting to maintain constant flow of data. However, since it is based on pure flooding, the protocol may experience scalability problems in large networks.

Cluster-Based Routing Protocol (CBRP)

Unlike the on-demand routing protocols described above. In CBRP [17] the nodes are organized in a hierarchy. As most hierarchical protocols described above, the nodes in CBRP are grouped into clusters. Each cluster has a cluster-head, which coordinates the data transmission within the cluster and to other clusters. The advantage of CBRP is that only cluster heads exchange routing information, and therefore the number of control overhead transmitted through the network is far less than the traditional flooding methods. However, as in any other hierarchical routing protocol, there are overheads associated with cluster formation and maintenance. The protocol also suffers from temporary routing loops. This is because some nodes may carry inconsistent topology information due to long propagation delay.

2.13 Geographic Addressing and Routing

Geographic Addressing and Routing (GeoCast) [40] allows messages to be sent to all nodes in a specific geographical area using geographic information instead of logical node addresses. A geographic destination address is expressed in three ways: point, circle (with center point and radius), and polygon (a list of points, e.g., P(1), P(2), . . . , P(n−1), P(n), P(1)). A point is represented by geographic coordinates (latitude and longitude). When the destination of a message is a polygon or circle, every node within the geographic region of the polygon/circle will receive the message. A geographic router (GeoRouter) calculates its service area (geographic area it serves) as the union of the geographic areas covered by the networks attached to it. This service area is approximated by a single closed polygon. GeoRouters exchange service area polygons to build routing tables. This approach builds hierarchical structure (possibly wireless) consisting of GeoRouters. The end users can move freely about the network.

Data communication starts from a computer host capable of receiving and sending geographic messages (GeoHost). Data packets are then sent to the local GeoNode (residing in each subnet), which is responsible for forwarding the packets to the local GeoRouter. A GeoRouter first checks whether its service area intersects the destination polygon. As long as a part of the destination area is not covered, the GeoRouter sends a copy of the packet to its parent router for further routing beyond its own service area. Then it checks the service area of its child routers for possible intersection. All the child routers intersecting the target area are sent a copy of the packet. When a router's service area falls within the target area, the router picks up the packet and forwards it to the GeoNodes attached to it. As GeoCast is designed for group reception, multicast groups for receiving geographic messages are maintained at the GeoNodes. The incoming geographic messages are stored for a lifetime (determined by the sender) and during the time, they are multicast periodically through assigned multicast address. Clients at GeoHosts tune into the appropriate multicast address to receive the messages.

2.14 Greedy Perimeter Stateless Routing (GPSR)

Greedy Perimeter Stateless Routing (GPSR) [41] is a routing protocol that uses only neighbor location information in forwarding data packets. It requires only a small amount of per-node routing state, has low routing message complexity, and works best for dense wireless networks. In GPSR, beacon messages are periodically broadcast at each node to inform its neighbors of its position, which results in minimized one-hop-only topology information at each node. To further reduce the beacon overhead, the position information is piggybacked in all the data packets a node sends. GPSR assumes that sources can determine through separate means the location of destinations and include such locations in the data packet header. A node makes forwarding decisions based on the relative position of destination and neighbors. GPSR uses two data forwarding schemes: greedy forwarding and perimeter forwarding. The former is the primary forwarding strategy, while the latter is used in regions where the primary one fails. Greedy forwarding works this way: when a node receives a packet with the destination's location, it chooses from its neighbors the node that is geographically closest to the destination and then forwards the data packet to it. This local optimal choice repeats at each intermediate node until the destination is reached. When a packet reaches a dead end (i.e., a node whose neighbors are all farther away from the destination than itself), perimeter forwarding is performed. Before performing the perimeter forwarding, the forwarding node needs to calculate a relative neighborhood graph (RNG). Perimeter forwarding traverses the RNG using the right-hand rule hop by hop along the perimeter of the region. During perimeter forwarding, if the packet reaches a location that is closer to the destination than the position where the previous greedy forwarding of the packet failed, the greedy process is resumed. Possible loops during perimeter forwarding occur when the destination is not reachable. These loops will be detected, and packets dropped. In the worst case, GPSR will possibly generate a very long path before a loop is detected.

2.15. Summary of Reactive Routing

Generally, most on-demand routing protocols have the same routing cost when considering the worst-case scenario. This is due to their fundamental routing nature, as they all follow similar route discovery and maintenance procedure. For example, protocols such as RDMR and LAR have the same cost as the traditional flooding algorithm in the worst-case scenario. The worst-case scenario applies to most routing protocols when there is no previous communication between the source and the destination. This is usually the case during the initial stages (i.e., when a node comes on-line). As the nodes stay longer on, they are able to update their routing tables/caches and become more aware of their surroundings. Some protocols take advantage of this more than the others. For example, in DSR when a route to a destination has expired in the route cache, the protocol initiates a network wide flooding search to find an alternate route. This is not the case for LAR or RDMR where the route history is used to control the route discovery procedure by localizing the route requests to a calculated region. Clearly, this is more advantageous in large networks, since more bandwidth is available there for data transmission. Another method used to minimize the number of control packets is to select routes based on their stability. In ABR and SSR the destination nodes select routes based on their stability. ABR also allows shortest path route selection to be used during the route selection at the destination (but only secondary to stability), which means that shorter delays may be experienced in ABR during data transmission than in SSR. These protocols may perform better than the purely shortest path selection-based routing protocols such as DSR. However, they may experience scalability problem in large network since each packet is required to carry the full destination address. This is because the probability of a node in a selected route becoming invalid will increase by $O(a\ n)$, where "a" is the probability of the route failing at a node and "n" is the number of nodes in the route.

Therefore, these protocols are only suitable for small to medium size networks. Reduction in control overhead can be obtained by introducing a hierarchical structure to the network. CBRP is a hierarchical on-demand routing protocol, which attempts to minimize control overheads disseminated into the network by breaking the network into clusters. During the route discovery phase, clusterheads (rather than each intermediate node) exchange routing information. This significantly reduces the control overhead disseminated into the network when compared to the flooding algorithms. In highly mobile networks, CBRP may incur significant amount of processing overheads during cluster formation/maintenance. This protocol suffers from temporary invalid routes as the destination nodes travel from one cluster to another. Therefore, this protocol is suitable for medium size networks with slow to moderate mobility. The protocol may also best perform in scenarios with group mobility where the nodes within a cluster are more likely to stay together.

Hybrid Routing Protocols

Hybrid routing protocols are both proactive and reactive in nature. These protocols are designed to increase scalability by allowing nodes with close proximity to work together to form some sort of a backbone to reduce the route discovery overheads. This is mostly achieved by proactively maintaining routes to nearby nodes and determining routes to far away nodes using a route discovery strategy. Most hybrid protocols proposed to date are zone-based, which means that the network is partitioned or seen as a number of zones by each node. Others group nodes into trees or clusters. The discussion below is limited to different hybrid routing protocol proposed for MANETs.

Zone Routing Protocol (ZRP)

In ZRP [14], the nodes have a routing zone, which defines a range (in hops) that each node is required to maintain network connectivity proactively. Therefore, for nodes within the routing zone, routes are immediately available. For nodes that lie outside the routing zone, routes are determined on-demand (i.e., reactively), and it can use any on-demand routing protocol to determine a route to the required destination. The advantage of this protocol is that it has significantly reduced the amount of communication overhead when compared to pure proactive protocols. It also has reduced the delays associated with pure reactive protocols such as DSR, by allowing routes to be discovered faster. This is because, to determine a route to a node outside the routing zone, the routing only has to travel to a node which lies on the boundaries (edge of the routing zone) of the required destination. Since the boundary node would proactively maintain routes to the destination (i.e., the boundary nodes can complete the route from the source to the destination by sending a reply back to the source with the required routing address). The disadvantage of ZRP is that for large values of routing zone the protocol can behave like a pure proactive protocol, while for small values it behaves like a reactive protocol.

Zone-Based Hierarchical Link State (ZHLS)

Unlike ZRP, ZHLS [18] routing protocol employs hierarchical structure. In ZHLS, the network is divided into non-overlapping zones, and each node has a node ID and a zone ID, which is calculated using a GPS. The hierarchical topology is made up of two levels: node level topology and zone level topology, as described previously. In ZHLS, location management is simplified. This is because no clusterhead or location manager is used to coordinate the data transmission. This means there is no processing overhead associated with clusterhead or Location Manager selection when compared to HSR, MMWN and CGSR protocols. This also means that a single point of failure and traffic bottlenecks can be avoided. Another advantage of ZHLS is that it has reduced the communication overheads when compared to pure reactive protocols such as DSR and AODV. In ZHLS, when a route to a remote destination is required (i.e., the destination is in another zone), the source node broadcast a zone-level location request to all other zones, which generates significantly lower overhead when compared to the flooding approach in reactive protocols. Another advantage of ZHLS is that the routing path is adaptable to the changing topology since only the node ID and the zone ID of the destination is required for routing. This means that no further location search is required as long as the destination does not migrate to another zone. However, in reactive protocols, any intermediate link breakage would invalidate the route and may initiate another route discovery procedure. The Disadvantage of ZHLS is that all nodes must have a preprogrammed static zone map in order to function. This may not feasible in applications where the geographical boundary of the network is dynamic. Nevertheless, it is highly adaptable to dynamic topologies and it generates far less overhead than pure reactive protocols, which means that it may scale well to large networks.

Scalable Location Update Routing Protocol (SLURP)

Similar to ZLHS, in SLURP [34] the nodes are organized into a number of non-overlapping zones. However, SLURP further reduces the cost of maintaining routing information by eliminating a global route discovery. This is achieved by assigning a home region for each node in the network. The home region for each node is one specific zone (or region), which is determined using a static mapping function, $f$(NodeID)→regionID, where $f$ is a many-to-one function that is static and known to all nodes. An example of a function that can perform the static zone mapping is $f$(NodeID)=g(NodeID)mod K[34], where g(NodeID) is a random number generating function that uses the node ID as the seed and output a large number, and k is the total number of home regions in the network. Since the node ID of each node is constant (i.e., a MAC address), then the function will always calculate the same home region. Therefore, all nodes can determine the home region for each node using this function, provided they have their node ID. Each node maintains its current location (current zone) with the home region by unicasting a location update message towards its home region. Once the location update packet reaches the home region, it is broadcasted to all the nodes in the home region. Hence, to determine the current location of any node, each node can unicast a location_discovery packet to the required nodes home region (or the area surrounding the home region) in order to find its current location. Once the location is found, the source can start sending data towards the destination using the most forward with fixed radius (MFR) geographical forwarding algorithm. When a data packet reaches the region in which the destination lies, then source routing is used to get the data packet to the destination. The disadvantage of SLURP is that it also relies on a preprogrammed static zone map (as does ZHLS).

Distributed Spanning Trees Based Routing Protocol (DST)

As mentioned earlier, in DST [28] the nodes in the network are grouped into a number of trees. Each tree has two types of nodes; route node, and internal node. The root controls the structure of the tree and whether the tree can merge with another tree, and the rest of the nodes within each tree are the regular nodes. Each node can be in one three different states; router, merge and configure depending on the type of task that it trying to perform. To determine a route DST proposes two different routing strategies; hybrid tree-flooding (HFT) and distributed spanning tree shuttling (DST). In HTF, control packets are sent to all the neighbors and adjoining bridges in the spanning tree, where each packet is held for a period of time called holding time. The idea behind the holding time is that as connectivity increases, and the network becomes more stable, it might be useful to buffer and route packets when the network connectivity is increased over time. In DST, the control packets are disseminated from the source are rebroadcasted along the tree edges. When a control reaches down to a leaf node, it is sent up the tree until it reaches a certain height referred to as the shuttling level. When the shuttling level is reached, the control packet can be sent down the tree or to the adjoining bridges. The main disadvantage of the DST algorithm is that it relies on a root node to configure the tree, which creates a single point of failure. Furthermore, the holding time used to buffer the packets may introduce extra delays into the network.

Distributed Dynamic Routing (DDR)

DDR [24] is also a tree-based routing protocol. However, unlike DST, in DDR the trees do not require a root node. In this strategy trees are constructed using periodic beaconing messages which is exchanged by neighboring nodes only. The trees in the network form a forest, which is connected together via gateway nodes (i.e., nodes which are in transmission range but belong to different trees). Each tree in the forest forms a zone which is assigned a zone ID by running a zone naming algorithm. Since each node can only belong to a single zone (or tree), then the network can be also seen as a number of non-overlapping zones. The DDR algorithm consists of six phases: preferred neighbor election, forest construction, intra-tree clustering, inter-tree clustering, zone naming and zone partitioning. Each of these phases are executed based on information received in the beacon messages. During the initialization phase, each node starts in the preferred neighbor election phase. The preferred neighbor of a node is a node that has the largest number of neighbors. After this, a forest is constructed by connecting each node to their preferred neighbor. Next, the intra-tree clustering algorithm is initiated to determine the structure of the zone (or the tree) and to build up the intra-zone routing table. This is then followed by the execution of the inter-tree algorithm to determine the connectivity with the neighboring zones. Each zone is then assigned a name by running the zone naming algorithm and the network is partitioned into a number of non-overlapping zones. To determine routes, hybrid ad hoc routing protocols (HARP) [23] work on top of DDR. HARP uses the intra-zone and inter-zone routing tables created by DDR to determine a stable path between the source and the destination. The advantage of DDR is that unlike ZHLS, it does not rely on a static zone map to perform routing and it does not require a root node or a clusterhead to coordinate data and control packet transmission between different nodes and zones. However, the nodes that have been selected as preferred neighbors may become performance bottlenecks. This is because they would transmit more routing and data packets than every other node, and these nodes would require more recharging as they will have less sleep time than other nodes. If a node is a preferred neighbor for many of its neighbors, many nodes may want to communicate with it, and channel contention would increase around the preferred neighbor, which would result in larger delays experienced by all neighboring nodes before they can reserve the medium. In networks with high traffic, this may also result in significant reduction in throughput, due to packets being dropped when buffers become full.

Summary of Hybrid Routing

Hybrid routing protocols have the potential to provide higher scalability than pure reactive or proactive protocols. This is because they attempt to minimize the number of rebroadcasting nodes by defining a structure (or some sort of a backbone), which allows the nodes to work together in order organize how routing is to be performed. By working together, the best or the most suitable nodes can be used to perform route discovery. For example, in ZHLS only the nodes which lead to the gateway nodes the interzone route discovery packets. Collaboration between nodes can also help in maintaining routing information much longer. For example, in SLURP, the nodes within each region (or zone) work together to maintain location information about the nodes which are assigned to that region (i.e., their home region). This may potentially eliminate the need for flooding, since the nodes know exactly where to look for a destination every time. Hybrid routing protocols attempt to eliminate single point of failures and bottleneck nodes in the network. This is achieved by allowing any number of nodes to perform routing or data forwarding if the preferred path becomes unavailable.

REFERENCES

1. G. Aggelou, R. Tafazolli, RDMAR: a bandwidth-efficient routing protocol for mobile ad hoc networks, in: ACM International Workshop on Wireless Mobile Multimedia (WoWMoM), 1999, pp. 26-33.
2. S. Basagni, I. Chlamtac, V. R. Syrotivk, B. A. Woodward, A distance effect algorithm for mobility (DREAM), in: Proceedings of the Fourth Annual ACM/IEEE International Conference on Mobile Computing and Networking (Mobicom'98), Dallas, TX, 1998.
3. R. E. Bellman, Dynamic Programming, Princeton University Press, Princeton, NJ (1957).
4. B. Bellur, R. G. Ogier, F. L Templin, Topology broadcast based on reverse-path forwarding routing protocol (tbrpf), in: Internet Draft, draft-ietf-manet-tbrpf-06.txt, work in progress, 2003.
5. T.-W. Chen, M. Gerla, Global state routing: a new routing scheme for ad-hoc wireless networks, in: Proceedings of the IEEE ICC, 1998.
6. C.-C. Chiang, Routing in clustered multihop mobile wireless networks with fading channel, in: Proceedings of IEEE SICON, April 1997, pp. 197-211.
7. M. S. Corson, A. Ephremides, A distributed routing algorithm for mobile wireless networks, ACM/Baltzer Wireless Networks, 1 (1) (1995), pp. 61-81.
8. S. Das, C. Perkins, E. Royer, Ad hoc on demand distance vector (AODV) routing, Internet Draft, draft-ietf-manet-aodv-11.txt, work in progress, 2002.
9. R. Dube, C. Rais, K. Wang, S. Tripathi, Signal stability based adaptive routing (ssa) for ad hoc mobile networks, IEEE Personal Communication, 4 (1) (1997), pp. 36-45.
10. L. R. Ford, D. R. Fulkerson, Flows in Networks, Princeton University Press, Princeton, NJ (1962).
11. J. J. Garcia-Luna-Aceves, C. Marcelo Spohn, Source-tree routing in wireless networks, in: Proceedings of the Seventh Annual International Conference on Network Protocols Toronto, Canada, October 1999, p. 273.
12. M. Gerla, Fisheye state routing protocol (FSR) for ad hoc networks, Internet Draft, draft-ietf-manet-aodv-03.txt, work in progress, 2002.
13. M. Gunes, U. Sorges, I. Bouazizi, Ara—the ant-colony based routing algorithm for manets, in: ICPP workshop on Ad Hoc Networks (IWAHN 2002), August 2002, pp. 79-85.
14. Z. J. Hass, R. Pearlman, Zone routing protocol for ad-hoc networks, Internet Draft, draft-ietf-manet-zrp-02.txt, work in progress, 1999.
15. A. Iwata, C. Chiang, G. Pei, M. Gerla, T. Chen, Scalable routing strategies for multi-hop ad hoc wireless networks, IEEE Journal on Selected Areas in Communcations, 17 (8) (1999), pp. 1369-1379.
16. P. Jacquet, P. Muhlethaler, T. Clausen, A. Laouiti, A. Qayyum, L. Viennot, Optimized link state routing protocol for ad hoc networks, IEEE INMIC, Pakistan, 2001.
17. M. Jiang, J. Ji, Y. C. Tay, Cluster based routing protocol, Internet Draft, draft-ietf-manet-cbrp-spec-01.txt, work in progress, 1999.
18. M. Joa-Ng, I.-T. Lu, A peer-to-peer zone-based two-level link state routing for mobile ad hoc networks, IEEE Journal on Selected Areas in Communications, 17 (8) (1999), pp. 1415-1425.
19. D. Johnson, D. Maltz, J. Jetcheva, The dynamic source routing protocol for mobile ad hoc networks, Internet Draft, draft-ietf-manet-dsr-07.txt, work in progress, 2002.
20. K. K. Kasera, R. Ramanathan, A location management protocol for hierarchically organised multihop mobile wireless networks, in: Proceedings of the IEEE ICUPC'97, San Diego, CA, October 1997, pp. 158-162.
21. Y.-B. Ko, N. H. Vaidya, Location-aided routing (LAR) in mobile ad hoc networks, in: Proceedings of the Fourth Annual ACM/IEEE International Conference on Mobile Computing and Networking (Mobicom'98), Dallas, TX, 1998.
22. S. Murthy J. J. Garcia-Luna-Aceves, A routing protocol for packet radio networks, in: Proceedings of the First Annual ACM International Conference on Mobile Computing and Networking, Berkeley, CA, 1995, pp. 86-95.
23. N. Nikaein, C. Bonnet, N. Nikaein, Harp-hybrid ad hoc routing protocol, in: Proceedings of IST: International Symposium on Telecommunications, September 1-3 Tehran, Iran, 2001.
24. N. Nikaein, H. Laboid, C. Bonnet, Distributed dynamic routing algorithm (ddr) for mobile ad hoc networks, in: Proceedings of the MobiHOC 2000: First Annual Workshop on Mobile Ad Hoc Networking and Computing, 2000.
25. V. D. Park, M. S. Corson, A highly adaptive distributed routing algorithm for mobile wireless networks, in: Proceedings of INFOCOM, April 1997.
26. G. Pei, M. Gerla, X. Hong, C. Chiang, A wireless hierarchical routing protocol with group mobility, in: Proceedings of Wireless Communications and Networking, New Orleans, 1999.
27. C. E. Perkins, T. J. Watson, Highly dynamic destination sequenced distance vector routing (DSDV) for mobile computers, in: ACM SIGCOMM'94 Conference on Communications Architectures, London, U K, 1994.
28. S. Radhakrishnan, N. S. V Rao, G. Racherla, C. N. Sekharan, S. G. Batsell, DST-A routing protocol for ad hoc networks using distributed spanning trees, in: IEEE Wireless Communications and Networking Conference, New Orleans, 1999.
29. J. Raju, J. Garcia-Luna-Aceves, A new approach to on-demand loop-free multipath routing, in: Proceedings of the 8th Annual IEEE International Conference on Computer Communications and Networks (ICCCN), Boston, MA, October 1999, pp. 522-527.
30. E. M. Royer, C.-K. Toh, A review of current routing protocols for ad hoc mobile wireless networks, IEEE Personal Communications, 6 (2) (1999), pp. 46-55.
31. A. Udaya Shankar, C. Alaettinoglu, I. Matta, K. Dussa-Zieger, Performance comparison of routing protocols using MaRS: distance-vector versus link-state, in: Proceedings of the 1992 ACM SIGMETRICS and PERFORMANCE '92 Int'l. Conf. on Measurement and Modeling of Computer Systems, Newport, RI, USA, 1-5 Jun. 1992, p. 181.
32. W. Su, M. Gerla, Ipv6 flow handoff in ad-hoc wireless networks using mobility prediction, in: IEEE Global Communications Conference, Rio de Janeiro, Brazil, December 1999, pp. 271-275.
33. C. Toh, A novel distributed routing protocol to support ad-hoc mobile computing, in: IEEE 15th Annual International Phoenix Conf, 1996, pp. 480-486.

34. S.-C. Woo, S. Singh, Scalable routing protocol for ad hoc networks, Wireless Networks, 7 (5) (2001), pp. 513-529.
35. G. Pei, M. Gerla and X. Hong, "LANMAR: Landmark Routing for Large Scale Wireless Ad Hoc Networks with Group Mobility," Proc. IEEE/ACM MobiHOC 2000, Boston, MA, August 2000, pp. 11-18.
36. X. Hong et al., "Scalable Ad Hoc Routing in Large, Dense Wireless Networks Using Clustering and Landmarks," Proc. ICC 2002, New York, NY, April 2002.
37. M. Gerla, X. Hong, and G. Pei, "Landmark Routing for Large Ad Hoc Wireless Networks," Proc. IEEE GLOBECOM 2000, San Francisco, CA, November 2000.
38. C. E. Perkins and P. Bhagwat, "Highly Dynamic Destination-Sequenced Distance-Vector Routing (DSDV) for Mobile Computers," Proc. ACM SIGCOMM '94, London, U.K., September 1994, pp. 234-44.
39. X. Hong, K. Xu, M. Gerla, "Scalable Routing Protocols for Mobile Ad Hoc Networks", IEEE Network, July/August 2002, pp. 11-21.
40. J. C. Navas and T. Imielinski, "Geographic Addressing and Routing," Proc. 3rd ACM/IEEE Intn'l. Conf Mobile Comp. Net., Budapest, Hungary, Sep. 26-30, 1997.
41. B. Karp and H. T. Kung, "GPSR: Greedy Perimeter Stateless Routing for Wireless Networks," Proc. 6th Annual Int'l. Conf. Mobile Computing and Networking (MobiCom 2000), Boston, MA, USA, 2000, pp. 243-54.

See, e.g., U.S. Pat. Nos. 6,047,330; 6,415,158; 6,421,349; 6,584,080; 6,625,135; 6,628,620; 6,647,426; 6,678,252; 6,704,301; 6,718,394; 6,745,027; 6,754,192; 6,763,013; 6,763,014; 6,766,309; 6,775,258; 6,807,165; 6,813,272; 6,816,460; 6,836,463; 6,845,091; 6,870,846; 6,873,839; 6,879,574; 6,894,985; 6,898,529; 6,904,275; 6,906,741; 6,909,706; 6,917,618; 6,917,985; 6,934,540; 6,937,602; 6,954,435; 6,954,790; 6,958,986; 6,961,310; 6,975,614; 6,977,608; 6,980,537; 6,982,982; 6,985,476; 6,986,161; 6,996,084; 7,006,437; 7,006,453; 7,007,102; 7,016,325; 7,016,336; 7,027,409; 7,027,426; 7,028,099; 7,028,687; 7,031,288; 7,031,293; 7,039,035; 7,061,924; 7,061,925; 7,068,600; 7,068,605; 7,069,483; 7,075,919; 7,079,509; 7,079,552; 7,082,117; 7,085,241; 7,085,290; 7,088,717; 7,092,391; 7,092,943; 7,096,037; 7,096,359; 7,099,296; 7,116,661; 7,127,250; 7,133,391; 7,133,704; 7,142,866; 7,151,757; 7,151,769; 7,155,264; 7,155,518; 7,161,929; 7,170,425; 7,176,807; 7,177,295; 7,177,646; 7,184,421; 7,190,678; 7,194,010; 7,197,016; 7,200,132; 7,209,468; 7,209,771; 7,209,978; 7,212,504; 7,215,926; 7,216,282; 7,221,668; 7,224,642; 7,230,916; 7,242,678; 7,251,238; 7,251,489; 7,263,063; 7,266,085; 7,266,104; 7,269,147; 7,271,736; 7,281,057; 7,295,556; 7,298,743; 7,299,038; 7,299,042; 7,305,459; 7,308,369; 7,308,370; 7,315,548; 7,317,898; 7,324,824; 7,327,683; 7,327,998; 7,330,694; 7,333,461; 7,339,897; 7,339,925; 7,342,895; 7,346,015; 7,346,167; 7,348,895; 7,349,362; 7,349,370; 7,356,001; 7,359,358; 7,362,711; 7,362,727; 7,366,111; 7,366,544; 7,367,497; 7,376,122; 7,382,765; 7,389,295; 7,391,742; 7,394,774; 7,394,798; 7,394,826; 7,397,785; 7,397,789; 7,400,596; 7,400,903; 7,406,078; 7,408,911; 7,414,977; 7,415,019; 7,417,962; 7,418,238; 7,420,944; 7,420,952; 7,420,954; 7,423,985; 7,427,927; 7,428,221; 7,443,822; 7,450,517; 7,451,365; 7,453,864; 7,457,304; 7,457,834; 7,463,612; 7,463,907; 7,466,665; 7,466,676; 7,468,954; 7,480,248; 7,486,651; 7,489,635; 7,489,932; 7,492,787; 7,495,578; 7,496,059; 7,496,600; 7,505,450; 7,512,079; 7,512,094; 7,512,783; 7,515,551; 7,522,547; 7,522,568; 7,522,731; 7,529,547; 7,529,561; 7,532,585; 7,535,883; 7,536,388; 7,539,759; 7,545,285; 7,546,126; 7,561,024; 7,561,525; 7,564,842; 7,564,862; 7,567,547; 7,567,577; 7,580,380; 7,580,382; 7,580,730; 7,580,782; 7,581,095; 7,586,853; 7,586,897; 7,587,001; 7,590,589; 7,593,377; 7,593,385; 7,596,152; 7,599,696; 7,602,738; 7,606,176; 7,606,178; 7,606,938; 7,609,644; 7,609,672; 7,616,961; 7,620,366; 7,620,708; 7,626,931; 7,626,966; 7,626,967; 7,633,865; 7,633,884; 7,634,230; 7,639,652; 7,643,467; 7,646,754; 7,649,852; 7,649,872; 7,649,884; 7,649,896; 7,653,003; 7,653,011; 7,653,355; 7,656,851; 7,656,857; 7,656,901; 7,657,354; 7,657,373; 7,660,305; 7,660,318; 7,660,950; 7,664,111; 7,664,538; 7,668,119; 7,668,137; 7,668,173; 7,672,307; 7,675,863; 7,675,882; 7,678,068; 7,680,088; 7,680,091; 7,684,314; 7,688,847; 7,689,224; 7,693,064; 7,693,093; 7,693,167; 7,693,484; 7,695,446; 7,697,940; 7,698,463; 7,701,858; 7,701,935; 7,702,594; 7,706,282; 7,706,327; 7,706,369; 7,706,842; 7,710,896; 7,710,932; 7,715,396; 7,719,988; 7,720,037; 7,725,080; 7,729,336; 7,733,818; 7,739,402; 7,742,399; 7,742,430; 7,746,794; 7,751,360; 7,751,420; 7,753,795; 7,756,041; 7,760,701; 7,760,735; 7,764,617; 7,768,926; 7,768,992; 7,773,575; 7,778,235; 7,778,270; 7,787,361; 7,787,450; 7,787,480; 7,788,387; 7,796,511; 7,796,573; 7,800,812; 7,801,042; 7,808,939; 7,808,985; 7,808,987; 7,813,326; 7,813,451; 7,814,322; 7,817,623; 7,821,994; 7,822,023; 7,826,372; 7,830,820; 7,839,791; 7,843,861; 7,847,734; 7,848,702; 7,848,757; 7,849,139; 7,852,816; 7,852,826; 7,855,981; 7,859,465; 7,860,025; 7,860,081; 7,860,968; 7,869,792; 7,873,019; 7,881,206; 7,881,229; 7,881,474; 7,881,667; 7,886,075; 7,889,655; 7,889,691; 7,889,743; 7,890,112; 7,894,374; 7,894,416; 7,894,828; 7,898,977; 7,898,979; 7,898,993; 7,899,005; 7,899,027; 7,902,973; 7,905,640; 7,911,962; 7,912,645; 7,912,982; 7,924,722; 7,924,726; 7,924,745; 7,924,761; 7,924,796; 7,929,914; 7,933,236; 7,936,678; 7,936,697; 7,936,732; 7,940,668; 7,940,716; 7,941,188; 7,944,878; 7,948,931; 7,948,966; 7,957,355; 7,957,410; 7,958,271; 7,961,626; 7,961,650; 7,962,101; 7,962,154; 7,965,671; 7,965,678; 7,969,914; 7,970,418; 7,974,402; 7,978,062; 7,978,612; 7,978,672; 7,978,725; 7,979,311; 7,983,239; 7,983,619; 7,983,835; 7,990,897; 7,990,947; 7,995,501; 7,995,524; 7,996,558; 8,005,054; 8,009,591; 8,014,404; 8,023,423; 8,027,273; 8,031,605; 8,031,720; 8,032,746; 8,035,479; 8,040,863; 8,041,369; 8,042,048; 8,054,819; 8,059,544; 8,059,578; 8,059,620; 8,060,017; 8,060,308; 8,060,590; 8,060,649; 8,064,377; 8,064,416; 8,065,166; 8,065,411; 8,072,902; 8,072,906; 8,072,992; 8,073,384; 8,077,663; 8,081,658; 8,085,686; 8,089,866; 8,089,970; 8,090,596; 8,094,583; 8,098,421; 8,099,108; 8,099,307; 8,102,775; 8,106,792; 8,107,397; 8,108,228; 8,108,429; 8,111,619; 8,112,082; 8,115,617; 8,117,440; 8,120,839; 8,121,086; 8,121,628; 8,121,870; 8,125,928; 8,126,473; 8,127,039; 8,130,654; 8,130,656; 8,130,663; 8,130,708; 8,131,569; 8,131,838; 8,134,950; 8,134,995; 8,135,021; 8,135,362; 8,138,690; 8,138,934; 8,139,504; 8,144,595; 8,144,596; 8,144,619; 8,144,671; 8,144,708; 8,149,716; 8,149,748; 8,151,140; 8,155,008; 8,155,045; 8,161,097; 8,161,283; 8,165,143; 8,165,585; 8,169,974; 8,170,030; 8,170,577; 8,170,957; 8,171,364; 8,174,381; 8,179,837; 8,180,294; 8,184,681; 8,189,561; 8,194,541; 8,195,483; 8,195,628; 8,199,753; 8,200,246; 8,203,463; 8,203,464; 8,203,971; 8,208,368; 8,208,465; 8,213,352; 8,213,409; 8,213,895; 8,217,805; 8,218,519; 8,218,522; 8,223,680; 8,228,954; 8,230,108; 8,232,745; 8,233,463; 8,238,288; 8,238,346; 8,239,169; 8,243,603; 8,248,947; 8,249,101; 8,249,984; 8,254,348; 8,255,469; 8,256,681; 8,266,657; 8,270,302; 8,270,341; 8,271,449; 8,275,824; 8,280,345; 8,284,045; 8,284,670; 8,284,741; 8,289,182; 8,289,186; 8,291,112; 8,300,538; 8,300,551; 8,300,615; 8,311,533; 8,314,717; 8,315,218;

8,315,231; 8,315,565; 8,315,636; 8,319,658; 8,319,833; 8,320,288; 8,320,302; 8,320,414; 8,323,189; 8,325,612; 8,325,627; 8,330,649; 8,331,262; 8,332,055; 8,334,787; 8,335,164; 8,335,207; 8,335,814; 8,335,989; 8,339,069; 8,339,948; 8,341,279; 8,341,289; 8,345,098; 8,345,555; 8,346,846; 8,351,339; 8,352,420; 8,355,410; 8,356,078; 8,358,660; 8,359,643; 8,363,662; 8,364,648; 8,368,321; 8,369,216; 8,369,880; 8,370,697; 8,370,894; 8,373,362; 8,373,556; 8,373,588; 8,374,352; 8,385,322; 8,385,550; 8,386,278; 8,391,271; 8,391,778; 8,392,541; 8,395,498; 8,396,602; 8,400,507; 8,401,464; 8,401,564; 8,406,153; 8,406,177; 8,406,239; 8,406,248; 8,406,252; 8,422,497; 8,422,957; 8,428,517; 8,432,820; 8,441,958; 8,442,023; 8,442,057; 8,442,520; 8,447,419; 8,447,849; 8,447,875; 8,451,744; 8,451,807; 8,457,005; 8,462,691; 8,463,238; 8,467,297; 8,467,309; 8,467,991; 8,472,348; 8,473,616; 8,473,633; 8,473,989; 8,475,368; 8,477,687; 8,477,689; 8,483,616; 8,484,661; 8,488,589; 8,489,701; 8,489,765; 8,493,849; 8,494,458; 8,495,244; 8,496,181; 8,498,224; 8,502,148; 8,502,640; 8,503,309; 8,503,677; 8,503,934; 8,504,921; 8,509,109; 8,509,245; 8,509,248; 8,509,762; 8,509,765; 8,510,025; 8,514,758; 8,514,825; 8,514,915; 8,515,409; 8,515,547; 8,516,575; 8,520,535; 8,520,676; 8,521,156; 8,525,692; 8,527,457; 8,527,622; 8,531,134; 8,532,071; 8,533,465; 8,533,758; 8,536,802; 8,537,714; 8,543,249; 8,543,809; 8,544,023; 8,547,875; 8,547,943; 8,547,981; 8,548,607; 8,552,664; 8,553,586; 8,553,688; 8,554,232; 8,559,434; 8,559,442; 8,559,447; 8,560,274; 8,561,200; 8,570,892; 8,570,954; 8,571,004; 8,571,046; 8,571,518; 8,571,519; 8,577,391; 8,578,015; 8,578,054; 8,582,470; 8,582,491; 8,583,671; 8,583,978; 8,587,427; 8,588,108; 8,593,135; 8,593,419; 8,593,986; 8,595,359; 8,599,822; 8,600,830; 8,605,671; 8,610,376; 8,610,377; 8,611,256; 8,612,386; 8,612,583; 8,615,257; 8,619,576; 8,619,644; 8,619,789; 8,620,772; 8,620,784; 8,621,201; 8,621,577; 8,622,837; 8,624,771; 8,625,515; 8,625,574; 8,626,344; 8,626,844; 8,626,948; 8,630,177; 8,630,275; 8,630,291; 8,630,314; 8,631,101; 8,636,395; 8,638,667; 8,638,762; 8,638,763; 8,652,038; 8,654,627; 8,654,649; 8,654,782; 8,660,108; 8,665,890; 8,667,084; 8,670,302; 8,670,374; 8,670,416; 8,670,746; 8,670,749; 8,675,645; 8,675,678; 8,681,693; 8,682,982; 8,687,558; 8,687,946; 8,688,041; 8,693,322; 8,693,345; 8,693,366; 8,693,372; 8,693,399; 8,699,333; 8,699,368; 8,699,377; 8,699,410; 8,700,301; 8,700,302; 8,700,536; 8,700,749; 8,705,379; 8,705,522; 8,706,072; 8,707,785; 8,711,704; 8,711,818; 8,712,711; 8,715,072; 8,718,055; 8,718,093; 8,719,563; 8,724,508; 8,724,533; 8,725,274; 8,727,978; 8,730,047; 8,730,875; 8,732,454; 8,732,727; 8,737,206; 8,737,268; 8,738,944; 8,743,750; 8,743,768; 8,743,866; 8,744,516; 8,747,313; 8,750,100; 8,750,167; 8,750,242; 8,751,063; 8,751,644; 8,754,589; 8,755,294; 8,755,331; 8,755,336; 8,755,763; 8,756,449; 8,760,339; 8,761,125; 8,761,175; 8,761,285; 8,762,518; 8,762,747; 8,762,852; 8,769,442; 8,774,050; 8,774,189; 8,774,192; 8,774,946; 8,780,201; 8,780,762; 8,780,920; 8,780,953; 8,781,462; 8,787,246; 8,787,392; 8,787,944; 8,788,516; 8,788,899; 8,792,154; 8,792,850; 8,792,880; 8,797,878; 8,797,944; 8,798,084; 8,798,094; 8,799,220; 8,799,510; 8,800,010; 8,804,603; 8,804,613; 8,805,550; 8,806,573; 8,806,633; 8,811,188; 8,812,419; 8,817,665; 8,817,795; 8,818,322; 8,818,522; 8,819,172; 8,819,191; 8,821,293; 8,823,277; 8,823,795; 8,824,336; 8,824,380; 8,824,471; 8,830,837; 8,831,279; 8,831,869; 8,832,428; 8,837,277; 8,837,528; 8,841,859; 8,842,180; 8,842,630; 8,842,659; 8,843,156; 8,843,241; 8,848,721; 8,848,970; 8,855,794; 8,855,830; 8,856,252; 8,856,323; 8,861,390; 8,862,774; 8,866,408; 8,867,329; 8,868,374; 8,872,379; 8,872,767; 8,872,915; 8,873,391; 8,873,526; 8,874,477; 8,874,788; 8,879,604; 8,879,613; 8,880,060; 8,885,501; 8,885,630; 8,886,227; 8,891,534; 8,891,588; 8,892,135; 8,892,271; 8,892,769; 8,897,158; 8,897,745; 8,902,794; 8,902,904; 8,908,516; 8,908,536; 8,908,621; 8,908,626; 8,918,480; 8,918,691; 8,923,186; 8,923,302; 8,923,422; 8,925,084; 8,929,375; 8,930,361; 8,930,374; 8,934,366; 8,934,496; 8,937,886; 8,938,270; 8,942,120; 8,942,197; 8,942,219; 8,942,301; 8,948,015; 8,948,046; 8,948,052; 8,948,229; 8,949,959; 8,953,457; 8,954,170; 8,954,582; 8,958,291; 8,958,339; 8,958,417; 8,959,539; 8,964,747; 8,964,762; 8,964,773; 8,964,787; 8,965,288; 8,966,018; 8,966,046; 8,966,557; 8,970,392; 8,970,394; 8,971,188; 8,972,159; 8,972,589; 8,976,007; 8,976,728; 8,982,708; 8,982,856; 8,984,277; 8,988,990; 8,989,052; 8,995,251; 8,996,666; 9,001,645; 9,001,669; 9,001,676; 9,001,787; 9,003,065; 9,008,092; 9,013,173; 9,013,983; 9,019,846; 9,020,008; 9,026,039; 9,026,273; 9,026,279; 9,026,336; 9,030,939; 9,037,896; 9,041,349; 9,042,267; 9,054,952; 9,055,105; 9,055,521; 9,059,929; 9,060,023; 9,060,322; 9,060,386; 9,071,533; 9,072,100; 9,072,133; 9,077,637; 9,077,772; 9,081,567; 9,083,627; 9,084,120; 9,088,983; 9,094,324; 9,094,853; 9,100,285; 9,100,772; 9,100,989; 9,106,555; 9,112,805; 9,118,539; 9,119,130; 9,119,142; 9,119,179; 9,124,482; 9,125,254; 9,128,172; 9,128,689; 9,130,863; 9,143,456; 9,143,912; 9,143,975; 9,148,373; 9,148,391; 9,152,146; 9,154,370; 9,154,407; 9,154,982; 9,155,020; 9,160,553; 9,160,760; 9,161,257; 9,161,290; 9,166,845; 9,166,880; 9,166,908; 9,167,496; 9,172,613; 9,172,636; 9,172,662; 9,172,738; 9,172,812; 9,173,168; 9,173,245; 9,176,832; 9,179,353; 9,185,070; 9,185,521; 9,189,822; 9,191,303; 9,191,377; 9,197,572; 9,198,033; 9,198,203; 9,203,928; 9,209,943; 9,210,045; 9,210,608; 9,210,647; 9,218,216; 9,219,682; 9,220,049; 9,225,589; 9,225,637; 9,225,639; 9,225,782; 9,226,182; 9,226,218; 9,230,104; 9,231,850; 9,231,965; 9,232,458; 9,236,904; 9,236,999; 9,237,220; 9,240,913; 9,246,586; 9,247,482; 9,253,021; 9,257,036; 9,258,702; 9,258,765; 9,261,752; 9,264,349; 9,264,355; 9,264,491; 9,264,892; 9,270,584; 9,271,178; 9,275,376; 9,276,845; 9,277,477; 9,277,482; 9,277,503; 9,281,865; 9,282,059; 9,282,383; 9,286,473; 9,288,066; 9,294,488; 9,294,878; 9,295,099; 9,300,569; 9,306,620; 9,306,833; 9,306,841; 9,311,670; 9,312,918; 9,313,275; 9,313,813; 9,317,377; 9,319,332; 9,325,626; 9,331,931; 9,332,072; 9,338,065; 9,338,727; 9,344,355; 9,344,950; 9,350,635; 9,350,683; 9,350,809; 9,351,155; 9,351,173; 9,356,858; 9,356,875; 9,357,331; 9,363,166; 9,363,651; 9,369,177; 9,369,351; 9,369,381; 9,369,923; 9,374,281; 9,385,933; 9,386,502; 9,386,578; 9,391,784; 9,391,806; 9,391,839; 9,391,878; 9,391,891; 9,392,020; 9,392,482; 9,398,035; 9,398,467; 9,398,568; 9,401,863; 9,402,216; 9,407,646; 9,411,916; 9,413,479; 9,413,643; 9,413,779; 9,417,691; 9,418,340; 9,419,920; 9,419,981; 9,426,035; 9,426,040; 9,426,716; 9,438,386; 9,444,598; 9,444,721; 9,444,727; 9,450,642; 9,450,857; 9,450,972; 9,450,978; 9,451,476; 9,455,903; 9,468,014; 9,473,364; 9,479,995; 9,485,153; 9,485,157; 9,485,174; 9,485,185; 9,485,673; 9,489,506; 9,490,419; 9,491,051; 9,491,076; 9,497,215; 9,503,359; 9,503,466; 9,504,051; 9,509,636; 9,510,264; 9,510,347; 9,515,914; 9,516,025; 9,521,158; 9,525,617; 9,526,030; 9,526,061; 9,531,635; 9,537,593; 9,537,789; 9,542,642; 9,544,018; 9,544,162; 9,544,220; 9,547,828; 9,549,363; 9,553,772; 9,553,773; 9,553,796; 9,554,322; 9,557,188; 9,559,750; 9,559,918; 9,563,440; 9,563,854; 9,565,108; 9,565,111; 9,576,404; 9,577,914; 9,577,915; 9,582,242; 9,585,113; 9,589,006; 9,590,692; 9,590,790; 9,590,896; 9,590,918;

9,596,169; 9,596,619; 9,602,159; 9,602,296; 9,602,379; 9,602,399; 9,602,420; 9,608,912; 9,609,553; 9,614,770; 9,615,264; 9,615,284; 9,621,457; 9,621,458; 9,626,628; 9,628,362; 9,628,371; 9,634,928; 9,634,982; 9,635,050; 9,641,382; 9,641,542; 9,642,064; 9,647,494; 9,648,517; 9,648,544; 9,648,547; 9,652,720; 9,654,389; 9,654,478; 9,658,509; 9,661,551; 9,667,501; 9,667,536; 9,667,556; 9,668,195; 9,672,346; 9,673,858; 9,674,207; 9,679,336; 9,686,312; 9,686,369; 9,686,792; 9,692,538; 9,692,644; 9,693,179; 9,693,297; 9,696,884; 9,698,864; 9,698,867; 9,699,768; 9,705,737; 9,705,914; 9,706,420; 9,706,598; 9,712,282; 9,712,332; 9,712,394; 9,712,423; 9,712,433; 9,713,061; 9,716,528; 9,722,905; 9,722,909; 9,723,538; 9,729,430; 9,730,017; 9,730,078; 9,730,100; 9,736,056; 9,743,339; 9,749,410; 9,756,549; 9,766,619; 9,769,821; 9,769,871; 9,774,410; 9,774,522; 9,774,534; 9,785,509; 9,788,329; 9,794,162; 9,794,179; 9,794,797; 9,794,808; 9,794,934; 9,800,493; 9,800,506; 9,801,215; 9,816,897; 9,818,136; 9,819,505; 9,820,142; 9,820,658; 9,832,705; 9,838,942; 9,842,202; 9,847,889; 9,848,345; 9,848,422; 9,848,459; 9,853,883; 9,860,961; 9,866,395; 9,866,431; 9,870,537; 9,876,747; 9,882,804; 9,883,507; 9,887,936; 9,887,974; 9,893,985; 9,895,604; 9,900,079; 9,900,119; 9,900,169; 9,906,434; 9,906,439; 9,917,785; 9,917,871; 9,922,196; 9,923,802; 9,923,832; 9,924,439; 9,924,550; 9,935,868; 9,942,894; 9,949,129; 9,955,423; 9,955,456; 9,961,144; 9,973,596; 9,979,615; 9,979,619; 9,985,716; 9,986,484; 9,992,091; RE42871; 20010040895; 20020012320; 20020039357; 20020061009; 20020062388; 20020069278; 20020071160; 20020080888; 20020083316; 20020107023; 20020120874; 20020133534; 20020145978; 20020176399; 20020188656; 20020191573; 20020196789; 20020198994; 20030048749; 20030076837; 20030084020; 20030095504; 20030161268; 20030163729; 20030165117; 20030179742; 20030185233; 20030202468; 20030202469; 20030202476; 20030202477; 20030202512; 20030204587; 20030204616; 20030212821; 20030212941; 20030235175; 20040014467; 20040022223; 20040022224; 20040025018; 20040028000; 20040028016; 20040028018; 20040029553; 20040029601; 20040032847; 20040042417; 20040042434; 20040048618; 20040057409; 20040071124; 20040081152; 20040085928; 20040090943; 20040095915; 20040103275; 20040117339; 20040121786; 20040125795; 20040143678; 20040157557; 20040160943; 20040174900; 20040179502; 20040185889; 20040190468; 20040190476; 20040196854; 20040203385; 20040203797; 20040203820; 20040210657; 20040213167; 20040215687; 20040218528; 20040218548; 20040218582; 20040219909; 20040223491; 20040223497; 20040223498; 20040223499; 20040223500; 20040225740; 20040228304; 20040228343; 20040228490; 20040240426; 20040246144; 20040246902; 20040246931; 20040246975; 20040264422; 20040264466; 20050013253; 20050014510; 20050021725; 20050041591; 20050041627; 20050041628; 20050041676; 20050053003; 20050053004; 20050053005; 20050053007; 20050053094; 20050054346; 20050058149; 20050073962; 20050073992; 20050076054; 20050078678; 20050083859; 20050088993; 20050094574; 20050094594; 20050094620; 20050099971; 20050100029; 20050105524; 20050129000; 20050135379; 20050136972; 20050141706; 20050152305; 20050152318; 20050153725; 20050157661; 20050163144; 20050169257; 20050175009; 20050185632; 20050190717; 20050190759; 20050190767; 20050195814; 20050243757; 20050249215; 20050254472; 20050254473; 20050259588; 20050259595; 20050259671; 20050265259; 20050271006; 20050276608; 20050286419; 20060002328; 20060007863; 20060007865; 20060013177; 20060023632; 20060023677; 20060029074; 20060030318; 20060031576; 20060034232; 20060034233; 20060039371; 20060056353; 20060067213; 20060089119; 20060092043; 20060092898; 20060092939; 20060095199; 20060098608; 20060101157; 20060114851; 20060117113; 20060120303; 20060126514; 20060126524; 20060126535; 20060126587; 20060128349; 20060136721; 20060146846; 20060155827; 20060159024; 20060159082; 20060165037; 20060167784; 20060176829; 20060176863; 20060182145; 20060187893; 20060188327; 20060195590; 20060206857; 20060215605; 20060227724; 20060229090; 20060233377; 20060251115; 20060253747; 20060265508; 20060268688; 20060268749; 20060268796; 20060280131; 20060291404; 20060291485; 20060291864; 20070025274; 20070038743; 20070053053; 20070064950; 20070070909; 20070070983; 20070086358; 20070087756; 20070087758; 20070091805; 20070091811; 20070110024; 20070110102; 20070115810; 20070124063; 20070127379; 20070127503; 20070129015; 20070140129; 20070140239; 20070147321; 20070153707; 20070153737; 20070153764; 20070161388; 20070171862; 20070183346; 20070195400; 20070195702; 20070195713; 20070195728; 20070195768; 20070195799; 20070197262; 20070201428; 20070206547; 20070214046; 20070214254; 20070223310; 20070223436; 20070229231; 20070230410; 20070237150; 20070247368; 20070248117; 20070258473; 20070258508; 20070280136; 20070280174; 20070280192; 20070286097; 20070286139; 20070297371; 20070297375; 20070297808; 20080004904; 20080008138; 20080008201; 20080019298; 20080019328; 20080025270; 20080026781; 20080031187; 20080031203; 20080036589; 20080037431; 20080037454; 20080037560; 20080037569; 20080040507; 20080040509; 20080043316; 20080051036; 20080051099; 20080056157; 20080056207; 20080059652; 20080062916; 20080062947; 20080069105; 20080080520; 20080095058; 20080095059; 20080101332; 20080107034; 20080112422; 20080117885; 20080117896; 20080123584; 20080126403; 20080130500; 20080130640; 20080144497; 20080144566; 20080151793; 20080151841; 20080151889; 20080151916; 20080159142; 20080159143; 20080159144; 20080159151; 20080159358; 20080165745; 20080170513; 20080170518; 20080170550; 20080175149; 20080175244; 20080183853; 20080186562; 20080192713; 20080192724; 20080195360; 20080198789; 20080198824; 20080198865; 20080200165; 20080205312; 20080205332; 20080205385; 20080212494; 20080219185; 20080219237; 20080228940; 20080232338; 20080240050; 20080247335; 20080247353; 20080247355; 20080252485; 20080253340; 20080259927; 20080261580; 20080262893; 20080267116; 20080273487; 20080273518; 20080279155; 20080279204; 20080291843; 20080291855; 20080298251; 20080310325; 20080310340; 20080310390; 20080320305; 20090003324; 20090003366; 20090010204; 20090010205; 20090016262; 20090043909; 20090046688; 20090046714; 20090046732; 20090047938; 20090052429; 20090054033; 20090059814; 20090059816; 20090061835; 20090062887; 20090075625; 20090085769; 20090086663; 20090086973; 20090092074; 20090097490; 20090109898; 20090116393; 20090116511; 20090122738; 20090122748; 20090122753; 20090122766; 20090122797; 20090129316; 20090135824; 20090147702; 20090147766; 20090168653; 20090174569; 20090175170; 20090175238; 20090185508; 20090185538; 20090190514; 20090196194; 20090201860; 20090201899; 20090210495; 20090215411; 20090217033; 20090219194; 20090225751; 20090228575; 20090228693; 20090228708; 20090232119; 20090245159; 20090252102; 20090252134; 20090267540; 20090274106; 20090290494; 20090310488; 20090316682; 20090323519; 20100008231; 20100014444; 20100017045; 20100020721; 20100020740; 20100020756; 20100029216; 20100058442; 20100061299; 20100061352;

20100070600; 20100074141; 20100074194; 20100091823; 20100091924; 20100097957; 20100097969; 20100097971; 20100103870; 20100106961; 20100111063; 20100118727; 20100118750; 20100118775; 20100118776; 20100123572; 20100124196; 20100124207; 20100125671; 20100125674; 20100135195; 20100142421; 20100142445; 20100142446; 20100142447; 20100142448; 20100142551; 20100150027; 20100150120; 20100152619; 20100157888; 20100157889; 20100165995; 20100166003; 20100169937; 20100172249; 20100172298; 20100177753; 20100185753; 20100187832; 20100188979; 20100202355; 20100203878; 20100208662; 20100214934; 20100214960; 20100226284; 20100226342; 20100226381; 20100232317; 20100232354; 20100235285; 20100238890; 20100246549; 20100254282; 20100254309; 20100254312; 20100259931; 20100260131; 20100264846; 20100265955; 20100270933; 20100271934; 20100279776; 20100285774; 20100295473; 20100295474; 20100295475; 20100295482; 20100296285; 20100301768; 20100301769; 20100301770; 20100301771; 20100301773; 20100301774; 20100301834; 20100302624; 20100302779; 20100302945; 20100302947; 20100303082; 20100304759; 20100306320; 20100308207; 20100309912; 20100316033; 20100317420; 20100329274; 20110001436; 20110001438; 20110002243; 20110004513; 20110006913; 20110007687; 20110010446; 20110019540; 20110019652; 20110019678; 20110047230; 20110050457; 20110051662; 20110051702; 20110058545; 20110066297; 20110072156; 20110075578; 20110078461; 20110078775; 20110080853; 20110085530; 20110090787; 20110099153; 20110099189; 20110099490; 20110099611; 20110107225; 20110107420; 20110107431; 20110110273; 20110116366; 20110116376; 20110117852; 20110119637; 20110125765; 20110128884; 20110131180; 20110133924; 20110141888; 20110142057; 20110149756; 20110149849; 20110149973; 20110158153; 20110164527; 20110164546; 20110185047; 20110187527; 20110188378; 20110188653; 20110200026; 20110204720; 20110205925; 20110211472; 20110211534; 20110216656; 20110216667; 20110222435; 20110223937; 20110225311; 20110225312; 20110228696; 20110228777; 20110228788; 20110231573; 20110231862; 20110235550; 20110235573; 20110238751; 20110239158; 20110255399; 20110255479; 20110261799; 20110267981; 20110273568; 20110280156; 20110280246; 20110289320; 20110302635; 20110305136; 20110314504; 20120005201; 20120008527; 20120014309; 20120023171; 20120026877; 20120030150; 20120039186; 20120039190; 20120044864; 20120051339; 20120057515; 20120063436; 20120091315; 20120092984; 20120092993; 20120093134; 20120106428; 20120113807; 20120113863; 20120113896; 20120113901; 20120113986; 20120116559; 20120117208; 20120117213; 20120117268; 20120117438; 20120127977; 20120134287; 20120134361; 20120134548; 20120135723; 20120154633; 20120155260; 20120155276; 20120155284; 20120155329; 20120155397; 20120155463; 20120155475; 20120155511; 20120158933; 20120176931; 20120176941; 20120182867; 20120188968; 20120196636; 20120197988; 20120207294; 20120208592; 20120209808; 20120209910; 20120210233; 20120213124; 20120224587; 20120224743; 20120230204; 20120230222; 20120230370; 20120233326; 20120233485; 20120235579; 20120236724; 20120242501; 20120243408; 20120243621; 20120250575; 20120254338; 20120257624; 20120258777; 20120272295; 20120275642; 20120277893; 20120280908; 20120282905; 20120282911; 20120284012; 20120284122; 20120284339; 20120284593; 20120287941; 20120294152; 20120300758; 20120307624; 20120307629; 20120307652; 20120307653; 20120307676; 20120307752; 20120307825; 20120309417; 20120311334; 20120314660; 20120320768; 20120320781; 20120320790; 20120320923; 20120324273; 20120327792; 20120331316; 20130010590; 20130010615; 20130010798; 20130012220; 20130013806; 20130013809; 20130016612; 20130016757; 20130016758; 20130016759; 20130018993; 20130019005; 20130022042; 20130022046; 20130022053; 20130022083; 20130022084; 20130024149; 20130024560; 20130028095; 20130028103; 20130028104; 20130028140; 20130028143; 20130028295; 20130031253; 20130033987; 20130034031; 20130042301; 20130045759; 20130051250; 20130055383; 20130059585; 20130064072; 20130064102; 20130064137; 20130067063; 20130069780; 20130070597; 20130070751; 20130079152; 20130080307; 20130083658; 20130083688; 20130086601; 20130088999; 20130089011; 20130094366; 20130094398; 20130094536; 20130094537; 20130100872; 20130100942; 20130103765; 20130107726; 20130107758; 20130111038; 20130121176; 20130121331; 20130121335; 20130122807; 20130124883; 20130128726; 20130128773; 20130136416; 20130138792; 20130143529; 20130143535; 20130148573; 20130151563; 20130159479; 20130159548; 20130159550; 20130169838; 20130170393; 20130170394; 20130177025; 20130178718; 20130182566; 20130183952; 20130188471; 20130188492; 20130188513; 20130188562; 20130191688; 20130194970; 20130195095; 20130201316; 20130201869; 20130201891; 20130208583; 20130208714; 20130215739; 20130215942; 20130219045; 20130219046; 20130219478; 20130223218; 20130223225; 20130223229; 20130223237; 20130223275; 20130223447; 20130227055; 20130227114; 20130227336; 20130235799; 20130242929; 20130242956; 20130250754; 20130250795; 20130250808; 20130250809; 20130250811; 20130250866; 20130250945; 20130250953; 20130250969; 20130251053; 20130251054; 20130259096; 20130275513; 20130279365; 20130279540; 20130283347; 20130283360; 20130286892; 20130286942; 20130290560; 20130290843; 20130290985; 20130301405; 20130301584; 20130308495; 20130310896; 20130311661; 20130315077; 20130315078; 20130315102; 20130315131; 20130322294; 20130332010; 20130332011; 20130332025; 20130336199; 20130336289; 20130336316; 20130342355; 20140006411; 20140006893; 20140016643; 20140022906; 20140029432; 20140029445; 20140029470; 20140029603; 20140029610; 20140029624; 20140036722; 20140036727; 20140036908; 20140036912; 20140036925; 20140046882; 20140055284; 20140064172; 20140068105; 20140071826; 20140071837; 20140080492; 20140081793; 20140086041; 20140092752; 20140092753; 20140092769; 20140092905; 20140095864; 20140105015; 20140105027; 20140105033; 20140105211; 20140108643; 20140114549; 20140114554; 20140114555; 20140121476; 20140122673; 20140123227; 20140123278; 20140126348; 20140126354; 20140126419; 20140126423; 20140126426; 20140126431; 20140126610; 20140129734; 20140129876; 20140136881; 20140161015; 20140167912; 20140171021; 20140185499; 20140195668; 20140219078; 20140219103; 20140219114; 20140219133; 20140222725; 20140222726; 20140222727; 20140222728; 20140222729; 20140222730; 20140222731; 20140222748; 20140222975; 20140222983; 20140222996; 20140222997; 20140222998; 20140223155; 20140233426; 20140245055; 20140247726; 20140247752; 20140247804; 20140254433; 20140269402; 20140269413; 20140269487; 20140269514; 20140269592; 20140269759; 20140273920; 20140278475; 20140281670; 20140285090; 20140285095; 20140286301; 20140286377; 20140293605; 20140293787; 20140297206; 20140302773; 20140302774; 20140304427; 20140307614; 20140310243; 20140310349; 20140314096; 20140320021; 20140321325; 20140324596; 20140324833; 20140328346; 20140330947; 20140330985; 20140333990; 20140335952; 20140341227; 20140349684; 20140355425; 20140357295; 20140357312;

20140362847; 20140369550; 20140372577; 20140372585; 20140376361; 20140376407; 20140376427; 20140379896; 20140379900; 20150002336; 20150003251; 20150003292; 20150003293; 20150003428; 20150009829; 20150010153; 20150016688; 20150023174; 20150023186; 20150023205; 20150023363; 20150023369; 20150026268; 20150030033; 20150031400; 20150043384; 20150043519; 20150046696; 20150055650; 20150061511; 20150063365; 20150066650; 20150071295; 20150072728; 20150078182; 20150081840; 20150089081; 20150092529; 20150092538; 20150092560; 20150092661; 20150103813; 20150109962; 20150110104; 20150111591; 20150117221; 20150117305; 20150138977; 20150139034; 20150139231; 20150146603; 20150149469; 20150154239; 20150155637; 20150156199; 20150172953; 20150180772; 20150180800; 20150186642; 20150186775; 20150186799; 20150188754; 20150188801; 20150188934; 20150188935; 20150188949; 20150193693; 20150193694; 20150193695; 20150193696; 20150193697; 20150195126; 20150195136; 20150195144; 20150195145; 20150195146; 20150195149; 20150195171; 20150195184; 20150195185; 20150195192; 20150195212; 20150195216; 20150195296; 20150195692; 20150200713; 20150200714; 20150200738; 20150200810; 20150200846; 20150201415; 20150207677; 20150207724; 20150207916; 20150208316; 20150208318; 20150237130; 20150237556; 20150237559; 20150244481; 20150244484; 20150244623; 20150244648; 20150245179; 20150245203; 20150245231; 20150245412; 20150263863; 20150264626; 20150264627; 20150271080; 20150304209; 20150311948; 20150316926; 20150318891; 20150318892; 20150319076; 20150319077; 20150319084; 20150324582; 20150326450; 20150326598; 20150326609; 20150327260; 20150327261; 20150330869; 20150331652; 20150332165; 20150333997; 20150334031; 20150334123; 20150334209; 20150341140; 20150341874; 20150350018; 20150350245; 20150351084; 20150359020; 20150363981; 20150372903; 20150373700; 20150381489; 20150382275; 20150382278; 20160006573; 20160020864; 20160020967; 20160020979; 20160020987; 20160020988; 20160020997; 20160021006; 20160021009; 20160021011; 20160021013; 20160021014; 20160021017; 20160021018; 20160021126; 20160021596; 20160021647; 20160026542; 20160027054; 20160028609; 20160028750; 20160028751; 20160028752; 20160028753; 20160028754; 20160028755; 20160028762; 20160028763; 20160028764; 20160029182; 20160044035; 20160057116; 20160072699; 20160073271; 20160080030; 20160081102; 20160094398; 20160099770; 20160100316; 20160100417; 20160105356; 20160105523; 20160112929; 20160116819; 20160119739; 20160127257; 20160127942; 20160127978; 20160132397; 20160134161; 20160134468; 20160134514; 20160134516; 20160134539; 20160142248; 20160142901; 20160149805; 20160149856; 20160150501; 20160156450; 20160182121; 20160182170; 20160183351; 20160191487; 20160191488; 20160192274; 20160197800; 20160197831; 20160198244; 20160212729; 20160212740; 20160224951; 20160248661; 20160249254; 20160269275; 20160269976; 20160277201; 20160277874; 20160294493; 20160302195; 20160308793; 20160309392; 20160315848; 20160323012; 20160323113; 20160330107; 20160345236; 20160359592; 20160359677; 20160366553; 20160380776; 20170019970; 20170034041; 20170034760; 20170041246; 20170041822; 20170041868; 20170048783; 20170048853; 20170054644; 20170070942; 20170078170; 20170078400; 20170086279; 20170093687; 20170099226; 20170099567; 20170099684; 20170103213; 20170104727; 20170111271; 20170135021; 20170149639; 20170149651; 20170149882; 20170149901; 20170150418; 20170155566; 20170156118; 20170161609; 20170163527; 20170164263; 20170164264; 20170180262; 20170181053; 20170187661; 20170195826; 20170206512; 20170237669; 20170238197; 20170244838; 20170250856; 20170270898; 20170251246; 20170251387; 20170259942; 20170272144; 20170272315; 20170272978; 20170273003; 20170278198; 20170284839; 20170289225; 20170289812; 20170294988; 20170295081; 20170295455; 20170295609; 20170300693; 20170303187; 20170310553; 20170311423; 20170317713; 20170317906; 20170318453; 20170324618; 20170325127; 20170331899; 20170332439; 20170339099; 20170364409; 20170366456; 20170373775; 20180006833; 20180007687; 20180013573; 20180014241; 20180024091; 20180026891; 20180027473; 20180049043; 20180068358; 20180083862; 20180103094; 20180109492; 20180109495; 20180109496; 20180109533; 20180109551; 20180109954; 20180124812; 20180131455; 20180145841; 20180145876; 20180184269; WO 2012/078565, WO 2012/116489.

Two distinct types of ubiquitous wireless data communication networks have developed: cellular telephone networks having a maximum range of about 20-50 miles line of sight or 3 miles in hilly terrain, and short-range local-area computer networks (wireless local-area networks or WLANs) having a maximum range of about 0.2-0.5 miles (~1000-2500 feet IEEE-802.1 in, 2.4 GHz) outdoors line of sight. IEEE 802.11ah is a wireless networking protocol published in 2017 (Wi-Fi HaLow) as an amendment of the IEEE 802.11-2007 wireless networking standard. It uses 900 MHz license exempt bands to provide extended range Wi-Fi networks, compared to conventional Wi-Fi networks operating in the 2.4 GHz and 5 GHz bands. It also benefits from lower energy consumption, allowing the creation of large groups of stations or sensors that cooperate to share signals, supporting the concept of the Internet of Things (IoT). en.wikipedia.org/wiki/IEEE_802.11ah. A benefit of 802.11ah is extended range, making it useful for rural communications and offloading cell phone tower traffic. The other purpose of the protocol is to allow low rate 802.11 wireless stations to be used in the sub-gigahertz spectrum. The protocol is one of the IEEE 802.11 technologies which is the most different from the LAN model, especially concerning medium contention. A prominent aspect of 802.11ah is the behavior of stations that are grouped to minimize contention on the air media, use relay to extend their reach, employ predefined wake/doze periods, are still able to send data at high speed under some negotiated conditions and use sectored antennas. It uses the 802.11a/g specification that is down sampled to provide 26 channels, each of them able to provide 100 kbit/s throughput. It can cover a one-kilometer radius. It aims at providing connectivity to thousands of devices under an access point. The protocol supports machine to machine (M2M) markets, like smart metering.

The cellular infrastructure for wireless telephony involves long-distance communication between mobile phones and central base-stations, where the base stations are typically linked to cell sites, connecting to the public switched telephone network and the Internet. The radio band for these long-range wireless networks is typically a regulated, licensed band, and the network is managed to combine both broad bandwidth (~5-20 MHz) and many simultaneous users. This is contrasted with a short-range wireless computer network, which may link multiple users to a central router or hub, which router may itself have a wired connection to the Internet. A key example is WiFi, which is managed according to the IEEE-802.11x communications standards, with an aggregate data rate theoretically over 1 gigabit per second (802.11 ac) and a range that is typically much less than 100 m. Other known standard examples are known by the terms Bluetooth and ZigBee. The radio band for a WLAN is typically an unlicensed band, such as one of the ISM bands (industrial, scientific, and medical), or more recently, a whitespace band formerly occupied by terrestrial analog television (WSLAN). One implication of such an unlicensed band is the unpredictable presence of significant interference due to other classes of users, which tends to limit either the range, or the bandwidth, or both. For such local area networks, a short range (low power and high modulation rates) becomes advantageous for high rates of spatial band reuse and acceptable levels of interference.

A flooding-based protocol is disclosed in U.S. Provisional Patent Application No. 62/628,717, filed Feb. 9, 2018, expressly incorporated herein by reference in its entirety. See, Tanenbaum, Andrew S.; Wetherall, David J. (2010-03-23). Computer Networks (5th ed.). Pearson Education. p. 368-370. ISBN 978-0-13-212695-3.

Rahman, Ashikur; Olesinski, Wlodek; Gburzynski, Pawel (2004). "Controlled Flooding in Wireless Ad-hoc Networks" (PDF). International Workshop on Wireless Ad-Hoc Networks. Edmonton, Alberta, Canada: University of Alberta, Department of Computing Science. Archived (PDF) from the original on 2017-02-10. Retrieved 2015-10-15.

www.cs.cornell.edu/projects/quicksilver/ricochet.html

Thomas Zahn, Greg O'Shea and Antony Rowstron, "An Empirical Study of Flooding in Mesh Networks", Microsoft Research, Cambridge, UK, April 2009 Technical Report MSR-TR-2009-37

Iwata, C.-C. Chiang, G. Pei, M. Gerla, and T.-W. Chen. Scalable Routing Strategies for Ad Hoc Wireless Networks. In IEEE Journal on Selected Areas in Communications, Special Issue on Ad-Hoc Networks, pp. 1369-1379, August 1999.

Qayyum, L. Viennot, and A. Laouiti. Multipoint relaying: An efficient technique for flooding in mobile wireless networks. Technical Report 3898, INRIA Rapport de recherche, 2000.

Savvides, C. C. Han and M. B. Srivastava. Dynamic Fine-Grained Localization in Ad-Hoc Networks of Sensors. In Proceedings of MOBICOM'01, July 2001.

Das and V. Bharghavan. Routing in Ad hoc Networks using Minimum Connected Dominating Sets (MCDS), Proceedings of 1997 IEEE International Conference on Communications (ICC'97), 1997.

Brad Williams, Tracy Camp. Comparison of broadcasting techniques for mobile ad hoc networks. Proceedings of the third ACM international symposium on Mobile ad hoc networking & computing, June 2002

Ho, K. Obraczka, G. Tsudik, and K. Viswanath. Flooding for reliable multicast in multi-hop ad hoc networks. In Proceedings of the International Workshop on Discrete Algorithms and Methods for Mobile Computing and Communication (DIALM), pages 64-71, 1999.

C. E. Perkins and P. Bhagwat. Highly Dynamic Destination Sequenced Distance Vector Routing (DSDV) for mobile computers. In proceedings of ACM SIGCOMM, pp. 234-244, 1994.

C. E. Perkins. Ad hoc on-demand distance vector routing, Internet Draft, Internet Engineering Task Force, work in progress, December 1997.

C.-H. Toh. A novel distributed routing protocol to support ad-hoc mobile computing, Proceeding of 15th IEEE Annual International Phoenix Conference on Computer Communications, pp. 480-486, 1996.

C-C. Chiang, H. Wu, W. Liu and M. Gerla. Routing in Clustered, Multihop, Mobile Wireless Networks with Fading Channel, The IEEE International Conference on Networks, pages 197-211, Singapore, April 1997.

Niculescu and B. Nath. Ad Hoc Positioning System (APS) using AoA. INFOCOM'03, San Francisco, CA D. B. Johnson and D. A. Maltz. Dynamic Source Routing in mobile ad hoc networks, Mobile Computing, (Ed. T. Imielinski and H. Korth), Kluwer Academic Publishers, 1996.

Pagani and G. P. Rossi. Reliable broadcast in mobile multi-hop packet networks, Proceedings of the third annual ACM/IEEE International Conference on mobile computing and networking (MOBICOM'97), pp. 34-42, 1997.

Dommety and R. Jain. Potential networking applications of global positioning systems (GPS). Tech. Rep. TR-24, CS Dept., The Ohio State University, April 1996.

Lim and C. Kim. Multicast tree construction and flooding in wireless ad hoc networks. In Proceedings of the ACM International Workshop on Modeling, Analysis and Simulation of Wireless and Mobile Systems (MSWIM), 2000.

Haas, Halpern, Li. Gossip based Ad Hoc Routing. In IEEE INFOCOM, June 2002.

Chlamtac and O. Weinstein. The wave expansion approach to broadcasting in multi-hop radio networks. IEEE Trans. Commun., vol. 39, pp. 426-433, March 1991.

Gaber and Y. Mansour. Broadcast in radio networks. In Proc. 6th Annu. ACM-SIAM Symp. Discrete Algorithms, San Francisco, CA, January 1995, pp. 577-585.

Stojmenovic, M. Seddigh, and J. Zunic. Internal node based broadcasting in wireless networks. In Proceedings of the Hawaii International Conference on System Sciences (HICSS), 2001.

Jetcheva, Y. Hu, D. Maltz, and D. Johnson. A simple protocol for multicast and broadcast in mobile ad hoc networks. Internet Draft: draft-ietf-manet-simple-mbcast-01.txt, July 2001.

J. Li, C. Blake, D. S. J. De Couto, H. I. Lee, and R. Morris. Capacity of ad hoc wireless networks. In Proc. Seventh Annual ACM/IEEE International Conference on Mobile Computing and Networking (MobiCom), 2001.

J. Sucec and I. Marsic. An efficient distributed network-wide broadcast algorithm for mobile ad hoc networks. CAIP Technical Report 248—Rutgers University, September 2000.

J. Wu and H. Li. On calculating connected dominating sets for efficient routing in ad hoc wireless networks. In Proceedings of the International Workshop on Discrete Algorithms and methods for Mobile Computing and Communication (DIAL-M), pages 7-14, 1999.

J. P. Macker and M. S. Corson. Mobile Ad hoc networking and IETF Mobile computing and communication review, 2(1):9-14, January 1998.

Jie Wu and Fei Dai. Broadcasting in Ad Hoc Networks Based on Self-Pruning. In Proceedings of IEEE INFOCOM 2003, San Francisco, CA Kershner, R. The Number of Circles Covering a Set. Amer. J. Math. 61, 665-671, 1939.

Sanchez. Mobility models. www.disca.upv.es/misan/mobmodel.htm, 1998.

Sun and T. H. Lai. Location Aided Broadcast in Wireless Ad Hoc Network Systems. Proc. IEEE WCNC 2002, pp. 597-602, March 2002.

M. K. Denko and W. Goddard. Limited Flooding in Mobile Ad hoc Networks. In proceedings of the 14th MSc/PhD Annual Conference in Computer Science, Golden Gate, South Africa, pp. 21-24, June 1999.

M. K. Denko and W. Goddard. Routing Algorithms in Mobile Ad hoc Networks using Clustering Proceedings of 1998 MSc/PhD annual Conference, University of Stellenbosch, South Africa, pp. 6-18, July 1998.

M. K. Denko and W. Goddard: Clustering in Mobile Ad hoc Networks. In proceedings of the 5th International Conference in Communication systems (AFRICOM 2001), Cape Town, South Africa, May 2001.

M. M. Zonoozi and P. Dassanayake. User mobility modeling and characterisation of mobility patterns. IEEE Journal of Selected Areas in Communications, 15(7):1239-1252, September 1997.

M. S. Corson and A. Ephremides. A highly adaptive distributed routing algorithm for mobile wireless networks. ACM/Baltzer Wireless Networks Journal, 1(1):61-81, 1995.

Alon, A. Bar-Noy, N. Linial, and D. Peleg. A lower bound for radio broadcast. J. Comput. Syst. Sci., vol. 43, pp. 290-298, October 1991.

Lesser, R. Rom. Routing by controlled flooding in communication networks in proceeding of IEEE INFOCOM'90, (San Francisco, CA), pp. 910-917, June 1990.

Bahl and V. N. Padmanabhan. RADAR: An In-Building RF-Based User Location and Tracking System. In Proceedings of the IEEE INFOCOM'00.

Krishna, M. Chatterjee, N. H. Vaidya and D. K. Pradhan. A Cluster-based Approach for Routing in Ad hoc Networks. In proceedings of Second USENIX Symposium on mobile and Location Independent Computing, pp. 1-10, January 1996.

Bagrodia and R. A. Meyer. PARSEC User Manual, Release 1.0, UCLA Parallel Computing Laboratory, University of California, Los Angeles, February 1998.

Dube. Signal Stability based adaptive routing for Ad Hoc Mobile Networks. IEEE Personal Communications, pp. 36-45, February 1997.

Basagni, I. Chlamtac, V. R. Syrotiuk and B. A. Woodward. A Distance Routing Effect Algorithm for Mobility (DREAM), Proceedings of the fourth Annual mobile computing and networking, October 1998.

S. Guha and S. Khuller. Approximation algorithms for connected dominating sets. In Proceedings of European Symposium on Algorithms (ESA), 1996.

S. Murthy and J. J. Garcia-Luna-Aceves. An Efficient Routing Protocol for Wireless Networks. ACM Mobile Networks and Applications, Special Issue on Routing in Mobile Communication Networks, 1(1):183-197, October 1996.

S. Y. Ni et al. The Broadcast Storm Problem in a Mobile Ad Hoc Network. ACM MOBICOM, pp. 151-162, August 1999.

Camp, J. Boleng, and V. Davies. A Survey of Mobility Models for Ad Hoc Network Research. Wireless Communication & Mobile Computing (WCMC), vol. 2, no. 5, pp. 483-502, 2002.

T. S. Rappaport. Wireless Communications: Principles and Practices. Prentice Hall, October 1995.

Tian He, Chengdu Huang, B. M. Blum,John A. Stankovic, and Tarek F. Abdelzaher. Range-Free Localization Schemes in Large Scale Sensor Networks. Ninth Annual International Conference on Mobile Computing and Networking (MobiCom 2003), San Diego, CA, September 2003. To appear.

V. D. Park and M. S. Corson. A highly adaptive distributed routing algorithm for mobile wireless networks, Proceedings of 1997 IEEE Conference on Computer Communications (INFOCOM'97), April 1997.

Peng and X. Lu. AHBP: An efficient broadcast protocol for mobile ad hoc networks. Journal of Science and Technology—Beijing, China, 2002.

Peng and X. Lu. On the reduction of broadcast redundancy in mobile ad hoc networks. In Proceedings of MOBIHOC, 2000.

Azar, J. Naor, R. Rom. Routing Strategies in Fast Networks IEEE Transactions on Computers, 45(2):165-173, 1996.

Y-B.Ko, N. H. Vaidya. Location Aided Routing for mobile ad hoc networks Proceedings of the fourth Annual mobile computing and networking, October 1998.

Z. J. Haas and M. Pearlman. Zone Routing Protocol (ZRP) for ad hoc networks, Internet Draft, Internet Engineering Task Force, work in progress, December 1997.

people.cs.clemson.edu/-goddard/papers/limitedFlooding.pdf

Mesh wireless sensor networks: Choosing the appropriate technology, Industrial Embedded Systems—Jul. 21, 2009, industrial.embedded-computing.com/article-id/?4098=, describes mesh wireless sensor networks (WSN).

Vamsi K Paruchuria, Arjan Durresib, Raj Jain, "Optimized Flooding Protocol for Ad hoc Networks", ai2-s2-pdfs.s3.amazonaws.com/4871/fddb1defd8b202c8e4d3 103d691079996d4e.pdf.

SUMMARY OF THE INVENTION

In a wireless mesh network, it is often required to unicast a packet from a source of the packet to a specified destination, over multiple hops. An example application is for 1:1 private chatting (texting). Another use is for accessing a server or an Internet gateway to the wireless mesh network. While there have been a number of inventions and academic papers on this basic problem of routing (see supra), prior work, including works referenced above, utilize control packets to first discover routes, either proactively, or reactively (on-demand), or in a hybrid scheme. Control packets include "link-state advertisements/updates", "route request/response", etc. See, en.wikipedia.org/wiki/List_of_ad_hoc_routing_protocols.

The present technology provides a zero-control-packet mesh routing protocol, called VINE™. The lack of requirement for control packets means better scalability, longer battery life, and less vulnerability to control attacks.

The basic idea behind the VINE™ protocol is to use data packets themselves to build the routing state, referred to hereafter as gradient state (as the collection of node states forms a "gradient" toward the destination), which is then used for forwarding other data packets. Specifically, the gradient state indicates, for each destination, the number of hops to that destination via each of its neighbors. Every data packet contains information, such as its source and number of hops, sending neighbor, etc. A node receiving the packet uses that information to create a gradient state for those nodes. Packets are forwarded if there is gradient state for the destination that is fresh enough, and the gradient hops to the destination through some neighbor is less than or equal to the current node's hops to the destination. Thus, packets are forwarded along non-increasing gradients (like "water flowing downhill"), until the destination is reached. If there is no such gradient state, or if the time to live ("TTL") of the packet becomes zero, the packet is broadcast.

The present technology is particularly appropriate for a wireless mesh network in which the bandwidth is highly constrained, so that the use of routing control packets would be prohibitively expensive, according to the constraints of the network.

It is therefore an object to provide a mesh network communication protocol for communicating between respective mesh network nodes, comprising:
receiving a data packet from a current sender by a recipient, the data packet defining:
an identity of the current sender,
an identity of a prior sender from which the current sender received the data packet,
a hop count of hops previously traversed by the data packet,
an identity of the final destination,
an identity of a target recipient, and
a sequence identifier;
updating a forwarding table to:
mark the current sender as being reachable in one hop, and
the prior sender as being reachable in two hops via the current sender as next hop;
determining whether to rebroadcast by the recipient, if and only if the sequence identifier is not present in a list of prior sequence identifiers, the identity of the target recipient in the packet matches the identity of the recipient, and the identity of the final destination is not the recipient; and
selectively rebroadcasting the data packet by the recipient in dependence on said determining, modified by:
a replacement of the identity of the current sender with an identity of the recipient,
a replacement of the identity of the prior sender with the identity of the current sender,
a decrement of the time-to-live,
a replacement of the identity of the target recipient with an identity of a next hop from the forwarding table if present, and
an increment of the hop count,
wherein the data packet is not forwarded if the time-to-live is zero.

The data packet received from the current sender preferably comprises a data payload.

The protocol may further comprise updating the forwarding table to mark the originator of the data packet as being reachable in one plus the hop count, via the current sender as the next hop.

The data packet received from the current sender may further define a time-to-live. The forwarding table may also include a timestamp which defines a time of reception of a data packet, which permits determining an age of the information in the forwarding table. A time at which the data packet was received from the current sender may be stored in the forwarding table as a timestamp. The selectively rebroadcasting may be further dependent on an elapsed time with respect to the timestamp.

The protocol may further comprise decrementing the time-to-live stored in the forwarding table. The protocol may selectively rebroadcast further dependent on whether the decremented time-to-live stored in the forwarding table has expired.

The selective rebroadcasting may be further dependent on whether an entry for the final destination is present in the forwarding table.

It is another object to provide a mesh network communication protocol for communicating between respective mesh network nodes, comprising: receiving a data packet from a current sender by a recipient, the data packet defining: an identity of the current sender, an identity of a prior sender from which the current sender received the data packet, a hop count of hops previously traversed by the data packet, an identity of a target recipient, an identity of a final destination, and a sequence identifier; updating a forwarding table to mark the current sender as being reachable in one hop, and the prior sender as being reachable in two hops via the current sender as next hop; determining whether to rebroadcast by the recipient, if and only if the sequence identifier is not present in a list of prior sequence identifiers, the identity of the target recipient matches an identity of the recipient, and the identity of the final destination is not the identity of the recipient; and selectively rebroadcasting the data packet by the recipient in dependence on said determining, modified by: a replacement of the identity of the current sender with the identity of the recipient, a replacement of the identity of the prior sender with the identity of the current sender, a replacement of the identity of the target recipient with an identity of a next hop from the forwarding table if present, and an increment of the hop count. The data packet received from the current sender may further comprise a data payload.

It is also an object to provide a method of operating a node of a mesh network, comprising: receiving a data packet, the data packet defining: an identity of a current sender, an identity of a prior sender from which the current sender received the data packet, a hop count of hops previously traversed by the data packet, an identity of a target recipient, an identity of a final destination, and a sequence identifier; updating a forwarding table to mark the current sender as being reachable in one hop, and the prior sender as being reachable in two hops via the current sender as next hop; determining whether to rebroadcast data contained in the data packet, if and only if: the sequence identifier is not present in a list of prior sequence identifiers, the identity of the target recipient matches a node identifier, and the identity of the final destination is not the node identifier; and selectively rebroadcasting the data of the data packet in dependence on said determining, having a packet header modified from a packet header of the data packet by: a replacement of the identity of the current sender with the node identifier, a replacement of the identity of the prior sender with the identity of the current sender, a replacement of the identity of the target recipient with an identity of a next hop from the forwarding table if present, and an increment of the hop count.

It is further an object to provide a method of operating a node of a mesh network, comprising: receiving a data packet, the data packet defining: an identity of a current sender, an identity of a prior sender from which the current sender received the data packet, an identity of a target recipient, and a sequence identifier; updating a forwarding table to mark the current sender as being reachable in one hop, and the prior sender as being reachable in two hops via the current sender as next hop; determining whether to rebroadcast data contained in the data packet, based on at least whether: the sequence identifier is not present in a list of prior sequence identifiers, and the identity of the target recipient matches a node identifier; and selectively rebroadcasting a modified data packet in dependence on said determining, modified by: a replacement of the identity of the current sender with the node identifier, a replacement of the identity of the prior sender with the identity of the current sender, and a replacement of the identity of the target recipient with an identity of a next hop from the forwarding table if present. The data packet may further define a hop count of hops previously traversed by the data packet; and an identity of the final destination. The determining may comprise determining whether to rebroadcast data contained in the data packet, if and only if: the sequence identifier is not present in a list of prior sequence identifiers, the identity of the target recipient matches a node identifier, and the identity of the final destination is not the node identifier. The selectively rebroadcasting may comprise selectively rebroadcasting the data of the packet data having the packet header further modified from the packet header of the data packet by an increment of the hop count.

The protocol may further comprise updating the forwarding table to mark the originator of the data packet as being reachable in one plus the hop count, via the current sender as the next hop. The timestamp at which the data packet was received from the current sender may be stored in the forwarding table. The selectively rebroadcasting may be further dependent on whether the timestamp stored in the forwarding table has expired with respect to a clock. The selectively rebroadcasting may be further dependent on whether the next hop is present in the forwarding table. The data packet may contain a time-to-live that is decremented by the recipient.

The protocol may further comprise, in conjunction with rebroadcasting, if the time-to-live after decrementing is at least one, setting a timer for acknowledgement, and monitoring subsequent receipt of an overheard data packet having the sequence identifier, and if the overheard packet having the sequence identifier is not received before expiry of the timer, rebroadcasting the modified data packet. Alternately, the protocol may further comprise, in conjunction with rebroadcasting, if the time-to-live after decrementing is at least one, setting a timer for acknowledgement, and monitoring subsequent receipt of an overheard data packet having the sequence identifier, and if the overheard packet having the sequence identifier is not received before expiry of the timer, selectively rebroadcasting the data packet by the recipient in dependence on said determining, modified by: a replacement of the identity of the current sender with the identity of the recipient, a replacement of the identity of the prior sender with the identity of the current sender, a replacement of the identity of the target recipient with an identity of an alternate next hop from the forwarding table if present, and an increment of the hop count.

It is a still further object to provide a mesh network communication node, configured for communication with other mesh network nodes, comprising: a memory configured to store an identifier of the mesh network communication node and a forwarding table; a radio frequency transceiver configured to receive a data packet from a current sender, the data packet defining: an identity of the current sender, an identity of a prior sender from which the current sender received the data packet, an identity of a final destination for the data packet, a hop count of hops previously traversed by the data packet, an identity of a target recipient, and a sequence identifier; at least one processor configured to: update the forwarding table to mark the current sender as being reachable in one hop, and the prior sender as being reachable in two hops via the current sender as next hop; determine whether to rebroadcast the data packet, if and only if the sequence identifier is not present in a list of prior sequence identifiers and the identity of the final destination is not the identifier of the mesh network communication node; modify the data packet by: a replacement of the identity of the current sender with the identity of the mesh network communication node, a replacement of the identity of the prior sender with the identity of the current sender, a replacement of the identity of the target recipient with an identity of a next hop from the forwarding table if present, and an increment of the hop count; and selectively control a rebroadcast of the modified data packet through the radio frequency transceiver, in dependence on the determination. The data packet received from the current sender further may comprise a data payload.

The at least one processor may be further configured to update the forwarding table to mark the originator of the data packet as being reachable in one plus the hop count, via the current sender as the next hop; and/or to store a timestamp representing a time that the data packet is received in the forwarding table; and/or determine expiry of the stored timestamp with respect to a clock.

The selectively control of the rebroadcast may be further dependent on whether the next hop is present in the forwarding table.

The data packet contains a time-to-live, and the at least one processor is further configured to decrement the time-to-live. The at least one processor may be further configured to selectively control a rebroadcast of the modified data packet through the radio frequency transceiver further in dependence on whether the time-to-live has reached zero. The at least one processor may be further configured to, in conjunction with selectively controlling the rebroadcasting, if the time-to-live after decrementing is at least one, setting a timer for acknowledgement, and monitoring subsequent receipt of an overheard data packet having the sequence identifier, and if the overheard packet having the sequence identifier is not received before expiry of the timer, selectively control the rebroadcast of the modified data packet. The at least one processor may be further configured to, in conjunction with selectively controlling the rebroadcasting, if the time-to-live after decrementing is at least one, setting a timer for acknowledgement, and monitoring subsequent receipt of an overheard data packet having the sequence identifier, and if the overheard packet having the sequence identifier is not received before expiry of the timer, selectively control the rebroadcast of a data packet modified by: a replacement of the identity of the current sender with an identity of the mesh network communication node, a replacement of the identity of the prior sender with the identity of the current sender, a replacement of the identity of the target recipient with an identity of an alternate next hop from the forwarding table if present, and an increment of the hop count.

The data packet received from the current sender may further define a time-to-live, and the at least one processor is further configured to decrement the time-to-live, and to rebroadcast the data packet if and only if the time-to-live is not zero. A timestamp representing a time of a receipt of a data packet may be stored in the forwarding table to permit determination of age of forwarding table entries. The selective control of the rebroadcast may be further dependent on whether an entry for the final destination is present in the forwarding table. If the final destination is not present in the forwarding table, i.e., a route to the final destination is unknown to the recipient, the recipient may broadcast the data packet, subject to the time-to-live limit and rebroadcast prohibition.

It is a still further object to provide a computer readable memory storing non-transitory instructions for controlling a programmable processor to implement a mesh network communication protocol for communicating between respective mesh network nodes, comprising: instructions for receiving a data packet from a current sender by a recipient, the data packet defining: an identity of the current sender, an identity of a prior sender from which the current sender received the data packet, a hop count of hops previously traversed by the data packet, an identity of a target recipient, an identity of a final destination, and a sequence identifier;

instructions for updating a forwarding table to mark the current sender as being reachable in one hop, and the prior sender as being reachable in two hops via the current sender as next hop; instructions for determining whether to rebroadcast by the recipient, if and only if the sequence identifier is not present in a list of prior sequence identifiers and the identity of the final destination is not an identity of the recipient; and instructions for selectively rebroadcasting the data packet by the recipient in dependence on said determining, modified by: a replacement of the identity of the current sender with the identity of the recipient, a replacement of the identity of the prior sender with the identity of the current sender, a replacement of the identity of the target recipient with an identity of a next hop from the forwarding table if present, and an increment of the hop count. The data packet received from the current sender further may comprises a data payload.

The computer readable memory may further comprise instructions for updating the forwarding table to mark the originator of the data packet as being reachable in one plus the hop count, via the current sender as the next hop; and/or instructions for selectively rebroadcasting is further dependent on whether the timestamp has expired with respect to a clock.

A time of receipt of the data from the current sender may define a timestamp, further comprising instructions for storing the timestamp in the forwarding table. The selectively rebroadcasting may be further dependent on whether a predetermined time has elapsed with respect to the timestamp.

The instructions for rebroadcasting may comprise instructions for contingent execution dependent on whether the next hop is present in the forwarding table.

The data packet may contain a time-to-live, further comprising instructions for decrementing the time-to-live by the recipient. Further instructions may be provided for, in conjunction with rebroadcasting, if the time-to-live after decrementing is at least one, setting a timer for acknowledgement, and monitoring subsequent receipt of an overheard data packet having the sequence identifier, and if the overheard packet having the sequence identifier is not received before expiry of the timer, rebroadcasting the modified data packet. Further instructions may be provided for, in conjunction with rebroadcasting, if the time-to-live after decrementing is at least one, setting a timer for acknowledgement, and monitoring subsequent receipt of an overheard data packet having the sequence identifier, and if the overheard packet having the sequence identifier is not received before expiry of the timer, selectively rebroadcasting the data packet by the recipient in dependence on said determining, modified by: a replacement of the identity of the current sender with the identity of the recipient, a replacement of the identity of the prior sender with the identity of the current sender, a replacement of the identity of the target recipient with an identity of an alternate next hop from the forwarding table if present, and an increment of the hop count.

DETAILED DESCRIPTION OF THE PREFERRED EMBODIMENTS

Figure 1:
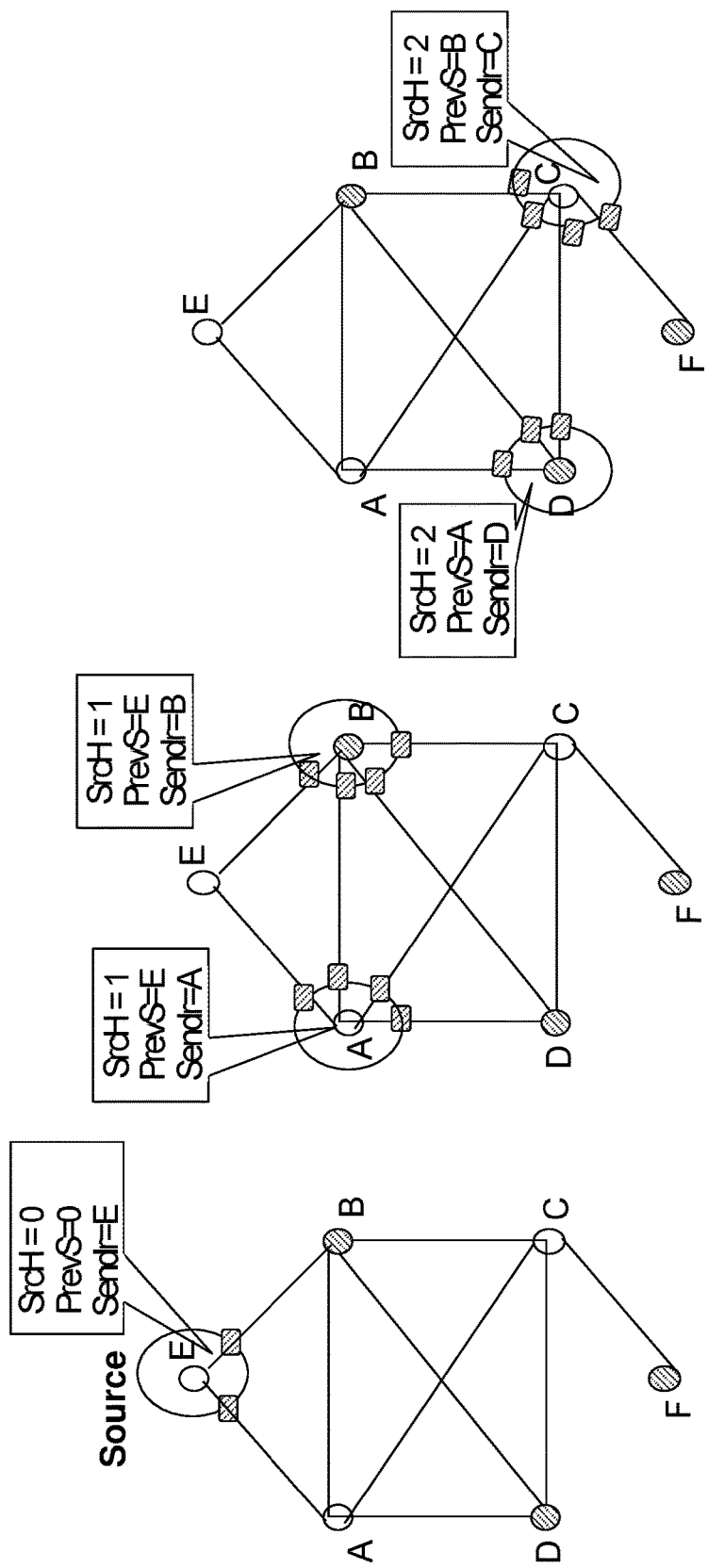
FIGS. 1A-1C show a series of network state diagrams and corresponding state tables.

The VINE™ protocol supports the delivery of a private packet to the destination specified in the packet header.

VINE™ Overview

The basic idea behind the VINE™ protocol is to use data packets themselves to build the routing state (or information), referred to hereafter as gradient state (as the collection of node states forms a "gradient" toward the destination) which is then used for forwarding other data packets. Specifically, the gradient state indicates, for each destination, the best information available about the destination; e.g., the number of hops to that destination via each of its neighbors.

Every data packet contains information, such as its source, the number of hops travelled from the source, sending neighbor, previous sender, etc., using which a node receiving the packet creates gradient state for those nodes. Only data packets are used to create gradient state, and there is no requirement for generation of explicit control packets. The gradient state contains a timestamp that indicates how fresh the information is. State that is older than a configured period is purged.

As is known, it is also possible to include control packets of various types to supplement or enhance the VINE™ protocol, and there is no reason that VINE™ could not or should not exploit routing information gained through alternate means. However, according to the various aspects of the VINE™ protocol, no explicit control packets are required, and each phase of operation can proceed without generation of any such packets.

The gradient state is used to decide, possibly in a distributed manner, whether one or more relay nodes are required, and if so, that set of relay nodes, for the packet. When there is no gradient state for a destination, a packet is relayed by all neighbors. Over time, as traffic flows, an increasingly richer sink tree toward each node is created, abstractly resembling the growth of a "vine" in a grove.

Packets are forwarded if there is gradient state for the destination that is fresh enough (according to a freshness metric, which may be static, dynamically determined, adaptive, geographically dependent, mobility or reliability dependent, etc.), and the gradient hops to the destination through some neighbor is less than or equal to the current node's hops to the destination. Thus, packets are forwarded along non-increasing gradients (like "water flowing downhill"), until the destination is reached.

If there is no such gradient state, the packet is broadcast. With broadcast, there is no specific target neighbor (alternatively, all neighbors are intended receivers). Each receiving neighbor processes the packet as mentioned above.

A packet is never sent back to the neighbor it came from. Every packet contains a sequence number, which is used to ensure that the sequence of broadcasts terminates.

While the lack of control packets means that many packets are flooded, VINE™ engenders a natural balance—packets are only flooded when there is no state, and when there is little state there is generally little data traffic (otherwise there would have been more state) and therefore flooding tends to be affordable; on the other hand, as data traffic increases, the number of nodes with gradient state increases and packets are routed without flooding. Indeed, under such circumstances, if control packets were used, they would need to be flooded as well.

Thus, initially, and after a period of inactivity, the first packet from any node is flooded. Subsequent packets progressively utilize the gradient state set up by previous packets, which increases with the diversity of source-destination pairs in the traffic. Each node independently decides whether to broadcast the packet, that is, have all of its neighbors relay or not.

A packet may alternate between "flooding" and "routing". For example, communication of a packet may start by finding gradient state, and then being forwarded to a neighbor and so on, until it arrives at a node without a gradient state, at which point it may be broadcast. Conversely, a packet may find no gradient state and start being "flooded", and then encounter a node with a gradient state and follow the state "downhill" to the destination. Multiple nodes that have received the broadcast may do this.

The gradient state expires, e.g., after a configured period, and therefore packets that were routed at some point in time may not be at a later point.

The VINE™ method for forwarding packets is referred to as Sender Controlled Relaying (SCR), to emphasize the fact that it is the sender that chooses the next-hop relayer. In SCR, the sender of a packet specifies in the network layer (NL) header the target node that should relay, if applicable.

The Gradient Establishment module is described in detail below, followed by a description of SCR.

TABLE 1

VINE ™ Routing Header

| Field Number | Name | Length {bits} | Type/ Range | Description |
|---|---|---|---|---|
| 1 | Version | 2 | uint 0-15 | The version number of the network layer protocol |
| 2 | Flood mode | 4 | uint 0-15 | Used by Echo to distinguish between full and pruned flood, with override (see remarks) |
| 3 | Sender | 16 | Hash | The (compressed) identifier of the node that transmitted this packet (most previous hop) |
| 4 | Previous sender | 16 | Hash | The (compressed) identifier of the node that the sender (see field number 3) received the packet from |
| 5 | Target receiver | 16 | Hash | The (compressed) identifier of the node for which this packet is intended, or 0xFFF (which means intended for anyone who receives it) |
| 6 | Sender cost to destination | 8 | uint 0-255 | The estimated "cost" by the sender to the destination (the id of the destination is present in the application or transport header) |
| 7 | Sender cost from source | 8 | uint 0-255 | The accumulated "cost" along the path travelled by the packet from the source to the current node |
| 8 | Time to live | 8 | uint 0-255 | The number of hops that the packet is allowed to travel from this node onwards. TTL decremented by every transit node and packet dropped if TTL = 0 |

Gradient Establishment

Every data packet that is received by the node, whether or not it is a duplicate, is passed to the Gradient Establishment (GE) module for processing. (Note that freshness if packets is material, and therefore identical packets received at different times convey some useful distinct information). The GE module maintains the following data structure for every known destination:

Destination. The compressed destination identifier.

Neighbor. The compressed identifier of the (neighbor) node for which this entry is applicable.

Cost. The cost (e.g., hops) of sending a packet to the destination through this neighbor.

Timestamp. When this entry was created.

This information provides information to define "As of timestamp I can get to destination via neighbor subject to cost".

The cost semantics are similar to that in the header. In a preferred embodiment, the number of hops may be used as the cost, and in the discussion below, "hops" and "cost" are used interchangeably. The timestamp is used to age out entries that were created more than a configured time prior.

It is understood, however, that any useful cost function may be used to control the gradient. For example, in a power-constrained, variable power transmit system, the power required to reach a destination may be used as the cost. In other embodiments, an economic system is implemented, so that the cost represents actual or virtual currency units. See, U.S. Patent and Pub. Pat. Application Nos. 20180068358; 20180049043; 20180014241; 20170302663; 20170206512; 20160277469; 20160224951; 20150264627; 20150264626; 20150188949; 20150111591; 20130080307; 20120253974; 20110004513; 20100317420; 20100235285; 20080262893; 20070087756; 20060167784; 20030163729; U.S. Pat. Nos. 10,015,720; 9,818,136; 9,794,797; 9,756,549; 9,615,264; 9,311,670; 9,226,182; 8,874,477; 8,774,192; 8,600,830; 8,144,619; and 7,590,589. In still further systems, congestion, communication reliability, communication latency, interference with other communications, security, privacy or other factors may be key, or a part of, the cost function.

A list of entries may be maintained, that is sorted based on the cost. For a given destination and neighbor pair, only one entry is preferably maintained, namely the lowest cost entry. Of course, sorting and filtering the list is not required, and therefore a node may maintain additional information beyond that minimally required.

There is potentially a Gradient State Entry (GSE) for every combination of neighbor and destination. However, in order to limit firmware memory consumption, only a configured maximum number of entries per destination are maintained. Based on simulations, maintaining three entries is sufficient in most cases.

Upon receiving a packet, the GE module inspects the NL header and creates the following entries as long as they are not duplicates, and as long as the entry is not superseded by an existing entry on account of the cost (note that only the least cost entry is maintained for each neighbor). The fields below are from the NL header, except "Now", which refers to the current time at the node.

An entry (sender, sender, 1, Now), that reflects that the sender is 1 hop away via the sender (directly reachable).

An entry (previous-sender, sender, 2, Now), that reflects that the previous sender is 2 hops away via the sender of the packet, provided the previousSender is not NULL (this is the case if the packet originated at the sender).

An entry (source, sender, senderHopsFromSource+1, Now), that reflects that the source is one hop more than the hops from the sender to the source that is conveyed in the header. This entry is made unless the source is either the sender or the previous-sender (because this would duplicate

1 or #2), or the previous-sender is the current node itself (this is because the cost is bound to be higher).

When a packet is flooded through the network, as is the case when there is no state or expired state, a node typically learns the state for all of its 1-hop and 2-hop neighbors. For some operational contexts, this may represent a large fraction of total nodes. Further, for every packet from a distant source, we have state that allows routing along a path to the source.

An example of Gradient Establishment during a Full Flood is illustrated in FIGS. 1A-1C, which shows that a packet is sourced at E, intended for F. Initially there is no state at any node, so the packet is essentially flooded (see below). The relevant header fields senderCostFromSrc (srcH), previous-sender (prevS) and sender (Sendr) are shown corresponding to the transmission. The source field is always E and not shown.

During this flood, the state is created as illustrated by the tables beneath each of FIGS. 1A, 1B and 1C, shows the state created after the transmission of the respective packets per the respective network diagram. Only the state corresponding to nodes B, D and F are shown. For each of these, the hops to the destination is updated based on the received packet.

Each entry in the table shows the number of hops at that node (column) to the destination (row) along with the neighbor through which the specified hops is achievable. Thus, for example, the entry in the last table for F (column), for destination E (row) is 3-C. This means that F infers that it can reach E in 3 hops via node C. The entries are updated according to the algorithm (steps 1-3) above.

Sender Controlled Relaying (SCR)

The SCR module coordinates with peer SCR modules and local GE modules to deliver packets of type private or end-to-end ack to their end destinations. SCR uses the gradient state set up by the GE module to retrieve the "best" next-hop relay neighbor and have the packet be relayed by that neighbor. When there is no state, all nodes relay. SCR uses "eavesdropping", or Implicit Acknowledgements (IA). After transmitting, a node checks, for any packet it expects to be relayed by a specific neighbor, if it was relayed by that neighbor within a timeout period, and if not, retransmits the packet a specified number of times.

The SCR module may receive the packet from the Transport Layer (TL) if the packet was originated at this node, or from the MAC layer if the packet was originated at a different node. In the description below, C denotes the current node.

Upon receiving a packet of type private or E2E Ack from the TL, the SCR module appends an NL header with the version field to current version, sender as C, previousSender as NULL, senderHopsFromSource as 0, and TTL as the configured maximum hops a packet is allowed to travel. The targetReceiver field is set. The isFullFlood and senderHopsToDestination are unused in SCR. It then sends the packet to the MAC Layer and sets an Implicit Acknowledgment (IA) timer.

Upon receiving a packet of type private or E2E Ack from the MAC Layer (ML), the SCR module first processes the packet for IA. It then checks if the destination of the packet is C. If so, it delivers the packet to the TL and terminates processing this packet. Otherwise, it checks if the targetReceiver field is C which implies that this node was chosen for relaying.

If so, then it proceeds to re-transmit the packet provided the TTL is at least 1 and the packet has not been transmitted previously. As in ECHO (see, U.S. Patent Application 62/628,717, filed Feb. 9, 2018, expressly incorporated herein by reference in its entirety), the seqNum field can be used to determine whether the packet was previously received and re-transmitted. The SCR module modifies the NL header setting the sender as C, copies the sender field from the header into the previousSender field, updates the senderCostFromSource (as discussed above, in this embodiment, cost=hops, so it increments the field), and decrements the TTL. Finally, it sets the targetReceiver field. It then sends the packet to the MAC Layer and sets an IA timer.

Figure 2:
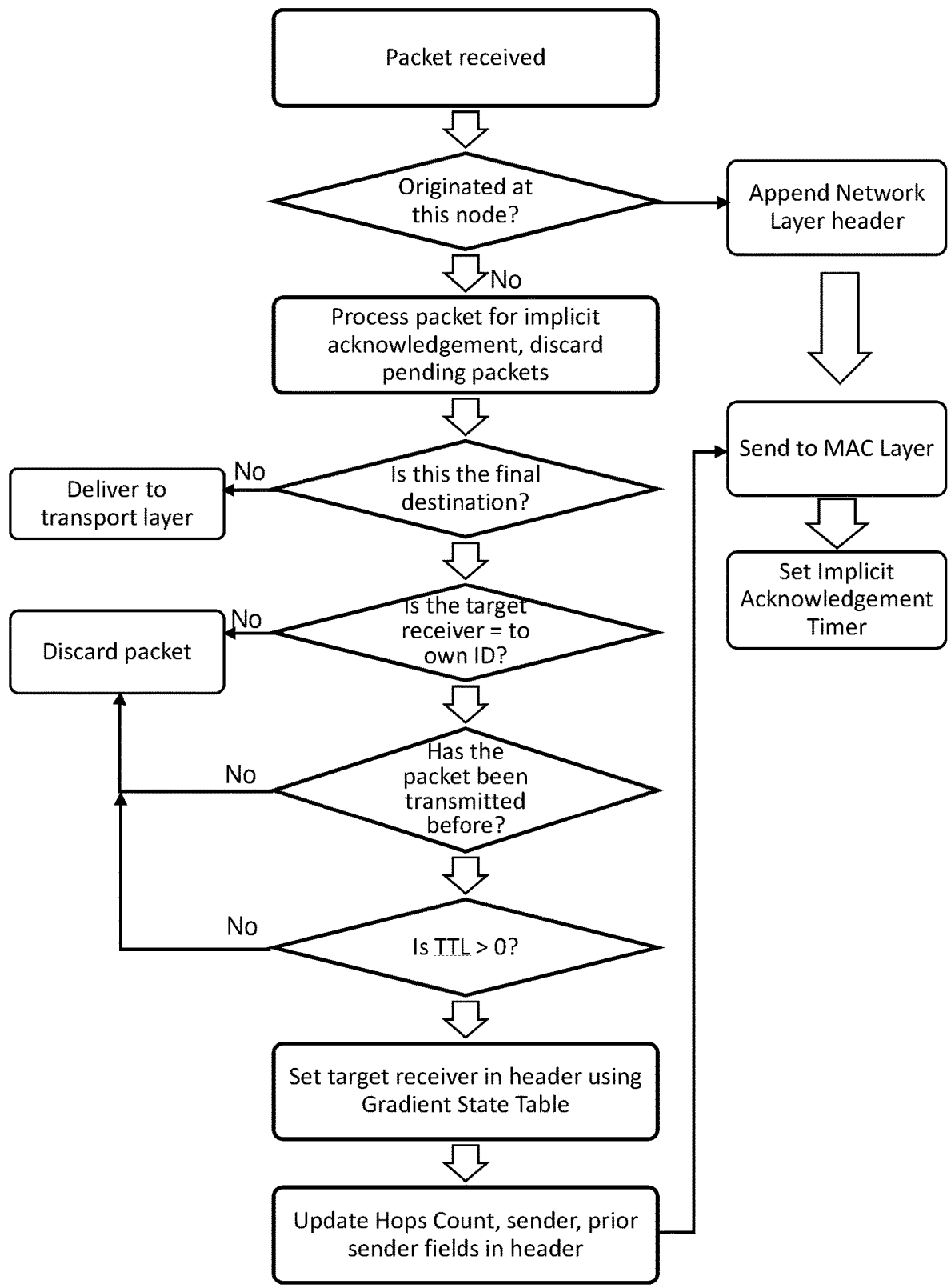
FIG. 2 shows a flow diagram of a Sender Controlled Relaying (SCR) process.

FIG. 2 shows a flow chart for the initial packet sending in SCR (not retransmission).

Choosing a Target Receiver

There are many heuristics possible for choosing the target receiver. According to a preferred embodiment, the target receiver is chosen as follows. Let the destination ID be D. For each destination, we maintain a few Gradient State Entries (GSEs) per neighbor. The neighbor is picked such that the cost field is the lowest among all entries for the destination, with ties broken randomly, provided the timestamp field of the entry is not less than the current time minus a configured parameter GSE_EXPIRY_PERIOD.

In case of retransmissions, SCR attempts to choose the target neighbor that is different from those for previous retransmissions, if one exists, provided that target neighbor has the same or less cost to the destination. If such a fresh target neighbor is not available, previously chosen target neighbor is returned. Note that in some implementations, a failed transmission is an indicator of higher cost, and therefore the cost for use of that same path increased for future use. Thus, the cost may be used to provide implicit control over communication route preferences, and need not be based solely on hop count or objective or unbiased criteria.

If there is no entry for D, or if the entry is not fresh enough, SCR transmits the packet with the targetReceiver field set to NULL, indicating that any node that receives the packet should forward it provided it hasn't already done so.

Implicit Acknowledgements and Retransmission

SCR uses overheard packets from the target receiver as an implicit acknowledgement of delivery. After transmitting a packet that has a non-NULL target receiver, SCR sets an IA-Timer for the packet and stores the packet for retransmission, unless the target receiver is the final destination in which case no timer is set.

All received packets from the target receiver are processed to check if the packet identifier matches that of a stored packet. If so, the packet is deleted from the store, and the IA-timer is cancelled. Further, if an End-to-End Acknowledgement for the data packet is received, then the IA-timer is cancelled as well, since this implies that the data packet has been delivered. The network layer (NL) may process/inspect a Transport Layer (TL) header to accomplish this. This cross-layer inspection may violate layer distinctions, however, it helps improve performance, and such layer boundaries are heuristics and not prohibitions.

If no IA is obtained, then the IA-timer will trigger an interrupt, upon which the packet is retransmitted as long as the total number of retransmissions of the packet does not exceed a configured parameter SCR_MAX_XMTS. The Gradient State Table is consulted afresh to update the targetReceiver field so that any most up to date gradient information can be utilized.

If the number of transmissions has exceeded SCR_MAX_XMTS, then a flood is initiated on the packet. Specifically, the packet is sent with the targetReceiver field set to NULL, indicating that any node that receives the packet should forward it provided it hasn't already done so.

Therefore, by implicitly monitoring headers of packets that include constructive data communication payloads, a reactive routing protocol can reliably operate without requiring communication of any explicit control packets.

In some cases, out of band communications may be used to populate a routing table. For example, in a MANET employing nodes that have unreliable or interrupted cellular connectivity (or another type of communication network) and an alternate physical layer communication link, the routing information for the alternate physical layer communication link may be distributed to other nodes, and received from other nodes, when the cellular connectivity is available, so that when this connectivity becomes unavailable, reasonably fresh network state information is available without flooding of the alternate physical layer communication link.

Figure 3:
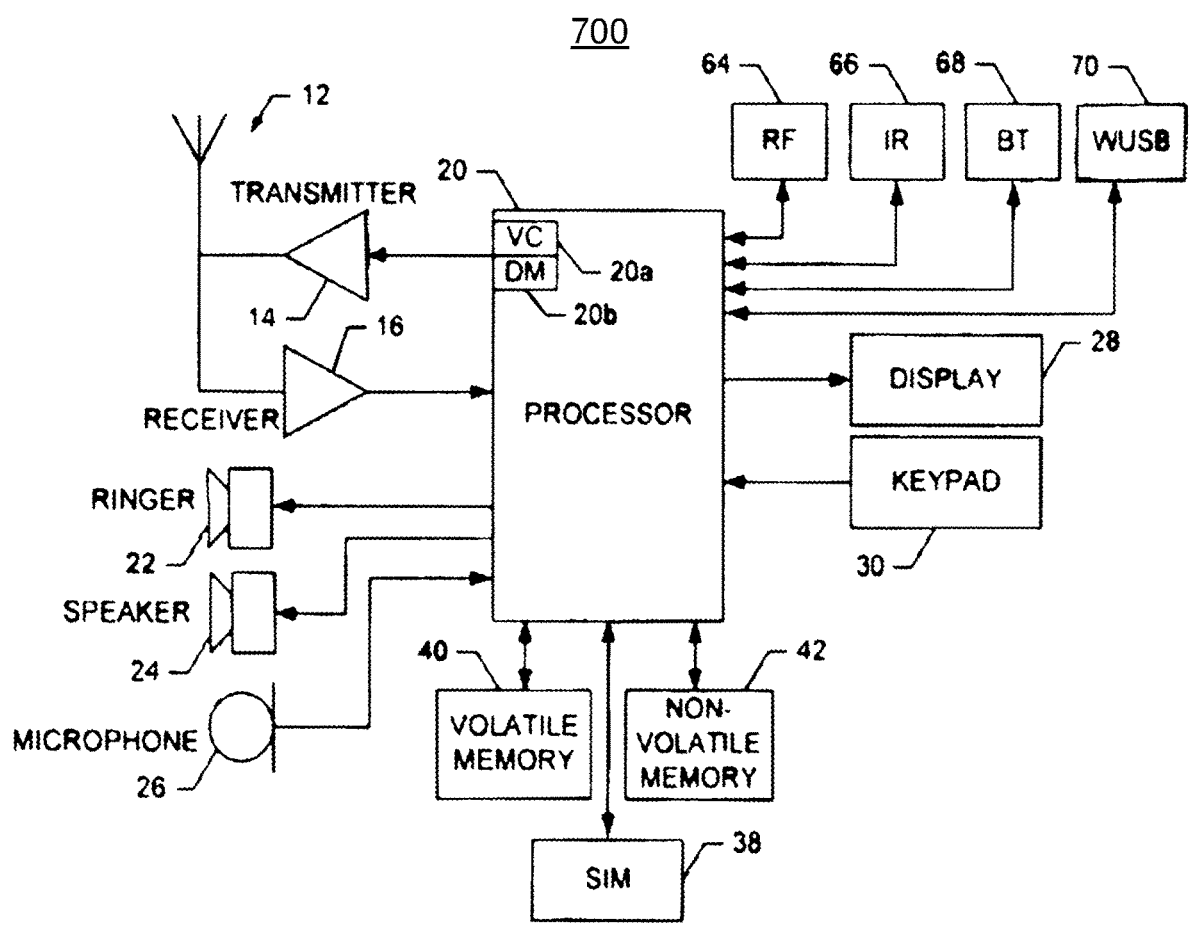
FIG. 3 shows an exemplary hardware Architecture.

FIG. 3 depicts an example of an apparatus 700, in accordance with some example embodiments. This is similar to FIG. 7 of U.S. 20170332439. The apparatus 700 may comprise a node. Moreover, the nodes may comprise a user equipment, such as an internet of things device (for example, a machine, a sensor, an actuator, and/or the like), a smart phone, a cell phone, a wearable radio device (for example, an Internet of things [IoT] fitness sensor or other type of IoT device), and/or any other radio-based device.

In some example embodiments, apparatus 700 may also include a radio communication link to a cellular network, or other wireless network. The apparatus 700 may include at least one antenna 12 in communication with a transmitter 14 and a receiver 16. Alternatively transmit and receive antennas may be separate.

The apparatus 700 may also include a processor 20 configured to provide signals to and from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 700 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Apparatus 700 may include a location processor and/or an interface to obtain location information, such as positioning and/or navigation information. Accordingly, although illustrated in as a single processor, in some example embodiments the processor 20 may comprise a plurality of processors or processing cores.

Signals sent and received by the processor 20 may include signaling information in accordance with a mesh network protocol, as discussed above, may employ number of different wireline or wireless networking techniques.

The apparatus 700 may also be capable of operating with one or more air interface standards, communication protocols, modulation types, access types, and/or the like, though these may require separate radios and/or a software defined radio implementation to permit these alternate uses. The preferred implementation is a 900 MHz radio operating in the 928 MHz ISM band, and complying with F.C.C. regulations for unlicensed use. The data carrier over the radio may include TCP/IP packets, UDP packets, or other standard higher-level protocols.

It is understood that the processor 20 may include circuitry for implementing audio/video and logic functions of apparatus 700. For example, the processor 20 may comprise a digital signal processor device, a microprocessor device, an analog-to-digital converter, a digital-to-analog converter, and/or the like. Control and signal processing functions of the apparatus 700 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 700 to perform actions. For example, processor 20 may be capable of operating a connectivity program, such as, a web browser. The connectivity program may allow the apparatus 700 to transmit and receive web content, such as location-based content, according to a protocol, such as, wireless application protocol, wireless access point, hypertext transfer protocol, HTTP, and/or the like.

Apparatus 700 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 700 may include a battery for powering various circuits related to the mobile terminal, for example, a circuit to provide mechanical vibration as a detectable output. The user input interface may comprise devices allowing the apparatus 700 to receive data, such as, a keypad 30 (which can be a virtual keyboard presented on display 28 or an externally coupled keyboard) and/or other input devices. Preferably, the device is a low data rate, non-real time communication device, i.e., unsuitable for real-time voice communications, but this is not a limitation of the technology per se.

The apparatus 700 preferably also includes a short-range radio frequency (RF) transceiver and/or interrogator 64, so data may be shared with and/or obtained from electronic devices in accordance with RF techniques. The apparatus 700 may include other short-range transceivers, such as an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, Bluetooth Low-Energy, and other radio standards, such as Bluetooth 4.0. In this regard, the apparatus 700 and, in particular, the short-range transceiver may be capable of transmitting data to and/or receiving data from electronic devices within a proximity of the apparatus, such as within 100 meters. The apparatus 700 including the Wi-Fi (e.g., IEEE-802.11ac, ad, ax, af, ah, az, ba, a, b, g, i, n, s, 2012, 2016, etc.) or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 700 may comprise memory, such as, a subscriber identity module (SIM) 38 (for use in conjunction with a cellular network), a removable user identity module (R-UIM), and/or the like, which may store information elements related to a mobile subscriber. In addition to the SIM, the apparatus 700 may include other removable and/or fixed memory. The apparatus 700 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, solid state drive, magnetic storage devices, optical disc drives, ferroelectric RAM, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the nodes disclosed herein. The memories may comprise an identifier, such as an international mobile equipment identification (IMEI) code, capable of uniquely identifying apparatus 700. The functions may include one or more of the operations disclosed herein including with respect to the nodes and/or routers disclosed herein (see for example, 300, 400, 500, and/or 600). In the example embodiment, the processor 20 may be configured using computer code stored at memory 40 and/or 42 to provide the operations, such as detecting, by a router coupling a first mesh network to at least one other mesh network, a mesh packet having a destination node in the at least one other mesh network; receiving, at the router, an internet protocol address of the at least one other router, wherein the internet protocol address is received in response to querying for the destination node; and sending, by the router, the mesh packet encapsulated with the internet protocol address of the at least one other router coupled to the at least one other mesh network including the destination node.

Some of the embodiments disclosed herein may be implemented in software, hardware, application logic, or a combination of software, hardware, and application logic. The software, application logic, and/or hardware may reside in memory 40, the control apparatus 20, or electronic components disclosed herein, for example. In some example embodiments, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed with respect to the nodes disclosed herein.

The subject matter described herein may be embodied in systems, apparatus, methods, and/or articles depending on the desired configuration. For example, the systems, apparatus, methods, and/or articles described herein can be implemented using one or more of the following: electronic components such as transistors, inductors, capacitors, resistors, and the like, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the example embodiments described above may be directed to various combinations and sub-combinations of the disclosed features and/or combinations and sub-combinations of several further features disclosed above. In addition, the logic flow depicted in the accompanying figures and/or described herein does not require the particular order shown, or sequential order, to achieve desirable results. Other embodiments may be within the scope of the following claims.

What is claimed is:

1. A multihop network communication protocol for communicating between a recipient that receives a data packet from a sender and forwards the packet to a target, the sender that receives the data packet from a prior sender, and the target that forwards the data packet toward a final destination, the protocol comprising:
   receiving, at the recipient, a data packet having a forwarding header comprising:
   an identification of the current sender;
   an identification of the previous sender;
   an identification of the target; and
   a hop metric;

identifying a new target while avoiding a forwarding path loop, based on stored information;
at least one of transmitting the data packet to the target and broadcasting the data packet, the data packet being modified by:
replacing the identity of the current sender with the identity of the recipient;
replacing the identity of the prior sender with the identity of the current sender;
replacing the identity of the target with an identity of the new target, and
altering the hop metric.

2. The multihop network communication protocol according to claim 1, further comprising storing information in a table to reflect that the current sender is reachable in one hop, and that the prior sender is reachable in two hops.

3. The multihop network communication protocol according to claim 2, wherein the hop metric comprises a hop count reflecting a number of hops from an originator of the data packet, the protocol further comprising storing information in the table to reflect that the originator of the data packet is reachable in one plus the hop count.

4. The multihop network communication protocol according to claim 1, wherein the hop metric comprises a time to live, the protocol further comprising decrementing the time to live, and testing the decremented time to live to determine whether the time to live is lapsed.

5. The multihop network communication protocol according to claim 1, further comprising timing a receipt of a communication in response to the transmission or broadcast of the data packet with respect to the transmission or broadcast of the data packet.

6. The multihop network communication protocol according to claim 5, further comprising retransmitting or rebroadcasting the data packet if the timing or receipt is not within a predetermined period.

7. The multihop network communication protocol according to claim 1, wherein the data packet further comprises a cost parameter representing an estimated cost to forward the data packet to the destination, and an accumulated cost parameter representing a cost accumulated by prior forwarding of the data packet, the protocol further comprising comparing the accumulated cost to the estimated cost, and selectively forwarding based on the comparison.

8. The multihop network communication protocol according to claim 1, wherein the data packet further comprises a flood mode indicator, the protocol further comprising selectively transmitting or selectively broadcasting dependent on the flood mode indicator.

9. The multihop network communication protocol according to claim 1, further comprising:
maintaining a gradient table representing a path cost between the receiver and the final destination;
determining a freshness of the gradient table; and
defining a flood mode and the new target dependent on the gradient table.

10. A multihop network communication node, adapted for communicating between the multihop network communication node that receives a data packet from a sender and forwards the packet to a target, the sender that receives the data packet from a prior sender, and the target that forwards the data packet toward a final destination, the protocol comprising:
at least one automated processor configured to identify a new target while avoiding a forwarding path loop, based on stored information;
a transceiver, configured to receive a data packet having a forwarding header comprising:
an identification of the current sender;
an identification of the previous sender;
an identification of the new target; and
a hop metric;
the transceiver being controlled to at least one of transmit the data packet to the new target and broadcast the data packet modified by:
replacement of the identity of the current sender with the identity of the recipient;
replacement of the identity of the prior sender with the identity of the current sender;
replacement of the identity of the target with an identity of the new target, and
alteration of the hop metric.

11. The multihop network communication node according to claim 10, further comprising a table configured to store information reflecting that the current sender is reachable in one hop, and that the prior sender is reachable in two hops.

12. The multihop network communication node according to claim 11, wherein the hop metric comprises a hop count reflecting a number of hops from an originator of the data packet, the table being further configured to store information reflecting that the originator of the data packet is reachable in one plus the hop count.

13. The multihop network communication node according to claim 10, wherein the hop metric comprises a time to live, the at least one automated processor being further configured to decrement the time to live, and to test the decremented time to live to determine whether the time to live is lapsed.

14. The multihop network communication node according to claim 10, wherein the at least one automated processor is further configured to time receipt of a communication in response to the transmission or broadcast of the data packet with respect to the transmission or broadcast of the data packet.

15. The multihop network communication node according to claim 14, further comprising retransmitting or rebroadcasting the data packet if the timing or receipt is not within a predetermined period.

16. The multihop network communication node according to claim 10, wherein the data packet further comprises a cost parameter representing an estimated cost to forward the data packet to the destination, and an accumulated cost parameter representing a cost accumulated by prior forwarding of the data packet, the at least one automated processor being further configured to compare the accumulated cost to the estimated cost, and to selectively forward the data packet based on the comparison.

17. The multihop network communication node according to claim 10, wherein the data packet further comprises a flood mode indicator, the at least one automated processor being further configured to selectively transmit or selectively broadcast the data packet dependent on the flood mode indicator.

18. The multihop network communication node according to claim 10, further comprising a gradient table representing a path cost between the receiver and the final destination, wherein the at least one automated processor being further configured to:
determine a freshness of the gradient table; and
define a flood mode and the new target dependent on the gradient table.

19. A mesh network communication node, configured for communication with other mesh network nodes, comprising:

a memory configured to store an identifier of the mesh network communication node and a forwarding table;

a radio frequency transceiver configured to receive a data packet from a current sender, the data packet defining: an identity of the current sender, an identity of a prior sender from which the current sender received the data packet, an identity of a final destination for the data packet, a hop count of hops previously traversed by the data packet, an identity of a target recipient, and a sequence identifier;

at least one processor configured to: (i) update the forwarding table to mark the current sender as being reachable in one hop, and the prior sender as being reachable in two hops via the current sender as next hop; (ii) determine whether to rebroadcast the data packet, if and only if the sequence identifier is not present in a list of prior sequence identifiers and the identity of the final destination is not the identifier of the mesh network communication node; (iii) modify the data packet by: a replacement of the identity of the current sender with the identity of the mesh network communication node, a replacement of the identity of the prior sender with the identity of the current sender, a replacement of the identity of the target recipient with an identity of a new target from a forwarding table, and an increment of the hop count; and (iv) selectively control a rebroadcast of the modified data packet through the radio frequency transceiver, in dependence on the determination.

20. The mesh network communication node according to claim 19, wherein the at least one processor is further configured to selectively control a rebroadcast of the modified data packet through the radio frequency transceiver further in dependence on at least one of whether:

the next hop is present in the forwarding table; and the time-to-live has reached zero.

* * * * *